(12) United States Patent
Strickholm et al.

(10) Patent No.: US 7,634,546 B1
(45) Date of Patent: Dec. 15, 2009

(54) SYSTEM AND METHOD FOR COMMUNICATION WITHIN A COMMUNITY

(76) Inventors: Stefan Edward Strickholm, 2311 Anacapa St., Santa Barbara, CA (US) 93105; Alexander Peter Globa, 1483 Anita St., Carpinteria, CA (US) 93013

( * ) Notice: Subject to any disclaimer, the term of this patent is extended or adjusted under 35 U.S.C. 154(b) by 927 days.

(21) Appl. No.: 10/004,384

(22) Filed: Oct. 31, 2001

Related U.S. Application Data

(60) Provisional application No. 60/245,138, filed on Nov. 1, 2000.

(51) Int. Cl.
G06F 15/16 (2006.01)
G06F 9/44 (2006.01)
(52) U.S. Cl. .................. 709/207; 709/205; 717/102
(58) Field of Classification Search ......... 709/204–207, 709/217–219
See application file for complete search history.

(56) References Cited

U.S. PATENT DOCUMENTS

| | | | |
|---|---|---|---|
| 6,081,832 A * | 6/2000 | Gilchrist et al. ............. | 709/206 |
| 6,466,932 B1 * | 10/2002 | Dennis et al. ................. | 707/3 |
| 6,549,916 B1 * | 4/2003 | Sedlar ........................ | 707/200 |
| 6,611,822 B1 * | 8/2003 | Beams et al. ................. | 706/11 |
| 6,718,535 B1 * | 4/2004 | Underwood ................. | 717/101 |
| 6,941,304 B2 * | 9/2005 | Gainey et al. ................ | 707/10 |

* cited by examiner

*Primary Examiner*—William C Vaughn, Jr.
*Assistant Examiner*—Peling A Shaw

(57) ABSTRACT

A communications tool that combines a software application and various communication systems that parallel natural styles of knowledge sharing and problem solving. It merges with normal patterns of relationship to create a seamless and transparent extension of community. By using computer, Internet, telephone, e-mail, and other communications technologies, the present invention brings these communities of practice to a new level of immediacy and relevance—one not encumbered by time or place. The invention is issue-centered versus document-centered, incorporates a leader-controlled structure, which is distributive and transparent, and enables stratification of items to allow multiple and simultaneous uses of the invention (e.g. dynamic FAQ, electronic whiteboard, expert center, committee review tool, etc.). Leaders control through inherited parameters. The present invention more effectively captures and leverages "tacit" knowledge (that which exists in the minds of participants and has not been written down), by connecting communities and adapting to their forms of interrelationships.

54 Claims, 75 Drawing Sheets

| Attachment / Document | Deposit Date | User ID | Item Attached | Extention |
|---|---|---|---|---|
| Client_Limited_Acess_Fc.doc | 9/24/01 | sstrickholm | Additional Development Documents | doc |
| kDNA–Interface_Components_TM.doc | 8/23/01 | sstrickholm | Knobbe, Martens Provisional Application 11/01/00 | doc |
| kDNA–Unique_&_NonObvious.doc | 9/23/01 | sstrickholm | Knobbe, Martens Provisional Application 11/01/00 | doc |
| kDNA–UserInterface-10.doc | 9/23/01 | sstrickholm | Knobbe, Martens Provisional Application 11/01/00 | doc |
| kDNA-Conversion_Of_Responses.doc | 9/23/01 | sstrickholm | Knobbe, Martens Provisional Application 11/01/00 | doc |
| KDNA-Decision_Chain-2.doc | 9/25/01 | sstrickholm | Additional Development Documents | doc |
| KDNA-Underlying_Principles-2.doc | 8/25/01 | sstrickholm | KDNA - Underlying Principles | doc |
| KDNA-Underlying_Principles.doc | 9/23/01 | sstrickholm | KDNA - Underlying Principles | doc |
| kDNA_-_REVIEW_Interface.doc | 9/24/01 | sstrickholm | Additional Development Documents | doc |
| kDNA_Training_Upgrade.doc | 9/23/01 | sstrickholm | Online Training Module Upgrade | doc |
| Navigation_Map_for_kDNA_1.2.doc | 9/24/01 | sstrickholm | Additional Development Documents | 2 |
| Patent_Claims-jmc-45361.doc | 9/23/01 | sstrickholm | Knobbe, Martens Provisional Application 11/01/00 | doc |
| Send_and_Receive_Alerts-2.doc | 9/24/01 | sstrickholm | Additional Development Documents | doc |
| Trademarks_Final-descriptions.doc | 8/23/01 | sstrickholm | Trademark Application 9/06/00 | doc |

SYSTEM AND METHOD FOR COMMUNICATION WITHIN A COMMUNITY

CROSS REFERENCE TO RELATED APPLICATION

This application claims the benefit of U.S. Provisional Application No. 60/245,138 filed on Nov. 1, 2000 which is incorporated herein by reference in its entirety.

FIELD OF THE INVENTION

This invention relates to communication, and more particularly, to communication within a community.

BACKGROUND OF THE INVENTION

Organizations of all sizes struggle with developing and maintaining optimal communications systems and methods to help achieve organizational goals and objectives. The solutions currently being employed, when evaluated critically, are found for the most part to be inefficient, cumbersome, and inadequate for the task. Many organizations in recent years have come to rely on e-mail for knowledge exchange. However, e-mail is chaotic and is accompanied by a high "noise" level. Broadcast e-mails throughout an organization waste productive time for those members who read the e-mail but are not part of the problem, the solution, or even an intended recipient. Once sent and stored, accessing and retrieving pertinent e-mails is inefficient at best, and are not much more than mini "silos" of knowledge lacking interconnectedness. This is due in part to the point-to-point nature of e-mail communication—it is not visible (except for the ubiquitous broadcast e-mail mentioned above) to others who could potentially benefit from the message.

At the other end of the spectrum, current Knowledge Management ("KM") software products represent overkill for many types of organizations. Knowledge Management may be defined as an attempt to embody organizational processes that seek synergistic combination of data and information processing capacity of information technologies, and the creative and innovative capacity of human beings. With the advent of new technologies, such as data mining, intranets, video conferencing, and web casting, several technology vendors are offering such solutions as panaceas for the business challenges of the knowledge era. Trade press coverage of the "productivity paradox" has further added to the speed of the information technology ("IT") treadmill by suggesting that increasing investments in new information technologies should somehow result in improved business performance.

KM systems have shown themselves to be expensive to implement and maintain, and frankly, too complicated for most users. Their static design coupled with pre-defined content (documents) provides only a limited benefit. Thus, a need exists for a system and method that enables communication to take place that takes advantage of the ways in which knowledge workers communicate and operate through the social processes of collaborating, sharing knowledge, and building on each other's ideas.

Another segment of the market, so-called "groupware" applications, focus on project and task management, and may include document sharing capability, discussion threads, team calendars, etc. These applications are typically driven by specific project milestones, meetings or events. Knowledge is accumulated during the project, but does not evolve on a continuous basis once the project team disbands. Participation is typically limited to project team members and teams are not easily interlinked.

However, outside of traditional organization hierarchies and project teams, organization members often interact through informal groups which have a common interest or mission. These "communities of practice" or "communities of interest" are often self-directed and organic in nature. They transcend traditional organization structures and explicitly defined project teams. Knowledge is transparent across teams and visible to entire organizations or groups of organizations. Membership is diverse and continually evolves (participation by members can fluctuate to suit their needs, members can leave, while new members join). Knowledge creation and discovery is continuous (it does not end with the completion of a project or event). Communities of practice play an increasingly important role in spurring innovation and accelerating business processes within and across organizations. Experts in the field believe that community-driven collaborative knowledge communities will increasingly become a key element of high-performing organizations.

Some technology experts and academic scholars have, however, observed that there is no direct correlation between IT investments and business performance. This conclusion is also supported by a recent industry-wide analysis of IT investments. On a similar note, another study underscores that in the last twenty years, U.S. industry has invested more than $1 trillion in technology but has realized little improvement in the efficiency or effectiveness of its knowledge workers. This failure is attributed to most organization's ignorance of ways in which knowledge workers communicate and operate through the social processes of collaborating, sharing knowledge, and building on each other's ideas.

SUMMARY OF THE INVENTION

The present invention is a communications tool that combines a software application and various communication systems that parallel natural styles of knowledge sharing and problem solving. It merges with normal patterns of relationship to create a seamless and transparent extension of community. By using computer, Internet, telephone, e-mail, and other communications technologies, the present invention brings these communities of practice to a new level of immediacy and relevance—one not encumbered by time or place. The present invention may be implemented in a number of different ways utilizing a number of different hardware and software combinations. In one embodiment of the invention, a web-enabled software application utilizes a client/server hardware configuration. In another embodiment of the invention, a distributed server configuration is utilized.

Current communication device and Knowledge Management solutions separate themselves into two camps with opposite strengths and limitations. The present invention exploits this division by unifying their strengths together into a single, integrated unit—creating a new communication application technology.

Communication devices, which consist of phones, pagers, etc., provide simple, easy, and quick communication. Their strength is that they require almost no training, are extremely mobile and can be used "on the fly" for an almost unlimited number of purposes. They provide for limited time-asynchronous, organized, multi-party feedback. They also incorporate almost no system for capturing, organizing and distributing a constantly growing and improving databank of knowledge. Current efforts in improving this area involve voice mail systems or pager databanks that save messages temporarily or without significant permanent categorization and limited feedback loops.

Knowledge Management and Groupware systems consist of knowledge or information-sharing environments that utilize sophisticated database systems that are primarily computer and software based. Their strength is that these software systems can capture time-independent and multi-party feedback. They generally produce a permanent body of data, information and/or knowledge that can be distributed throughout an organization. Their limitation is that they tend to require significant training, have reduced mobility due to their computer-based interface, and focus on a limited number of applications. Current efforts in improving this area involve Knowledge Management and Groupware applications that generally focus on project and task management, and may include document sharing capability, discussion threads, team calendars, etc.

The present invention bridges the gulf between these two options to create a new form of technology. Like communication devices, the present invention requires almost no training, can be extremely mobile, and used "on the fly" for an almost unlimited number of purposes. Unlike communication devices, the present invention overcomes the limitation of providing for limited time-asynchronous, organized, multi-party feedback or incorporating almost no system for capturing, organizing and distributing a constantly growing and improving databank of knowledge.

Like Knowledge Management and Groupware systems, the present invention can capture time-independent and multi-party feedback, producing a permanent body of data, information, and/or knowledge that can be distributed throughout an organization. Unlike Knowledge Management and Groupware systems, the present invention overcomes the limitations of requiring significant training, reduced mobility due to a computer-based interface, and a focus on a limited number of applications.

The present invention combines the strengths of communication devices and Knowledge Management/Groupware systems, eliminates the weaknesses of communication devices and Knowledge Management/Groupware systems, turns phones, pagers, etc. into sophisticated knowledge-sharing applications that capture time-independent and multi-party feedback, produce a semi-permanent body of data, information and/or knowledge, and distribute this knowledge throughout an organization.

The present invention turns sophisticated knowledge-sharing applications into communication devices that require almost no training, provide extreme mobility, and can be used "on the fly" for an almost unlimited number of purposes.

The present invention is a new communications tool that melds together communication devices and knowledge-sharing applications into a single, inseparable and integrated unit. The present invention is highly flexible, accommodating both traditional organization structures together with informal communities of practice.

Through a comprehensive series of customizable parameters, the software adapts to the patterns of communication and inter-relationships which exist in the community: both inter-organizational and intra-organizational. Membership can be broad and diverse (or limited, where desired), management of the application centralized or decentralized (or both-centralized in certain areas of the database while decentralized in others), public and private—as defined by the community's needs.

A major element in the design of the present invention is the "human factor" which reflects the philosophy that humans, not data, are the key to creating communities and knowledge systems having a high return on investment. Members of communities interact in many different ways. Some communities of practice or communities of interest are wide ranging, characterized by wide membership and diversity. In other situations, they work most effectively through smaller, more intimate and private interactions. Further, the nature of the interrelationships is often driven by the specific issue or topic. The same member of a community may be motivated to participate in a community of wide and diverse membership for one topic, while at the same time, prefer to interact on another topic in a more private forum with limited membership.

In certain communities, domain experts or natural leaders serve to motivate participation of other members. In other communities, membership that is perceived as being equal and democratic results in higher levels of participation. In some communities, a hierarchy exists, whether by design, such as in a corporation, or through natural evolution of that particular community.

The design of the present invention recognizes that communities of all kinds exist, often times coexisting within larger communities. Communities evolve on a continuous basis—some outlive their usefulness to some members, new ones are created driven by events or environmental changes, etc. Through a flexible leadership structure, wide range of inherited parameters, user tools that aggregate, filter, and sort interactions and content, and the ability to modify the structure of the database and interactions quickly and easily, the present invention can be organically shaped and reshaped to accommodate the patterns of communication and interrelationships of its users.

The present invention is also designed around several principles. One principle of the invention is that it is issue-centered versus document-centered. Issues and discussion threads are supported by data objects (documents, links, electronic files, etc.), not vice versa. Many software applications (especially traditional knowledge management applications) focus on connecting the user to data. In this data-centric paradigm, user interactions (e.g., discussion threads) typically revolve around these data objects. In contrast, the issue-centered paradigm focuses on connecting users to users, adapting to their relationships and patterns of communication, and allowing the results of that connection to be shared by others in the community. Data objects serve to support these interactions.

Documents (such as various kinds of file attachments) and resources (such as links to other Issues, Internet Links, etc.) gravitate around and support the Issue that is the focus of a discussion thread, rather than the documents themselves necessarily being the focus of the discussion. A database within the software application captures threaded discussions between users of the invention. This allows the users to simultaneously review all posted perspectives. However, unlike common chat rooms or discussion boards, additional information is captured via links to other related internal discussion threads or Items, links to external Internet sites, and file attachments added by users (Word, Excel, PowerPoint, Adobe, etc. files from their hard drive). Users can now simultaneously review each other's ideas and supporting documentation. Content is organized and various tools provided to the user allow different views of the content.

Another principle of the invention is a leader-controlled structure, which is both distributive and transparent. In contrast to knowledge management or groupware applications, the application incorporates not only content in the form of documents, threads, links, and electronic files, but a leadership structure as well (e.g., heading, category, topic leaders). Leaders can exist at all or some levels of the database hierarchy and have the ability to act as "gatekeepers" and catalysts for knowledge sharing and decision making. Heading, category, and topic leaders have tools and parameters at their disposal to facilitate knowledge creation and exchange (e.g., approvals, alias', etc.). The application software adapts to the leadership structure and relationships that exist in the community, whether they are a traditional management hierarchy, or an informal network of domain experts, or both (the software can also facilitate the creation of new community leadership structures). The present invention interweaves people with electronic content, creating a far more valuable asset for a community than an application which relies primarily on pre-defined posted content (documents, electronic files, etc.). The infusion of leaders and users with data draws on critical tacit knowledge (in addition to explicit knowledge) and provides a community the mechanism to be significantly more adaptable and creative in making decisions and meeting the challenges of an increasingly chaotic and unpredictable environment.

Management control of the application can lie within the hands of one Leader or can be distributed among many Leaders in different areas of the community. The transparent structure enables users to review the indexing and organization of the database. This is not a "Black Box" solution and thus is not search engine dependent as are many knowledge repositories (the Internet being the best example).

The leader-controlled structure in one embodiment of the inventions revolves around a three-level hierarchy (heading, category, and topic), each level capable of having multiple subjects. Other embodiments may employ more levels or less levels. In the three level embodiment, Headings are at the top of the indexing system. Categories lie under each of the Headings. Topics lie under each of the Categories. For example, "Marketing" (a Heading), may have under it "Competitive Analyses" (a Category), which may have under it "Microsoft" (a Topic).

Headings spawn Categories and Categories spawn Topics. The Topics then contain the individual discussion threads, or Items. Thus, If 10 Headings each spawn 10 Categories which each spawn 10 Topics, the database will have a total of: 10×10×10=1,000 Topics.

The present invention provides a structure for the automatic evolution and growth of knowledge. The entire responsibility for developing the database and providing the content lies with the User/Client. Therefore, besides an enterprise solution, it is possible to adopt an Application Service Provider ("ASP") model that may be duplicated among thousands of communities.

The user interface and database hierarchy design of the present invention is straightforward and highly intuitive, and can be structured to suit the preferences of the user and the community.

Communities operate in an environment which is increasingly unpredictable, chaotic, and even hostile. Predictive models and traditional knowledge systems, based upon rigidly defined content and membership, are ineffective in coping with the rapid pace and dramatic extent of changes that organizations face. Focusing on the human factor allows users, groups, and management to interact in a highly dynamic, yet structured environment which enables communities to better anticipate, assess, and respond to changes in their environments.

The present invention more effectively captures and leverages "tacit" knowledge (that which exists in the minds of participants and has not been written down), by connecting users and creating a forum for discussion and knowledge exchange, making it available to other users, and then allowing them to build upon an initial exchange. The present invention has been designed with the belief that leveraging tacit knowledge is the key to driving innovation, learning, and better and faster decision-making. Objects such as documents and electronic files have vastly greater usefulness to the user when presented in context, i.e., reflecting opinions, perspectives, and experiences of users. Tacit knowledge is elusive. It exists in emails, phone conversations, instant messages, etc. and is often not captured and made available in an organized manner. The present invention helps solve this problem. Further, the design of the present invention reflects the belief that tacit knowledge is most effectively elicited where communities exist-groups of people who share a common interest and mission. The present invention creates an electronic environment where these relationships can be manifested and developed on a wide scale.

The co-evolution of content, leadership, and controls is another principle employed in the invention. A system of checks and balances are established between the various stakeholders of the community. The system becomes self-designing, but under the guidance of management.

The present invention also allows for variation in use and design for different areas within a community. Functionalities can easily be turned on and off to meet the needs of constantly changing environments.

Content, Leadership, and Controls over the application simultaneously co-evolve to meet the varying demands of these environments. The Web Master or Administrator creates the Headings, assigns a Heading Leader for each Heading, and gives the Heading Leaders the Parameters (discussed below) within which the Heading Leaders can operate for each of their Headings.

The Heading Leaders in turn create the Categories within their Headings, assign a Category Leader for each Category, and give the Category Leaders the Parameters within which the Category Leaders can operate for each of their Categories. The Parameters for the Category Leaders are inherited from their Heading Leader, which are at least the same as, or narrower in scope, than the Parameters the Heading Leader inherited from the Web Master.

The Category Leaders in turn create the Topics within their Categories, assign a Topic Leader for each Topic, and give the Topic Leaders the Parameters within which the Topic Leaders can operate for each of their Topics. The Parameters for the Topic Leaders are inherited from their Category Leader subject to the Parameters inherited from their Category Leader, which are at least the same as, or narrower in scope, than the Parameters the Category Leader inherited from the Heading Leader, which are ultimately bound by the Parameters inherited from the Web Master. The Topic Leaders then determine the final Parameters (within allowable limits) for their Topics and oversee communication within their Topic areas.

Thus, a community could have just one person fulfilling the role of all the Content Leaders (a generic term for the three types of Leaders: Heading Leaders, Category Leaders, and Topic Leaders), or many people filling different Leader roles, running their application. The database structure can also vary greatly for different areas of the community. As an example, a Finance Heading and all of its Categories and Topics could be managed by just one person, whereas a Marketing Heading could have multiple Category and Topic Leaders. Each of these areas could also be run under different Parameters (discussed below).

In one embodiment of the invention, five different Parameters control how the application functions in different areas. Each of these Parameters operates independently from the other. The five Parameters are: Privacy, Screening, Input (Read/Write), User ID, and Approvals.

The Privacy Parameter determines whether a user can access a particular area, or whether a password is required. The Screening Parameter indicates if a Content Leader must screen new Items before they are accepted into the database. The Input Parameter determines whether users can submit Items, rate, respond, or simply read the content for that Topic. The User ID Parameter lets the Leader turn on or off identification for all users for that Topic area (and replace with Aliases, for example). Finally, the Approvals Parameter allows the Leader to give a "Go or No Go" to an Idea for implementation.

For example, the Finance Heading for a community and all of its Categories and Topics could be set up all the same, with a high level of Privacy and Screening but only allowing users to respond to or read the contents. Whereas in the Marketing Heading for the community, Categories and Topics could each be set up differently, with some having no Privacy, no User ID (creating anonymity) but requiring Approval before implementation of any new Idea.

Three different groups can use the application—content leaders, users, and clients. Content leaders are in charge of certain areas of the application. They have "Inclusive Membership"—they can go anywhere except those areas that are password protected. Users are not in charge of any areas, but they can also go anywhere except where password protected. Clients have "Exclusive Membership"—they can only enter those areas where they have been explicitly assigned. For example, a group outside the core of the community, such as clients or vendors of an organization, could have access only to a section of the application that dealt with issues relating to external suppliers, but still subject to the same inherited parameters as leaders and users.

A "penny tax" gets placed on users when they deposit information. That is, Leaders must develop structure and users must index their contributions within the structure. The result is to organize knowledge into well-defined rivers at the outset so that "downstream" the extraction of content yields a clear and valuable return. The goal is that a minimal amount of effort up front, a one cent tax, yields a one dollar return down the road.

Dynamic feedback is another principle employed in the present invention. In one embodiment of the invention, dynamic feedback is achieved through utilization of seven different types of Items, where each type of Item contains a discussion thread or other documents. The Item types are Ideas, Questions, Events, Reviews, Surveys, Newsletters, and Action Items. One skilled in the art will recognize that more or less Item types, or different Item types, could be utilized.

Ideas allow rating and group feedback on the validity of an emerging concept. Questions create a forum for asking questions and capturing solutions community-wide. Events provide real-time RSVP's, pre-meeting documents and discussion, plus information on events. Reviews record agreement or non-agreement by members and their responses to proposed courses of action. Surveys allow participants to post preferences and opinions using a multiple choice or ranking format. Newsletters would allow participants to post information on an informal basis, make requests for information, and share updates on items. Finally, Action Items create a forum for the follow-up and execution of decisions produced by the use of the previous six Item types mentioned above.

All seven types of Items can allow: (1) response and discussion threads; (2) links to other Items in the database, (3) links to Internet sites; (4) attachments that help explain a person's position (spreadsheets, text, slide shows, Adobe Acrobat documents, graphic files, sound files, streaming video files, etc.) and (5) rapid feedback evaluation utilizing polling, surveying, etc., which organizes and aggregates information from many to one. In addition, users can change their rating, RSVP, or agreement at any time, creating real time feedback for all Items.

Item types can be combined for multiple uses within each Topic area. Thus, a specific Topic can include different Questions, Events, Reviews, Action Items, etc. This creates an overlay or enmeshment of different communication streams and functions meeting different types of community needs all within the same Topic area. The user can also customize an Item type for rapid feedback evaluation. The initiating user can quickly poll or survey and aggregate the perspectives of responding users by requiring the responders to utilize choices input by the initiating user.

Users are able to thus stratify and multiplex content and dynamic interaction within the present invention in a manner which allows multiple and simultaneous uses. Items, consisting of, but not limited to, ideas, questions, events, committee reviews, and surveys, can be aggregated and isolated to produce communication and database strata such as a dynamic FAQ's, electronic whiteboard for brainstorming and idea sharing, community newsletters, expert center, committee review tool, and best practices repository, as examples.

These strata are fully dynamic. They can incorporate discussion threads, attachments, links, etc. Further, they can be dimensionalized against the database hierarchy. Thus, a heading/category/topic (in one embodiment of hierarchy levels), such as "Human Resources (heading example)/Policies and Procedures (category example)/New Hire Process (topic examples) could incorporate multiplex streams of dynamic FAQ's for company employees, committee reviews for approving "new hire" policies, electronic whiteboard for new hire welcoming ideas, and a document repository for new hire policies. User interaction and related content may be accessed in the aggregate for that heading/category/topic or isolated for a particular strata. In this manner, similar to a Swiss Army knife or multi-tool knife, the present invention provides multiple and simultaneous uses.

Knowledge is relative in the minds of users, and is not absolute. The present invention is thus designed such that user tools can be employed which allow knowledge to be viewed and interpreted differently. Users can, for example, utilize filters and sorting to extract knowledge of particular groups or individuals, view only knowledge which has received a group rating of a particular level, or higher, etc. The database can be "stratified" by item, such that a user is able to focus on questions only, ideas only, committee reviews only, etc. The database can thus serve as a "dynamic FAQ" database, brainstorming electronic whiteboard, best practice repository, etc., simultaneously.

Filters, which are designed to remove information or select certain information, and sorts, which are designed to rearrange information, allow each user to look at the data differently based on their own need. A user may filter or sort the database "on the fly" according to different Item types, user groups, expertise levels, etc. Through the use of user tools, the knowledge base becomes a prism, which can be viewed from different angles and serve multiple functions for the user and the community.

Experience Weighting self-identifies users as having different experience levels for different areas (Topics, etc.) of the application. Ratings in different areas can thus be weighted by individual experience levels. In addition, users can search for levels of expertise in different areas of the application.

Another principle employed in the present invention is Singularity of Time and Space. The present invention collapses time and space to a single point. All posted thoughts, resources, decisions, actions and communications—worldwide and captured for ongoing use—become available at a single point of contact. Users access this singularity to contribute and extract content, and then return to the normal world of distances in time and space to carry out their objectives. The goal is to leverage and expand knowledge despite separation by location and/or time. The database can continuously add content and grow over time.

Regular messaging and communication consists of direct communication between party A and party B. Recorded e-mail places multiple participants, parties C, D, and E, and reviewers, Parties F, G, and H, from different times and places, at a point of singularity. Developing threads (which may have attachments, links, etc.) are reviewable and useable for participants despite differences in time or place.

Sending content into the application from outside the application, such as e-mail or voice mail, is referred to as Communication Integration In. The purpose is to make it very easy and simple for users to populate the database of the application with e-mails, voice mails, and attachments directly from within their own e-mail environment, such as Microsoft Outlook and many others that could be mentioned.

Knowledge broadcasting is another principle employed in the present invention. Knowledge broadcasting enables users to alert themselves or others to activity in the application. For example, Alerts can be sent to each user's Home Page that provides access to the present invention in a web-enabled application, or immediately sent out as an e-mail, voice mail, or other form of communication. Recipients can read the entire text via e-mail, access the Internet Links, and review (but not unless they access the application) the internal Links and File Attachments (due to security protocols).

Under the Alert Me option, users can receive an Alert whenever somebody: responds to any particular Item that they have flagged; posts a new Item (to any particular area of the application); sends out items or responses to other users; or whenever any particular user they are interested in adds anything new to the database.

The Alert Others option can also be sent out immediately through messaging or communication. Users can send the contents of their posting to others whenever they: respond to any particular Item; or Post a new Item. The actions described above that are ways to send content outside of the application to recipients from within the application are referred to as Communication Integration Out.

Seamless integration with communication devices is another principle employed in the present invention, enabling the present invention to become a key component of current desk-tops as well as future communication devices. The present invention seamlessly integrates itself with: e-mail, voice mail, Internet, web services, fax, telephone, wireless, etc.; and communication software or Internet browsers, which will become the Home Page of the future. The present invention becomes an essential and inseparable part of the user's current desk-top experience and future communication devices.

The present invention links users, content, and documents into virtual conference rooms to create a permanent and constantly growing body of knowledge. Users can share their best ideas with each other, save time by re-using each other's experience, respond more effectively to customers and partners, continuously build and protect knowledge for future use, make better and faster decisions, track follow-through on Action Items, reduce time to market, and increase performance. The application helps communities improve the speed and quality of their decisions and actions.

Almost all of the functionalities described above can be accomplished with a thin-client application in one embodiment of the invention, and do not require the user to download any software to their computer or other device. To use these core functionalities, the user needs only an Internet browser and a messaging account or other communications device.

Other capabilities of the present invention may require some "Client-side software." In such cases, users would need to download a small application or "cookie" onto their own computer or other communications device.

The creation and leveraging of knowledge, in some analyst views, has now become the principle means of producing wealth, and knowledge will be like a utility company for communities in the future. Approximately 80% of the stock valuation of today's companies are tied to knowledge assets.

In the future, people will communicate far more often electronically than they will face-to-face. The Gartner Group projects that by 2007, the time spent interacting with others in the virtual world will exceed physical connections by a factor of 10-to-1.

Systems that promote the effective distribution and use of knowledge exploit two emerging and universal forces: (1) knowledge capital will determine market value and the success of organizations, and (2) knowledge capital must be developed via electronic forms of communication. The need to capitalize on and monetize knowledge resources will, in essence, produce the "oil fields" of the $21^{st}$ century. People will come to work and plug into their knowledge utility just like they plug into the oil or gas system for heat, the power grid for electricity for lights and air conditioning, and the telephone system for voice communications. The present invention meets this new need.

DETAILED DESCRIPTION OF THE INVENTION

The invention is disclosed as a system and as a method. Such a system would include appropriate hardware and software program means for executing the method of the invention. Also, an article of manufacture, such as a pre-recorded disk or other similar computer program product, for use with a data processing system, could include a storage medium and program means recorded thereon for directing a data processing system to facilitate the practice of the method of the invention. It will be understood that such apparatus and articles of manufacture also fall within the spirit and scope of the invention.

Figure 1:
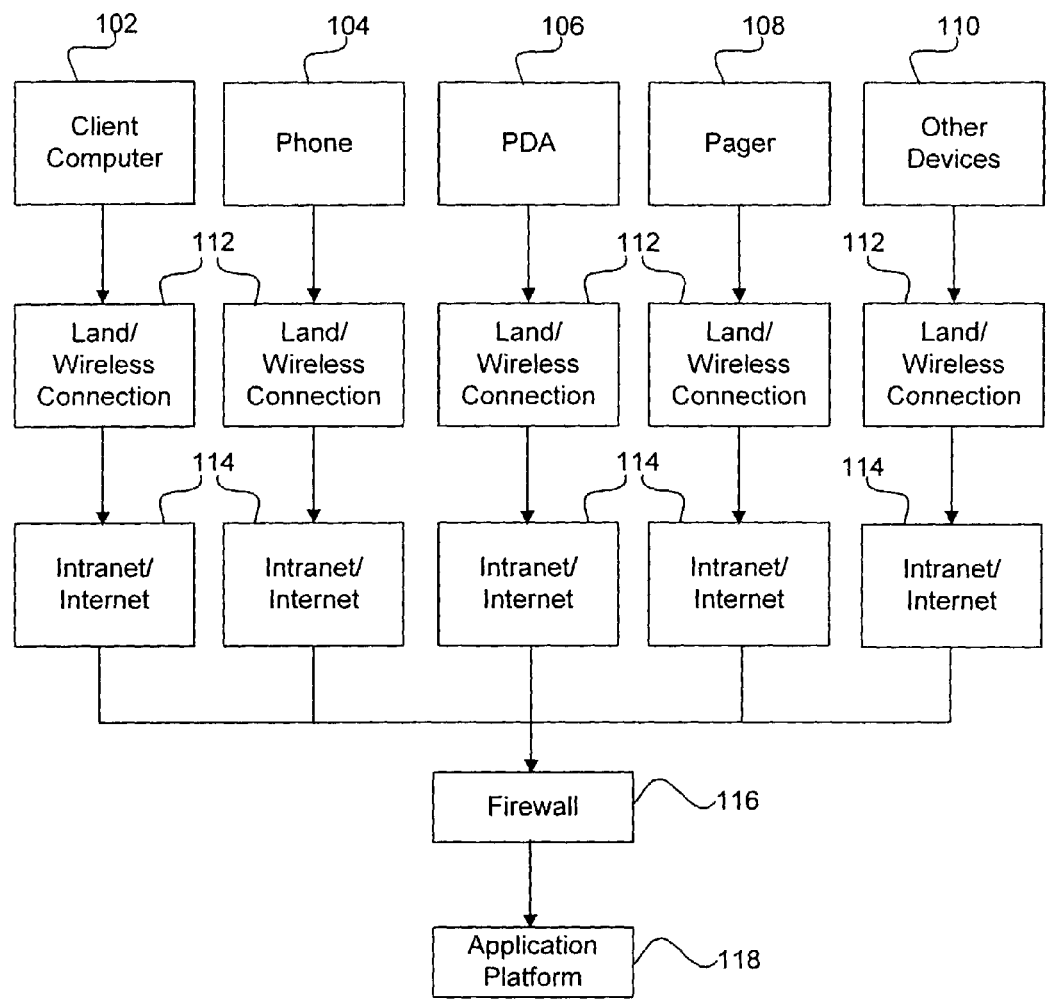
FIG. 1 shows a schematic/block diagram of an embodiment of a centralized application platform architecture utilized in the system and method of communication within a community of the present invention.

FIG. 1 shows a schematic/block diagram of an embodiment of a centralized application platform architecture utilized in the system and method of communication within a community of the present invention. An application platform in this context is defined as any hardware device that can run an application, including, but not limited to, personal computers, mainframe computers, mobile phones, PDA's, any other wireless devices, or any other devices capable of carrying signals and containing processing capabilities through a central processing unit, computer chip, PROM, EPROM, etc. Referring now to FIG. 1, various communications devices, such as Client Computer 102, Telephone 104 (which could be a land line telephone or a mobile telephone such as a cellular or satellite telephone), personal digital assistant ("PDA") 106, pager 108, and any other communication devices 110 send and receive information through Land/Wireless Connections 112 through a communications channel such as Intranet/Internet 114. The information then passes through Firewall 116 to access Application Platform 118. Though not necessary for the operation of the invention, Firewall 116 is standard practice. Application Platform 118 may have a server and has an application having a database and the software program code for executing the method of the present invention. Thus, users in a community in various locations around the world utilizing various communication devices can access Application Platform 118.

Figure 2:
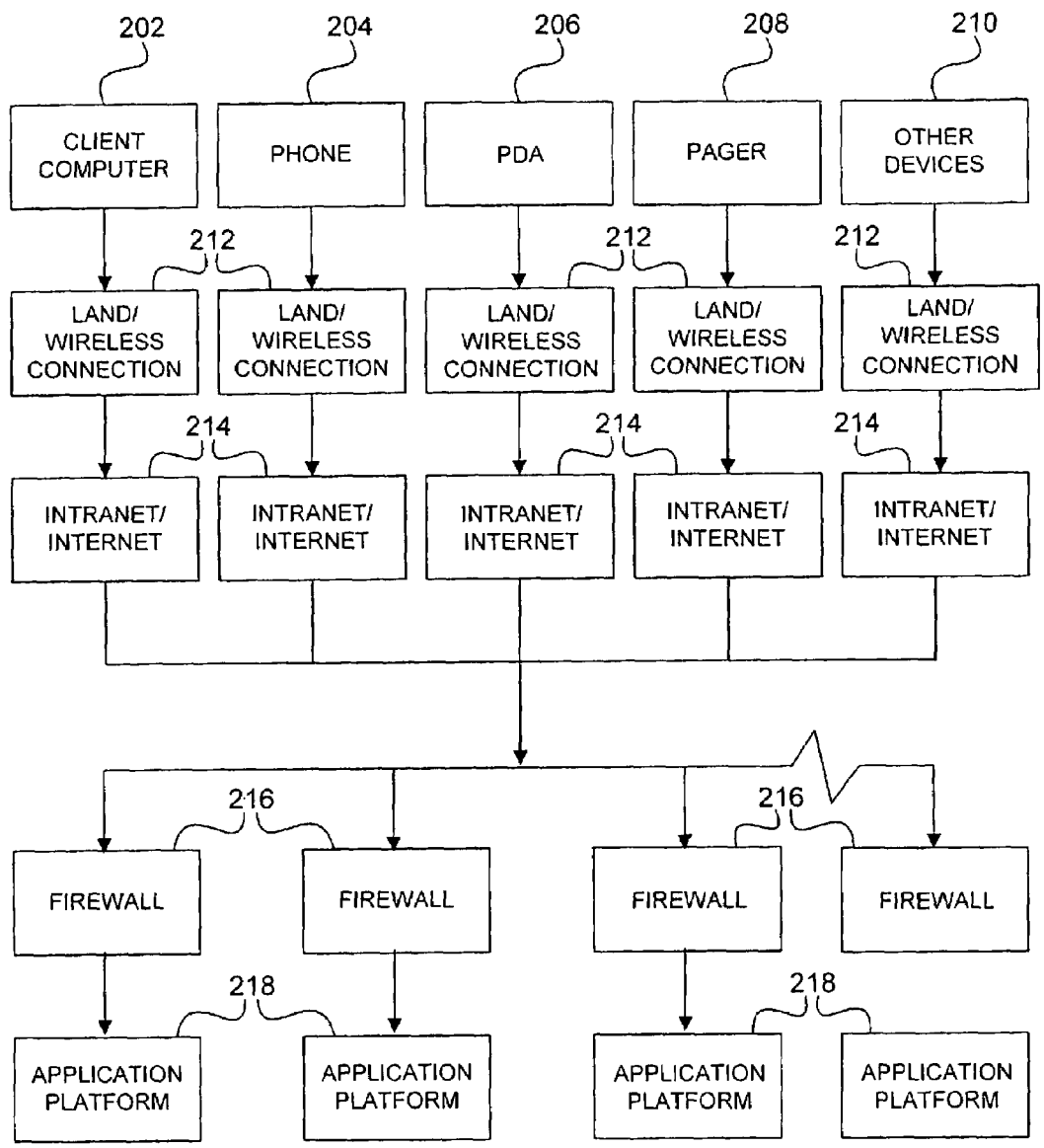
FIG. 2 shows a schematic/block diagram of an embodiment of a distributed application platform architecture utilized in the system and method of communication within a community of the present invention.

FIG. 2 shows a schematic/block diagram of an embodiment of a distributed application platform architecture utilized in the system and method of communication within a community of the present invention. An application platform in this context is defined as any group of networked hardware devices that can run a distributed application, including, but not limited to, personal computers, mainframe computers, mobile phones, cellular phones, PDA's, any other wireless devices, or any other devices capable of carrying signals and containing processing capabilities through a central processing unit, computer chip, PROM, EPROM, etc. Referring now to FIG. 2, various communications devices, such as Client Computer 202, Telephone 204 (which could be a land line telephone or a mobile telephone), PDA 206, pager 208, and any other communication devices 210 send and receive information through Land/Wireless Connections 212 through a communications channel such as Intranet/Internet 214. The information then passes through one of several Firewalls 216 to access one of several Application Platforms 218, each of which may have a server and also has portions of the database and the application software program code for executing the method of the present invention. Such an architecture, also referred to in some versions as peer to peer, distributes portions of information over several databases in the application platform. Such a system offers protection from the failure of any one platform, but does create synchronization problems. One embodiment of this type of architecture in a community of the system and method of the present invention allows each topic leader to have all of the data pertaining to his or her topic in a database on his or her computer. Each category leader has all of the data pertaining to the topics under his or her category in a database on his or her computer. Each Heading leader has all of the data pertaining to the categories and topics under his or her heading in a database on his or her computer. The Web Master has all of the data pertaining to the headings, categories, and topics in a database on his or her computer. This means that in this embodiment there could always be four copies of a single topic located on four different computers in the community, which builds in redundancy. Steps must be taken, however, to make sure all four versions of the topic are the same. The Content Synchronization Module of FIG. 13 (discussed below) solves this problem.

Also, under this distributed architecture system, a user can go to any device in the system, but the user must be redirected to the device that has the information stored that the user is looking for. Thus, each device must have a catalog or directory that identifies the location of storage of data throughout the distributed system. To avoid congestion, users are typically routed to the topic leader's device that has the particular topic of interest stored, and could direct the user to a category leader's device if the topic leader's device was inactive, and only to a heading leader's device if the category leader's device was inactive. This distributes computing power and allows a large number of users. This also means that when a user is directed to a topic leader's device, the topic leader's device must also have updated inherited parameters so the device knows if the user has access rights, and then what rights the user has thereafter (rating, review only, etc.). The Inherited Parameters Synchronization Module of FIG. 12 (discussed below) solves this problem.

Figure 3:
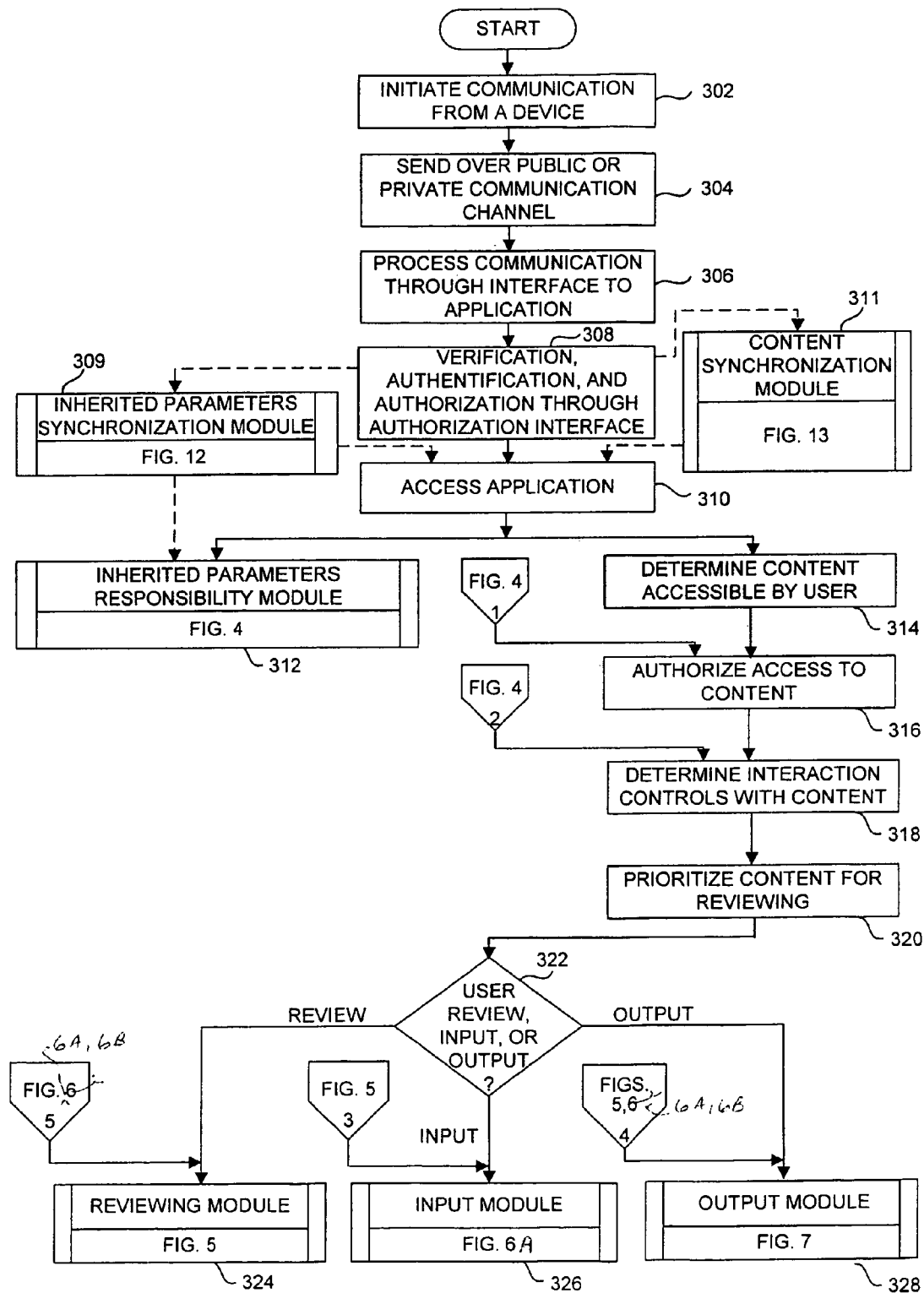
FIG. 3 shows a block flow diagram of an embodiment of the method for communication within a community of the present invention.

FIG. 3 shows a block flow diagram of an embodiment of the method for communication within a community of the present invention. FIG. 3 and the following related figures apply to a centralized application platform architecture, and also to a distributed application platform architecture where additional steps and functionality are called out in the description below.

Referring now to FIG. 3, a communication is initiated by a user from a communication device in step 302. The communication device could be one of a number of different apparatus including, but not limited to: a mobile telephone, a regular telephone, an Internet browser, a client computer utilizing e-mail or instant messaging, a PDA, pager, etc. This communication is then sent in step 304 over a public or private communication channel including, but not limited to: the Internet, Public Switched Telephone Network ("PSTN"), Wide Area Network ("WAN"), Local Area Network ("LAN"), satellite channel, or any other suitable communication channel. In step 306 the communication is processed through a Communication Interface in the application platform containing the database, if necessary, to allow the device and the application to talk to each other. For example, voice communication may be processed through speech recognition software to convert the analog voice data to digitized text data.

Step 308 performs verification, authentication, and authorization of the communication input through an Authorization Interface Module. The Authorization Interface Module interprets a name or password or other data received with the communication and verifies it, authenticates the user, and determines the authority or access level the user has and the rights the user has to the application and authorizes access. If the user is not authorized, the user is notified by the Authorization Interface Module that the user is not authorized to access the application along with a reason (expired password, incorrect password, etc.). If a distributed application platform architecture (FIG. 2) is being utilized instead of a centralized application platform architecture (FIG. 1), then step 309 calls the Inherited Parameters Synchronization Module of FIG. 12 and step 311 calls the Content Synchronization Module of FIG. 13 (both discussed below).

If authorization is successful, the user now has access to the application in step 310. Once access to the application has been gained, in step 312 the Inherited Parameters Responsibility Module of FIG. 4 is invoked (discussed below).

In step 314 a Content Access Interface determines the current overall structure and hierarchy of the database accessible by the user. An Authorization Module in step 316 next authorizes the user to access the portions of the contents of the database to which the user has access rights, and also in conjunction with the output of the Inherited Parameters Responsibility Module received from FIG. 4. Step 318 determines how the user can interact with the contents of the database to which the user has access rights from an Interaction Control Module also in conjunction with input from the Inherited Parameters Responsibility Module from FIG. 4. This step determines if the user can post new items, rate, use an alias or real ID, get approval before implementation, etc. Step 320, through a Content Prioritizing Interface, sorts and prioritizes the order the content will be presented to the user for reviewing.

Step 322 determines if the user wants to review items, input new items, or output content to other users. If step 322 determines that the user wants to review items, then step 324 calls the Reviewing Module of FIG. 5, which receives output from the Input Module of FIGS. 6A and 6B (discussed below). If step 322 determines that the user wants to input new items, then step 326 calls the Input Module of FIGS. 6A and 6B, which receives output from the Reviewing Module of FIG. 5 (discussed below). If step 322 determines that the user wants to output content to other users, then step 328 calls the Output Module of FIG. 7 (discussed below), which receives output from both the Input Module of FIG. 5 and the Reviewing Module of FIGS. 6A and 6B.

Figure 4:
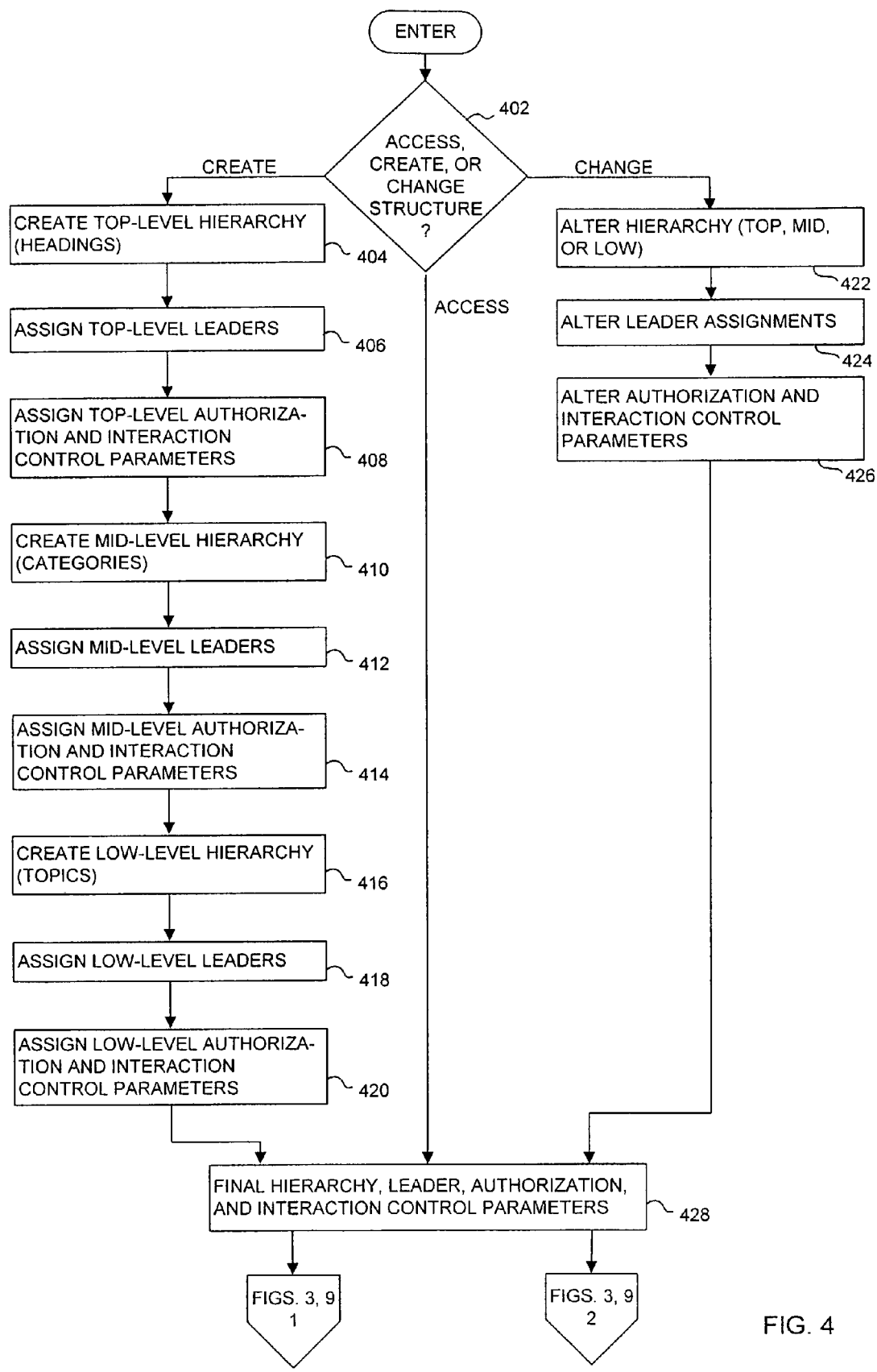
FIG. 4 shows a block flow diagram of an embodiment of the Inherited Parameters Responsibility Module of the present invention.

FIG. 4 shows a block flow diagram of an embodiment of the Inherited Parameters Responsibility Module of the present invention. Referring now to FIG. 4, after being called from step 312 of FIG. 3, step 402 determines if an access request has been made to the database, or if the structure of the database is to be changed or created. If step 402 determines that structure is to be created and the user has rights to create structure, then in step 404 a Top-level Hierarchy Initiation Module allows the user to define one or more new headings. In step 406 the user assigns a leader or leaders for the new headings. In step 408 the user assigns the top-level authorization parameters and interaction control parameters that the heading leaders will operate under.

In step 410 a Mid-level Hierarchy Initiation Module allows the user with the proper rights to define a new category. In step 412 the user assigns a leader or leaders for the new categories. In step 414 the user assigns the mid-level authorization parameters and interaction control parameters that the category leaders will operate under. The parameters for the Category Leaders are subject at the least to the same parameters inherited from their Heading Leader, or possibly narrower than the parameters the Heading Leader inherited from the Web Master.

In step 416 a Low-level Hierarchy Initiation Module allows the user with the proper rights to define a new topic. In step 418 the user assigns a leader or leaders for the new topics. In step 420 the user assigns the low-level authorization parameters and interaction control parameters that the topic leaders will operate under. The parameters for the Topic Leaders are subject to at the least the same parameters inherited from their Category Leader, or possibly narrower than what the Category Leader inherited from the Heading Leader.

In step 428, the final hierarchy, leader, authorization parameters, and interaction control parameters are gathered, and returned to FIG. 3 at step 316 to the Authorization Module and at step 318 to the Interaction Control Module. An exemplary three level embodiment is thus described in FIG. 4, but one skilled in the art will recognize that more or less than three levels may be utilized in the present invention.

If step 402 determines that an existing structure is to be changed, then in step 422, through a Multi-level Hierarchy Initiation Module, the user may change the hierarchy in any of the three levels that the user has the proper rights to make changes. For example, the user may elevate a category into a heading, or may demote a category to a topic, or move a topic from under one category to another, merge a topic with another topic, etc. In step 424 the user may change leader assignments, such as making a category leader responsible for another category, removing a topic leader and replacing him with a new topic leader, etc. In step 426, Multi-level Authorization and Interaction Control Parameters Module the user can change any of the previously set authorization parameters and interaction control parameters.

In step 428, the final hierarchy, leader, authorization parameters, and interaction control parameters are gathered, and returned to FIG. 3 at step 316 to the Authorization Module and at step 318 to the Interaction Control Module.

If step 402 determines that structure is just to be accessed, then in step 428 the current hierarchy, leader, authorization parameters, and interaction control parameters are gathered. They are returned to FIG. 3 at step 316 to the Authorization Module and at step 318 to the Interaction Control Module. Although shown as separate modules in FIG. 4 (Top-level, Mid-level, and Low-level Hierarchy Initiation Modules, and Multi-level Hierarchy Initiation Module), one skilled in the art will recognize that one Hierarchy Initiation Module combining all sets of functionality could also be employed.

Figure 5:
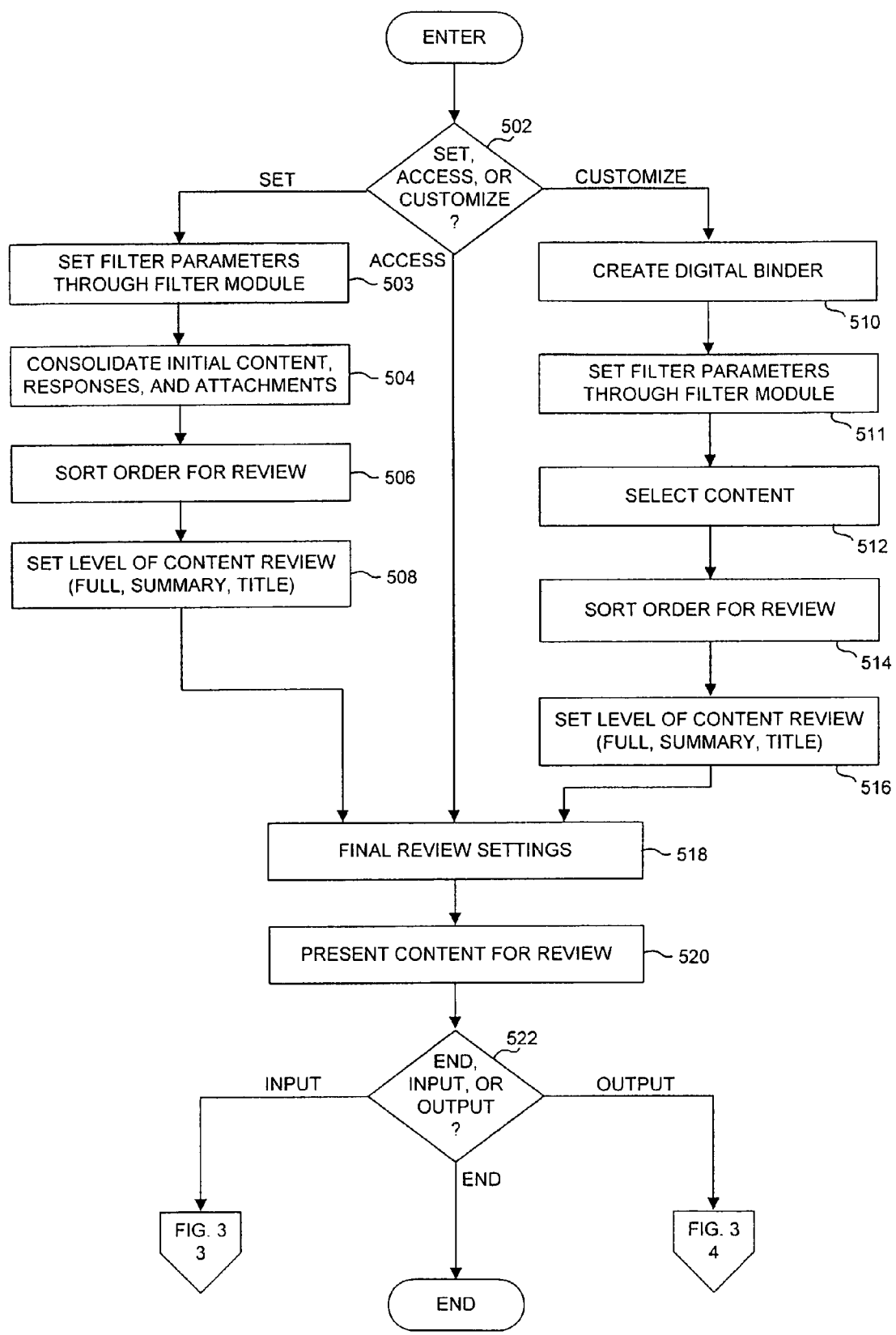
FIG. 5 shows a block flow diagram of an embodiment of the Reviewing Module of the present invention.

FIG. 5 shows a block flow diagram of an embodiment of the Reviewing Module of the present invention. The Reviewing Module may be utilized to review the contents of the database through visual display or audibly. A user could place a call from a mobile telephone, access the application through voice recognition technology, and request that a particular content of the database be reviewed, and the system would deliver the content audibly to the user's mobile telephone. Or, the user could utilize a PDA, access the application, and tap on an item displayed in the display area of the PDA, and optionally, the display could scroll the content, or the content could be delivered audibly to the PDA. More typically, the user will access the application from a client device using an Internet browser, and the content will be displayed on the graphics display of the client device, but it could also be delivered audibly from the client device.

Referring now to FIG. 5, after being called from step 324 in FIG. 3, step 502 determines if an access request has been made by a user to the database, or if a request to set or customize the reviewable content has been received. If step 502 determines that the reviewable content is to be set, then in step 503 the user may set parameters through a Filter Module that will filter the data the user is about to review. For example, the user could filter out all responses made by a certain user, or all responses from users that are not a member of a specific group, or filter in responses by one or more specific users.

In step 504 an Initial Content, Response, and Attachments Consolidation Module takes the initial idea or question, all the responses not filtered in or filtered out, and all the attachments, and consolidates them together. A Sorting Interface in step 506 automatically sorts the order that these multiple threads with multiple responses and multiple attachments will be presented for review. Optionally, the user may specify a specific order. A Consolidation Reviewing Interface in step 508 allows the level of content review to be set. For example, a full review, summary only review, title only review, or all responses may be set. Then in step 518, the final consolidated, sorted, and settings level are gathered, and presented for review in step 520.

If step 502 determines that the reviewable content is to be customized, then in step 510 a Customized Interactive Reviewing Module allows the user to create what is referred to as a digital binder. A digital binder can be used to aggregate specific knowledge across the application that is most useful to a user, thus personalizing a portion of the user's review of the contents of the database. Content of digital binders remains linked real time to the database. In step 511 the user may set parameters through a Filter Module that will filter the data the user is about to select. In step 512 the user selects the portions of content of interest for the digital binder. A user may create multiple digital binders for various purposes. A Sorting Interface in step 514 sorts the order that these portions of content, which may include multiple threads with multiple responses and multiple attachments, will be presented for review. Optionally, the user may specify a specific order. A Consolidation Reviewing Interface in step 516 allows the level of content review to be set. For example, a full review, summary only review, or title only review may be set. Then in step 518, the final consolidated, sorted, and settings level are gathered, and presented for review in step 520.

If step 502 determines that the reviewable content is to be accessed, then in step 518 the current final consolidated, sorted, and settings level are gathered, and presented for review in step 520.

After step 520, step 522 determines if the user wants to input new items, output content to other users, or end. If step 522 determines that the user wants to input new items, control returns to step 326 of FIG. 3. If step 522 determines that the user wants to output content to other users, control returns to step 328 of FIG. 3. Otherwise, the method for communication within a community of the present invention ends.

Figure 6A:
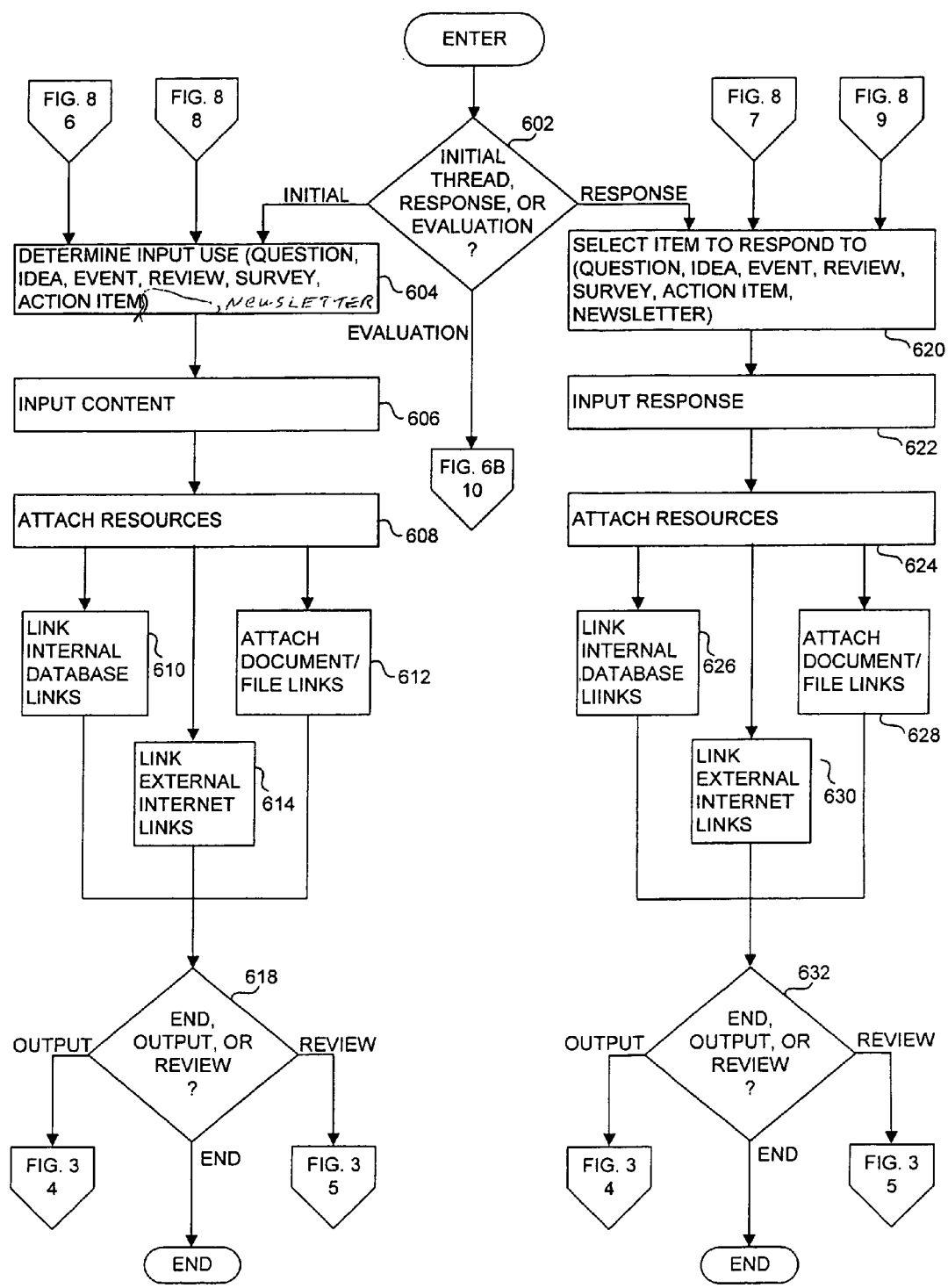
FIGS. 6A and 6B show a block flow diagram of an embodiment of the Input Module of the present invention.
Figure 6B:
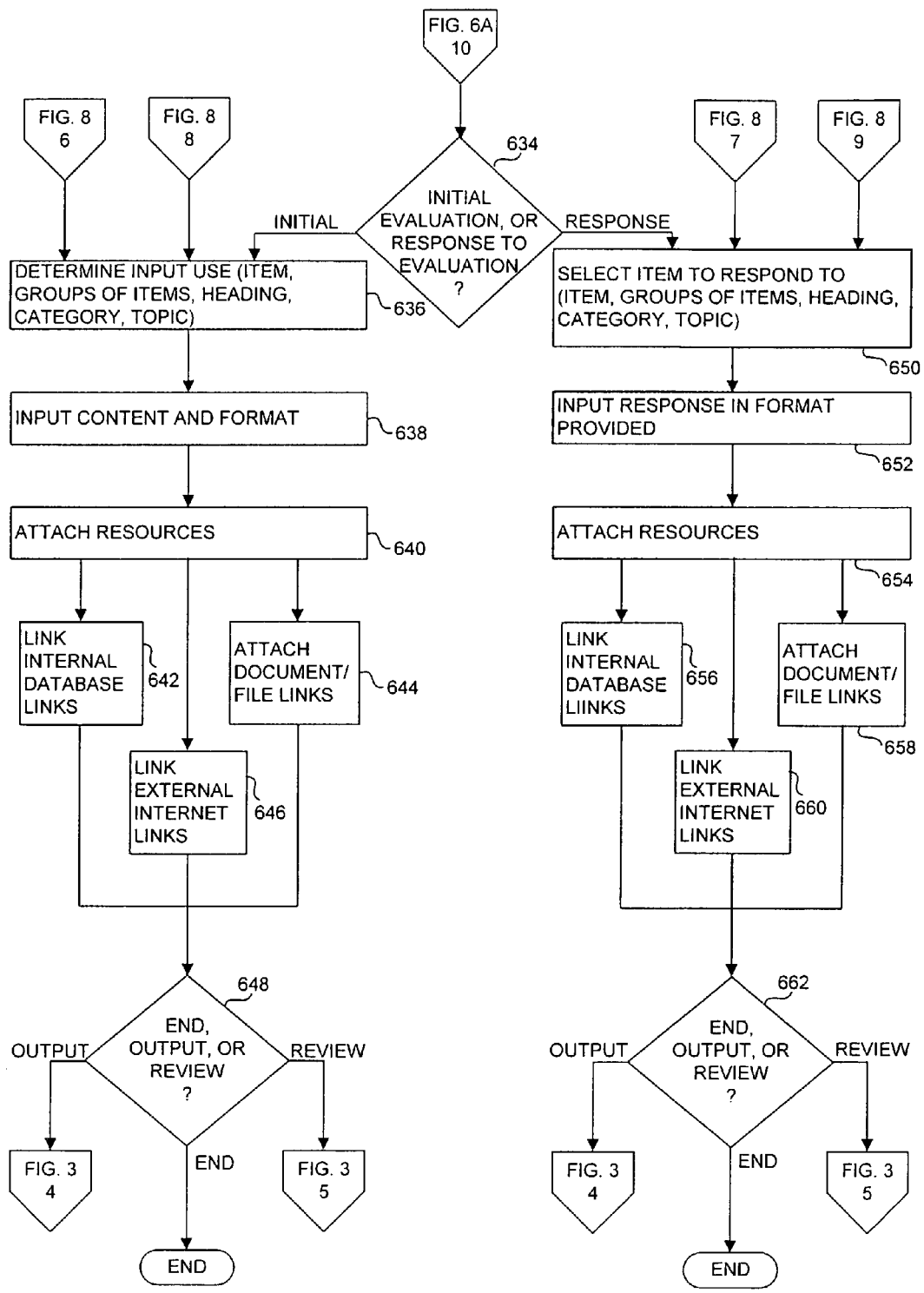

FIGS. 6A and 6B show a block flow diagram of an embodiment of the Input Module of the present invention. Referring now to FIG. 6A, after being called from step 326 of FIG. 3, step 602 determines if the input is an initial thread input, a response to an existing thread, or related to a rapid feedback evaluation. If step 602 determines that the input is an initial thread, then in step 604 an Initial Use Definition Module, which receives the output of the Thread Synchronization Module of FIG. 8 (discussed below), determines if the input use is a question, idea, event, review, survey, newsletter, or an action item. In step 606 the Initial Content Interface allows the user to input the content which is stored in the database. Depending upon the specific hardware and software implementation of the invention, the user input may be via a keyboard from a client device, voice input, PDA input, etc. In step 608 a Resource Attachment Module allows the user to attach or link different resources to the input thread, such as internal database links 610, document/file attachments 612, and external Internet links 614 which are also stored in the database.

Step 618 determines if the user wants to output content to other users, review content, or end. If step 618 determines that the user wants to output content to other users, control returns to step 328 of FIG. 3. If step 618 determines that the user wants to review content, control returns to step 324 of FIG. 3. Otherwise, the method for communication within a community of the present invention ends.

If step 602 determines that the input is a response to an existing thread, then in step 620 a Response Module, which receives the output of the Thread Synchronization Module of FIG. 8 (discussed below), determines the item type selected to respond to (question, idea, event, review, survey, newsletter, or an action item). In step 622 the Response Content Interface allows the user to input a response. Depending upon the specific hardware and software implementation of the invention, the user input may be via a keyboard from a client device, voice input, PDA input, etc. In step 624 a Resource Attachment Module allows the user to attach or link different resources to the response thread, such as internal database links 626, document/file attachments 628, and external Internet links 630.

Step 632 determines if the user wants to output content to other users, review content, or end. If step 632 determines that the user wants to output content to other users, control returns to step 328 of FIG. 3. If step 632 determines that the user wants to review content, control returns to step 324 of FIG. 3. Otherwise, the method for communication within a community of the present invention ends.

If step 602 determines that the input is related to a rapid feedback evaluation, then step 634 (FIG. 6B) determines if the input is an initial rapid feedback evaluation or a response to an existing rapid feedback evaluation. A rapid feedback evaluation allows the initiator to customize the manner and format of responses the evaluation will garner from other users. It provides a way for a user to gather feedback on the database itself in addition to feedback on one item. For example, the initiator of the rapid feedback evaluation may put forth an Idea, a Heading, or a group of questions, and compose five multiple choice answers for users to pick from for their response. Or, an existing Item may have been rated by several users based on one criteria, and now the initiator wants to gather input from these responders based on a different criteria.

If step 634 determines that the input is related to an initial rapid feedback evaluation, then in step 636 an Initial Use Definition Module, which receives the output of the Thread Synchronization Module of FIG. 8 (discussed below), determines if the input use is any of the Item types, group of Items, Heading, Category, or Topic. In step 638 the Initial Content and Format Interface allows the user to input the content and input the type of response choices the user wants for the rapid feedback evaluation, which is stored in the database. Depending upon the specific hardware and software implementation of the invention, the user input may be via a keyboard from a client device, voice input, PDA input, etc. The description for steps 640, 642, 644, 646, and 648 is the same as that for corresponding steps 608, 610, 612, 614, and 618 of FIG. 6A.

If step 634 determines that the input is related to a response to a rapid feedback evaluation, then in step 650 a Response Module, which receives the output of the Thread Synchronization Module of FIG. 8 (discussed below), determines the item type selected to respond to (Item types, group of Items, Heading, Category, or Topic) and the content and format specified for the response. In step 652 the Response Content Interface allows the user to input a response according to the format specified. Depending upon the specific hardware and software implementation of the invention, the user input may be via a keyboard from a client device, voice input, PDA input, etc. The description for steps 654, 656, 658, 660, and 662 is the same as that for corresponding steps 624, 626, 628, 630, and 632 of FIG. 6A.

Figure 7:
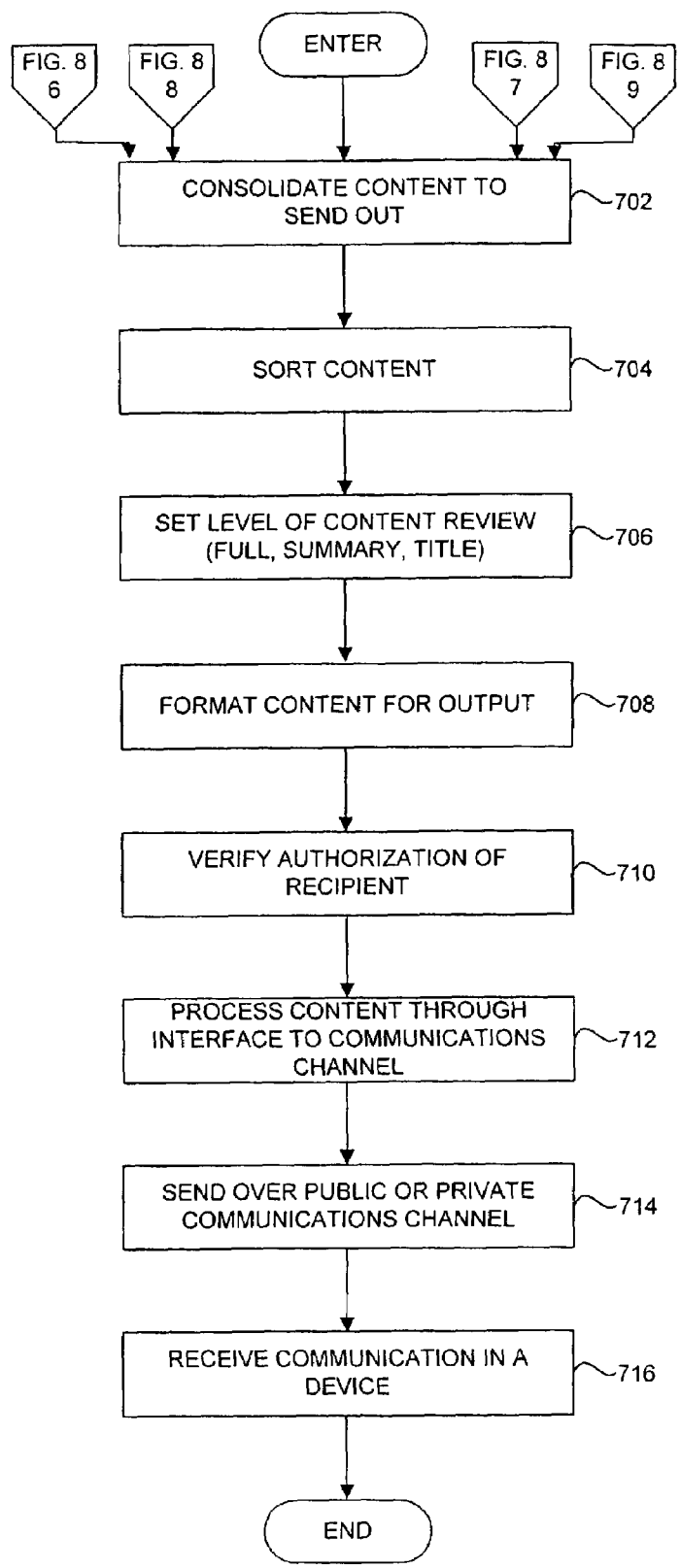
FIG. 7 shows a block flow diagram of an embodiment of the Output Module of the present invention.

FIG. 7 shows a block flow diagram of an embodiment of the Output Module of the present invention. Referring now to FIG. 7, after being called from step 328 of FIG. 3, in step 702 an Initial Content, Response, and Attachment Consolidation Module, which receives the output of the Thread Synchronization Module of FIG. 8 (discussed below), consolidates everything the user wants to send out. A Sorting Interface in step 704 automatically sorts the order that the consolidated information will be presented for output. Optionally, the user may specify a specific order.

A Consolidation Reviewing Interface in step 706 allows the level of content review to be set. For example, a full review, summary only review, title only review, or all responses review may be set. In step 708 an Output Content Definition Module formats the content for output in full, summary, or title format. Step 710, through an Authorization Interface Module, determines if the user can send the content out to the intended recipient based on the recipients access rights to the application. If not, the user is notified by the Authorization Interface Module that the recipient is not authorized to receive the content. A Communication Device Interface in step 712 converts the data into the form required by the recipient. For example, the user may have typed in his response through a keyboard, and the recipient of the data is on a mobile telephone. The data would be converted to voice data for this recipient. The data is then sent over the public or private communications channel in step 714, and is received in step 716 in the communications device of the recipient, and then the method for communication within a community of the present invention ends.

Figure 8:
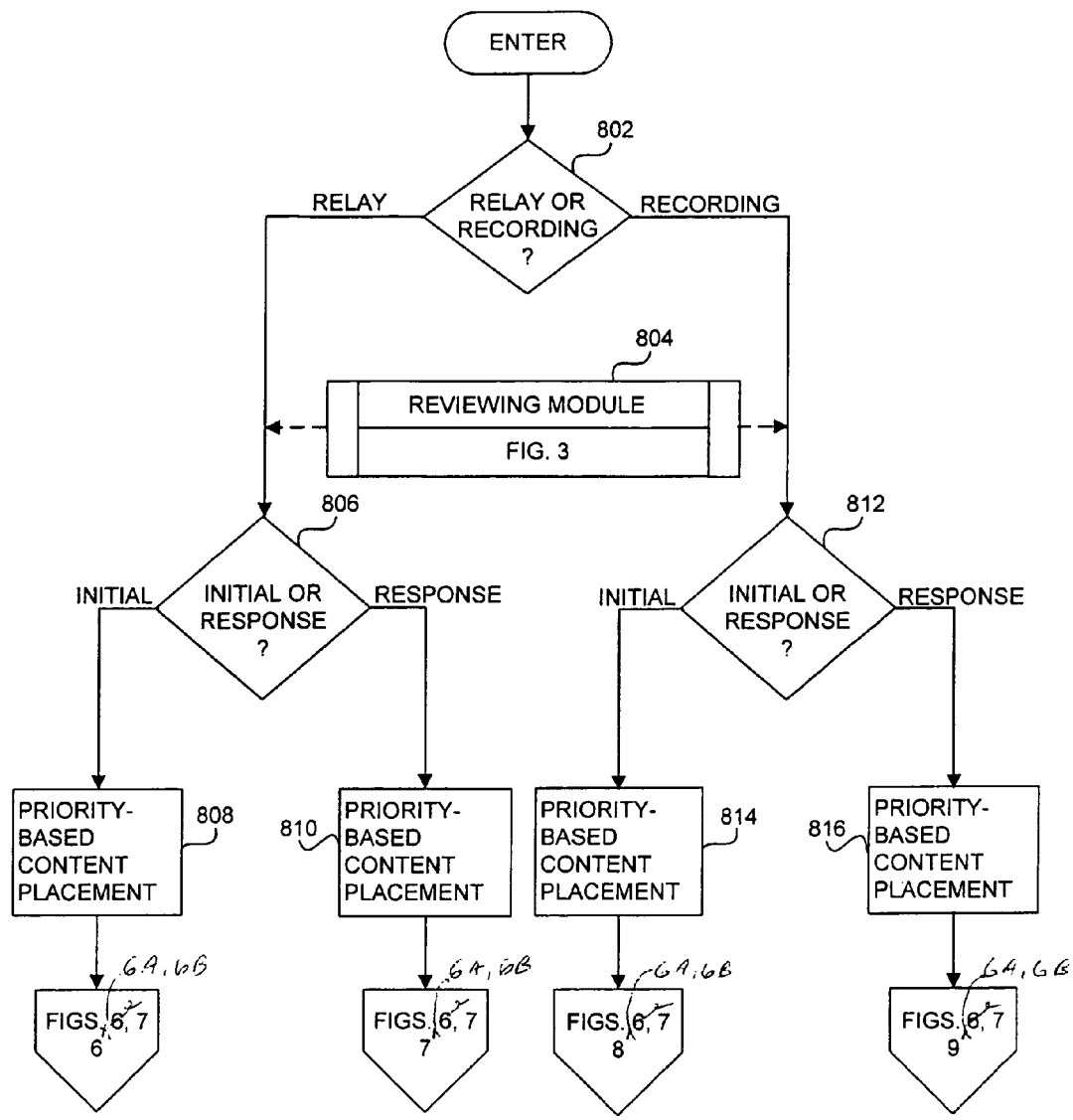
FIG. 8 shows a block flow diagram of an embodiment of the Thread Synchronization Module of the present invention.
Figure 9:
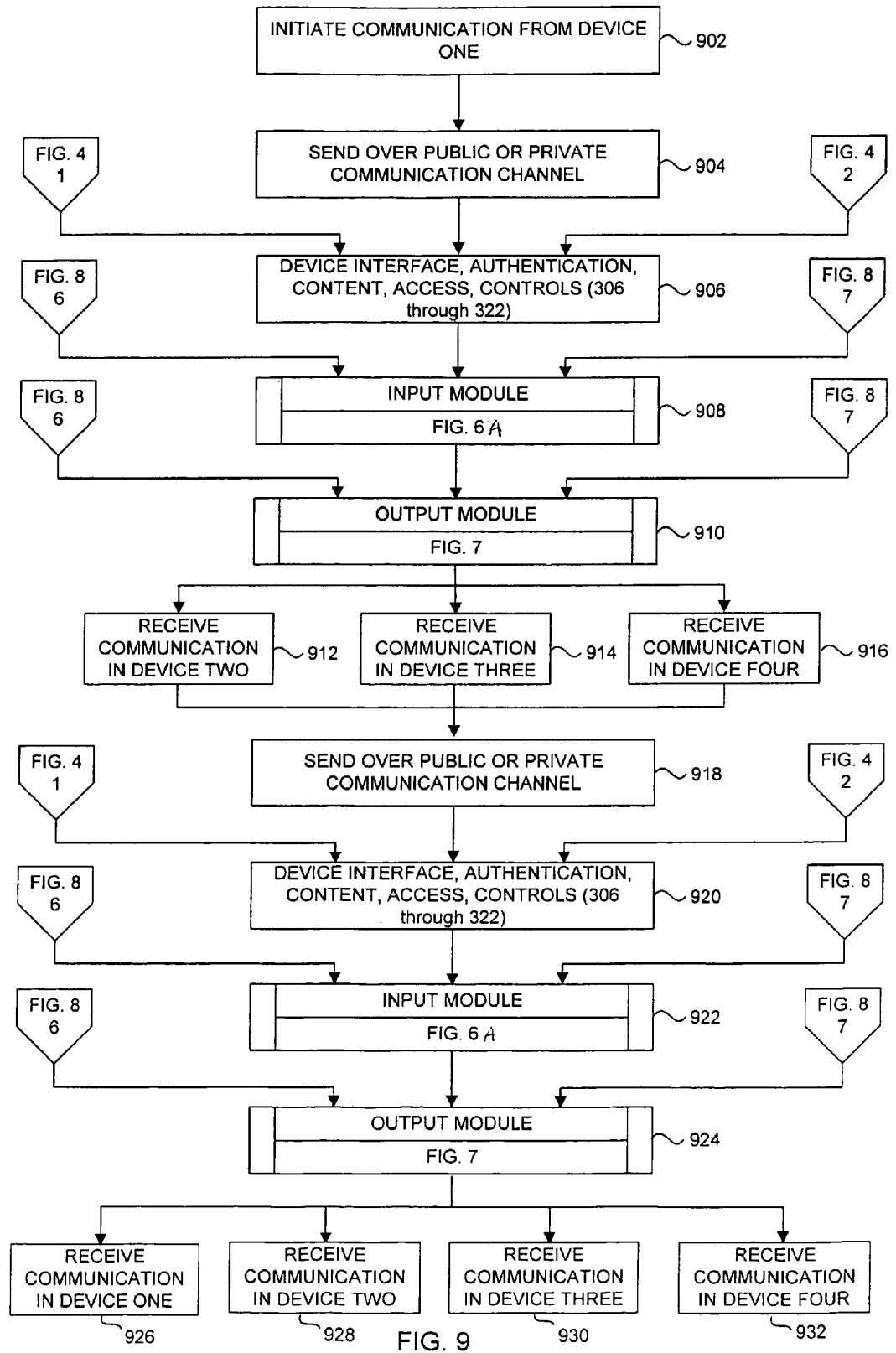
FIG. 9 shows a block flow diagram of an embodiment of relay communications when a user is accessing the application of the present invention.

FIG. 8 shows a block flow diagram of an embodiment of the Thread Synchronization Module of the present invention. There are two ways in which to use the system and method for communication within a community of the present invention for multi-user, multi-threaded synchronized communication. Users may access the application and communicate through the database, as shown in FIG. 9, which is referred to as relay communication. Or, users may record communications while not accessing the application, which is referred to as recorded communications, and is described below in FIG. 10. The Thread Synchronization Module synchronizes both types of communications.

Referring now to FIG. 8, the Thread Synchronization Module is invoked whenever a user initiates input into the application. In step 802 a Relay/Recorded Decision Module determines if the communication is relayed or recorded—that is, is the communication part of a relay process or a recorded process. The user in step 804 may or may not access the Reviewing Module of FIG. 3.

If step 802 determines that the communications is a relay process, then a Detection Module in step 806 determines if the communication is an initial thread, or a response to an existing thread. If step 806 determines that the communications is an initial thread, then an Initial Priority-based Content Placement Module in step 808 determines a priority assignment for this communication, and places the communication based on the priority assignment such that the communication, when reviewed by a user accessing the application, reviews the communication in proper relationship to other related threads. In this case, this communication would have the highest priority since it is an initial threaded communication. The output of step 808 is returned to steps 604 and 636 of the Input Module of FIGS. 6A and 6B and to step 702 of the Output Module of FIG. 7.

If step 806 determines that the communications is a response to an existing thread, then a Response Priority-based Content Placement Module in step 810 determines a priority assignment for this communication, and places the communication based on the priority assignment such that the communication, when reviewed by a user accessing the application, reviews the communication in proper relationship to other related threads. The output of step 810 is returned to steps 620 and 650 of the Input Module of FIGS. 6A and 6B and to step 702 of the Output Module of FIG. 7.

If step 802 determines that the communications is a recorded process, then a Detection Module in step 812 determines if the communication is an initial thread, or a response to an existing thread. If step 812 determines that the communications is an initial thread, then an Initial Priority-based Content Placement Module in step 814 determines a priority assignment for this communication, and places the communication based on the priority assignment such that the communication, when reviewed by a user accessing the application, reviews the communication in proper relationship to other related threads. In this case, this communication would have the highest priority since it is an initial threaded communication. The output of step 814 is returned to steps 604 and 636 of the Input Module of FIGS. 6A and 6B and to step 702 of the Output Module of FIG. 7.

If step 812 determines that the communications is a response to an existing thread, then a Response Priority-based Content Placement Module in step 816 determines a priority assignment for this communication, and places the communication based on the priority assignment such that the communication, when reviewed by a user accessing the application, reviews the communication in proper relationship to other related threads. The output of step 816 is returned to steps 620 and 650 of the Input Module of FIGS. 6A and 6B and to step 702 of the Output Module of FIG. 7.

FIG. 9 shows a block flow diagram of an embodiment of relay communications when a user is accessing the application of the present invention. Referring now to FIG. 9, a user initiates a communication from device one in step 902. The communication is sent in step 904 over a public or private communication channel. Step 906 encompasses steps 306, 308, 310, 314, 316, 318, 320, and 322 described in FIG. 3. Step 908 calls the Input Module of FIGS. 6A and 6B, which receives the output of the Thread Synchronization Module of FIG. 8, allowing the user to add a new thread, or respond to an existing thread. The user may choose to access the review module (not shown in FIG. 9) prior to Step 910, which calls the Output Module of FIG. 7. The Output Module receives the output of the Thread Synchronization Module of FIG. 8, allowing the user to output content to one or more recipients. The output is received in communication device two in step 912, in communication device three in step 914, and in communication device four in step 916. The output could be sent to more users, but only three are shown for simplicity. Thus, the application has relayed the communication from a user at device one to three other users at three other devices, which could all be different devices, such as a mobile telephone, a PDA, an instant message, a pager, a client device, etc.

The return communications from devices two, three, and four use the application in reverse to communicate to each other and/or to device one. Step 918 sends the communication from devices two, three, and four over the public or private communication channel. Step 920 encompasses steps 306, 308, 310, 314, 316, 318, 320, and 322 described in FIG. 3. Step 922 calls the Input Module of FIGS. 6A and 6B, allowing each user of device two, three, and four to add a new thread, or respond to an existing thread. The user may choose to access the review module (not shown in FIG. 10) prior to Step 924, which calls the Output Module of FIG. 7. The Output Module receives the output of the Thread Synchronization Module of FIG. 8, allowing each user of device two, three, and four to output content to one or more recipients. The output is received in communication device one in step 926, in communication device two in step 928, in communication device three in step 930, and in communication device four in step 932.

Figure 10:
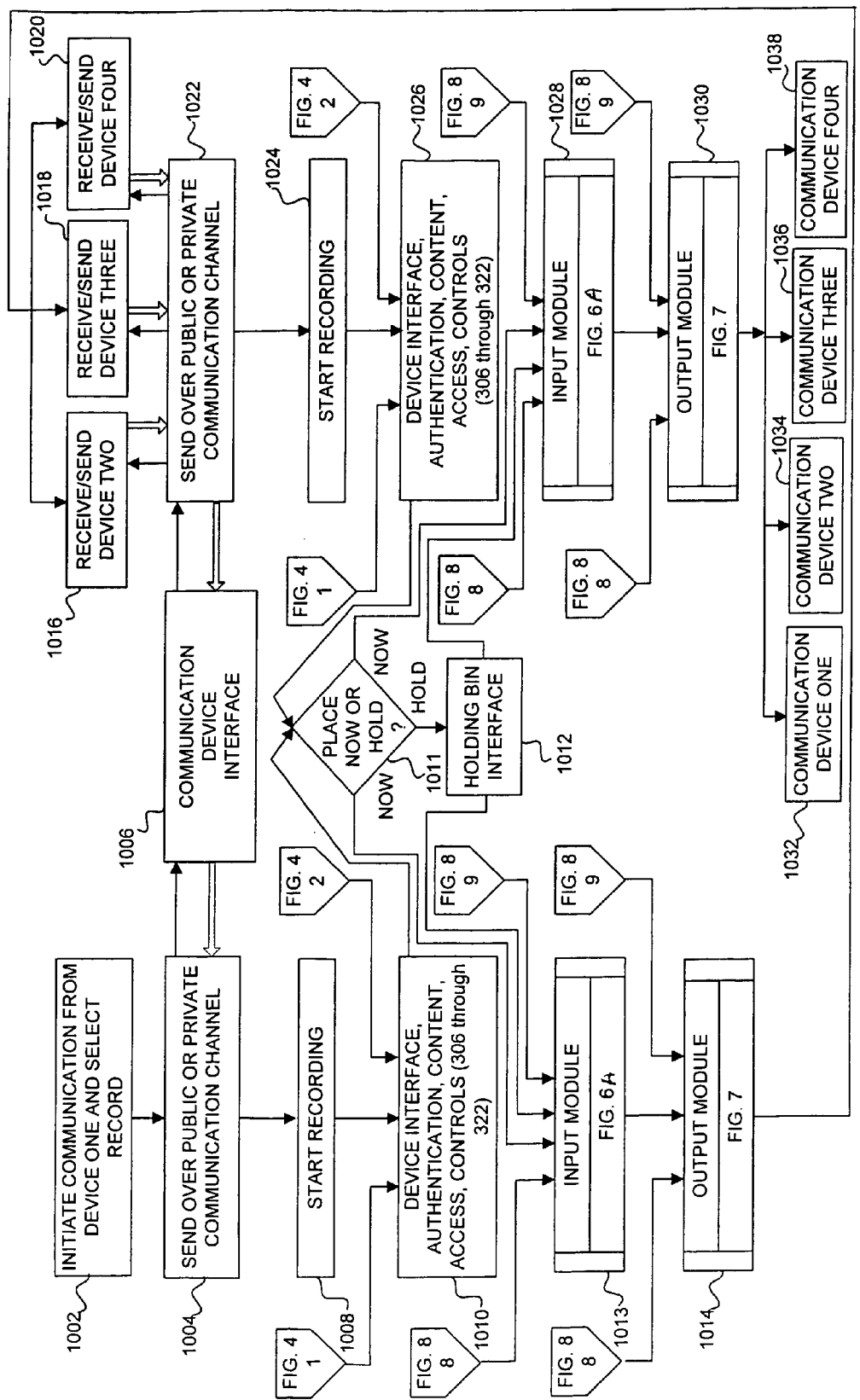
FIG. 10 shows a block flow diagram of an embodiment of recorded communications when a user is not accessing the application of the present invention.

FIG. 10 shows a block flow diagram of an embodiment of recorded communications when a user is not accessing the application of the present invention. The application is used as a recording mechanism for the multi-user, multi-threaded synchronized communication of the present invention.

Referring now to FIG. 10, a user initiates a communication from device one in step 1002. The communication is sent in step 1004 over a public or private communication channel putting device one in immediate communication with devices two, three, and four, such as by telephone or e-mail, and device two receives the communication in step 1016, device three receives the communication in step 1018, and device four receives the communication in step 1018. The user of device one may want the communication between himself and the users of devices two, three, and four to be captured in a topic area in the database, even though none of them are currently accessing the application. If their e-mails back and forth could be captured and posted to the database, then users five, six, seven, etc. who are accessing the application, could review their e-mail exchange as it is happening.

This is accomplished in step 1002 by the user selecting a record option from the communication device. For example, if the user in step 1002 is sending an e-mail, after typing the content and addressing the e-mail, the user selects a record option from a tool bar before clicking on the send button. A Recording Module, which may reside entirely on the communication device, or may be accessed from the application when the record option is selected from the tool bar, queries the application, causing the database to deliver to the user's device the current file structure of the database showing the headings, categories, and topics. The user would then click on the particular topic which the current communication should be associated. Alternatively, when the user does not know at the present time where he wants the current communication to go, the user can select a hold option. This communication will still be recorded, but held in a recording bin until the user, at a later time, determines which topic the communication should be associated After clicking on the send button, the communication channel is set up in step 1004 for direct communication to users two, three, and four, and simultaneously the e-mail is also being directly deposited in the application through a Recording Module that starts recording the communication in step 1008.

In another embodiment, when device one is a mobile telephone, the user can place a conference call where the application is one of the parties to the call. When the call is connected to the application, the Recording Module in step 1008 is activated and sends the current file structure to the user so that the user can select the topic area which the recorded communication should be associated, or select the hold option. Similarly, when device one is an Internet browser, special software may be loaded on the client device, or simply a cookie, that alters the e-mail program (such as Microsoft Outlook) to display a record button that the user clicks on to have the e-mail recorded in the application. In an alternative embodiment, database file structure updates could be sent periodically to the user's communication device such that the user does not have to query the application before selecting the topic area which the communication should be associated.

In step 1006, when required, a Communication Device Interface converts the communication from device one into the format required by devices two, three, and four. This may be necessary when the public or private communication channels of 1004 and 1022 are different communications channels, or, if they are the same communications channel, when device one is a mobile telephone, device two is a client computer, device three is a PDA, and device four is a pager.

After the Recording Module is activated in step 1008, step 1010 encompasses steps 306, 308, 310, 314, 316, 318, 320, and 322 described in FIG. 3. Step 1011 determines if the user selected the hold option, or if the communication can be placed now. If the hold option was selected, then in step 1012 a Holding Bin Interface tracks the communication until such time that the user designates a topic to associate the communication. Step 1013 calls the Input Module of FIGS. 6A and 6B, which receives the output of the Thread Synchronization Module of FIG. 8 so that the recorded communication, whether it is placed now or on hold, is synchronized with other threads. The user may choose to access the review module (not shown in FIG. 10) prior to Step 1014, which calls the Output Module of FIG. 7. The Output Module receives the output of the Thread Synchronization Module of FIG. 8. Content may be automatically output to one or more recipients, including being received by device two in step 1016, device three in step 1018, and device four in step 1020. The output could be sent to more users, but only three are shown for simplicity. Thus, the application has recorded the communication from a user at device one to three other users at three other devices, which could all be different devices, such as a mobile telephone, a PDA, an instant message, a pager, a client computer, etc.

The return communications (represented by the hollow arrows) are sent from device two (step 1016), three (step 1018), and four (step 1020) through the public or private communication channel in step 1022, to the Communication Device Interface in step 1006 when required, through the public or private communication channel in step 1004 to device one. The return communication may or may not be automatically recorded by the Recording Module in Step 1024 based on decisions made by the initiator, the content leaders, or the responder. Step 1026 encompasses steps 306, 308, 310, 314, 316, 318, 320, and 322 described in FIG. 3. Step 1011 determines if the user selected the hold option, or if the communication can be placed now. If the hold option was selected, then in step 1012 a Holding Bin Interface tracks the communication until such time that the user designates a topic to associate the communication. Step 1028 calls the Input Module of FIGS. 6A and 6B, which receives the output of the Thread Synchronization Module of FIG. 8 so that the recorded communication, whether it is placed now or on hold, is synchronized with other threads. The user may choose to access the review module (not shown in FIG. 10) prior to Step 1030, which calls the Output Module of FIG. 7. The Output Module receives the output of the Thread Synchronization Module of FIG. 8. Content may be automatically output to one or more recipients, including being received by device one in step 1032, device two in step 1034, device three in step 1036, and device four in step 1038. The output could be sent to more users than those shown. Thus, the application has recorded the communication response from three other users to a user at device one.

Figure 11:
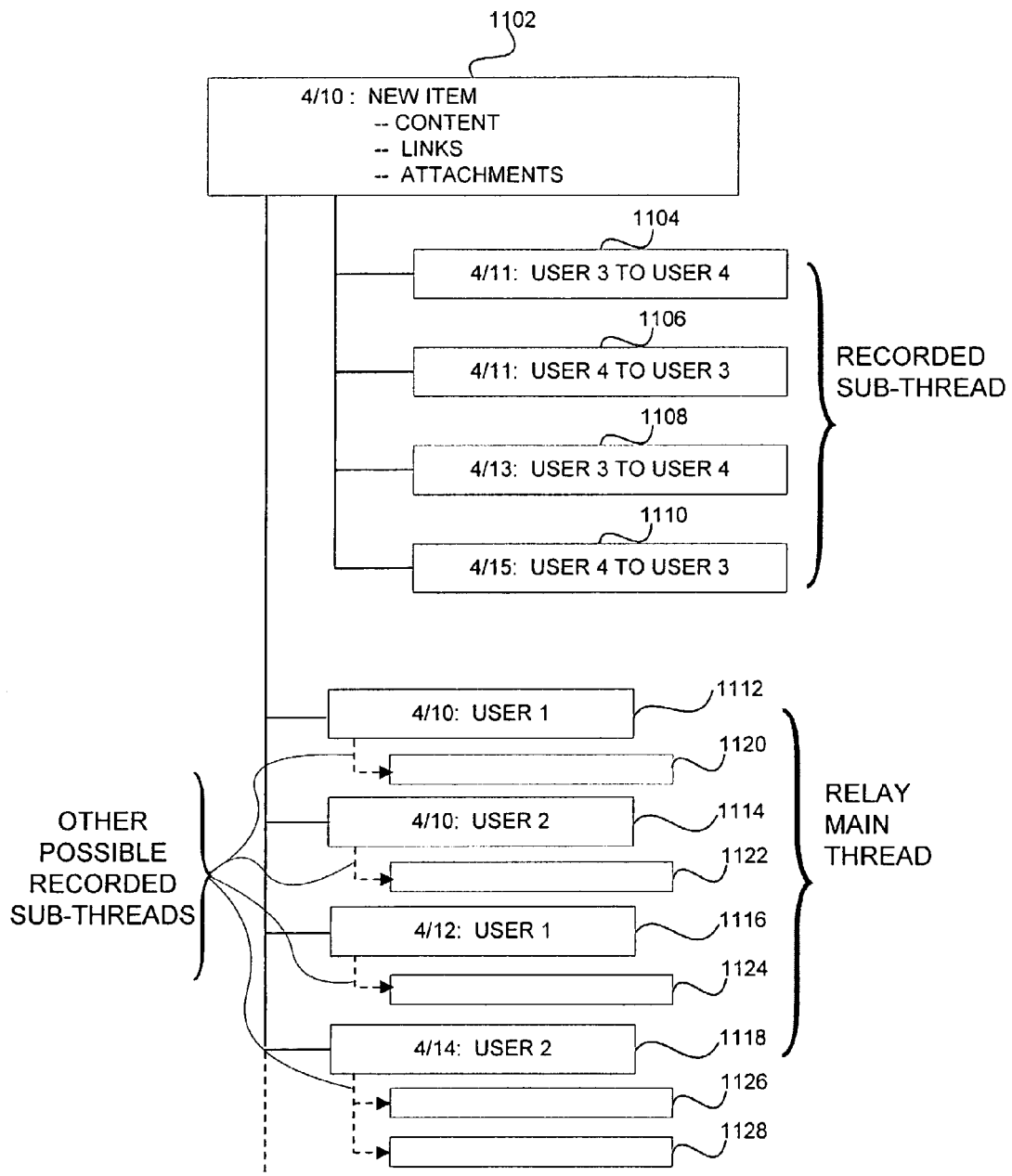
FIG. 11 illustrates the synchronization of relay communications with recorded communications of the present invention.

FIG. 11 illustrates the synchronization of relay communications with recorded communications of the present invention. Referring now to FIG. 11, when users are utilizing relay communications and recorded communications to access the application, the Thread Synchronization Module described in FIG. 8 synchronizes the multiple threads with different prioritizations. 1102 represents a new item that was posted to the database on April 10 which may have links and attachments. User one responded to the new item using relay communication on April 10 in 1112, and this response is prioritized as a main thread under new item 1102. User two responded to new item 1102 later in time than user one on April 10, and thus had access to review new item 1102 and user one's response 1112, before sending response 1114.

User three and user four received new item 1102 as an e-mail, and decided to utilize recorded communications in the application regarding their response to each other related to new item 1102. User three sent an e-mail response 1104 to user four on April 11. Since user three was not accessing the application, user three does not know of user one's response 1112 or user two's response 1114. Thus, the Thread Synchronization Module prioritizes user three's response as a sub-thread under new item 1102. On April 11, user four sent an e-mail response 1106 to user three. This response is also not threaded with all the other comments that are occurring about new item 1102 from users who are accessing the application utilizing relay communication and looking at all the responses previously made before sending their response.

On April 12, user one enters a response 1116 utilizing relay communications, having access to all responses made previously (1104, 1106, 1112, and 1114). On April 13 user three entered a response 1108 utilizing recorded communication, having access only to responses 1104 and 1106. On April 14, user two entered a response 1118 utilizing relay communications, having access to all responses made previously (1104, 1106, 1108, 1112, 1114, and 1116). On April 15, user four entered a response 1110 utilizing recorded communication, having access only to responses 1104, 1106, and 1108.

Thus, users three and four are in their own sub-thread loop, unaware of what users one and two are saying about new item 1102. However, users one and two are in a main thread, and are able to track what users three and four are saying as well as each other. Other possible recorded sub-threads 1120, 1122, 1124, 1126, and 1128 could occur under the main threads 1112, 1114, 1116, and 1118 should a user employ recorded communication.

Figure 12:
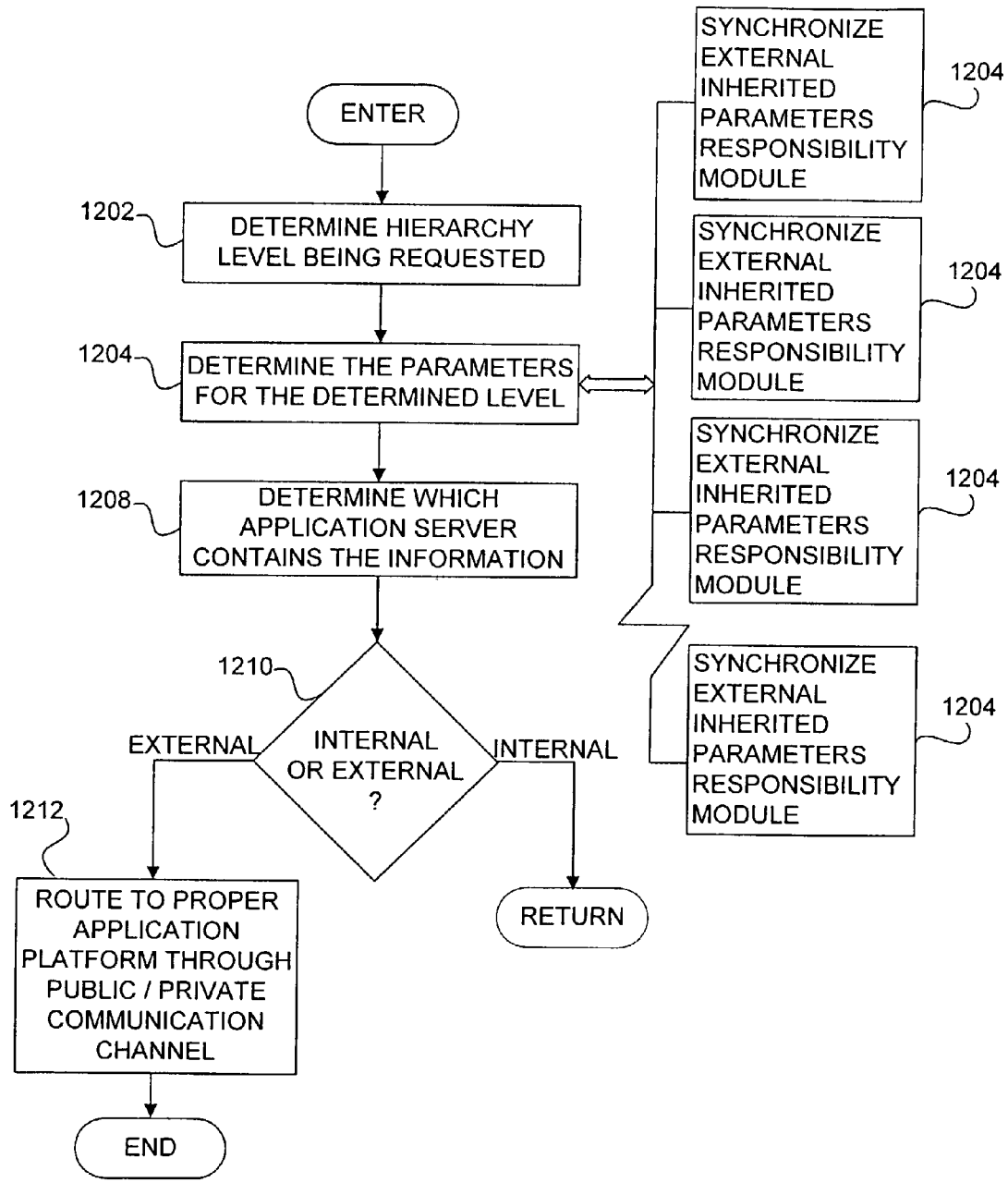
FIG. 12 shows a block flow diagram of an embodiment of the Inherited Parameters Synchronization Module utilized with a distributed application platform architecture of the present invention.

FIG. 12 shows a block flow diagram of an embodiment of the Inherited Parameters Synchronization Module utilized with a distributed application platform architecture of the present invention. The Inherited Parameters Synchronization Module is only needed when a distributed application platform architecture is utilized. Referring now to FIG. 12, after being called from step 309 of FIG. 3, in step 1202 a Hierarchy Level Request Module determines the level of hierarchy the user is trying to access (heading, category, topic). The Inherited Parameters Responsibility Module in step 1204 then determines who is responsible for that level of heading, category, or topic. There is a continuous synchronization between all of the Inherited Parameters Responsibility Modules in all of the devices in the system that have database responsibility. Updates can be sent to each device having database responsibility every time a change is made, or on a regular periodic basis.

Step 1208 determines which application platform has the database that contains the information the user is trying to access. Step 1210 determines if the present internal application platform and database the user has accessed has the desired information, or if the desired information is on an external application platform and database. If the present internal application platform and database has the desired information, then control returns to step 310 of FIG. 3. If step 1210 determines that an external application platform and database has the desired information, then in step 1212 the user is routed to the proper application platform and database through a public or private communication channel, and the verification and authorization process discussed above in FIG. 3 is performed on the new application platform.

Figure 13:
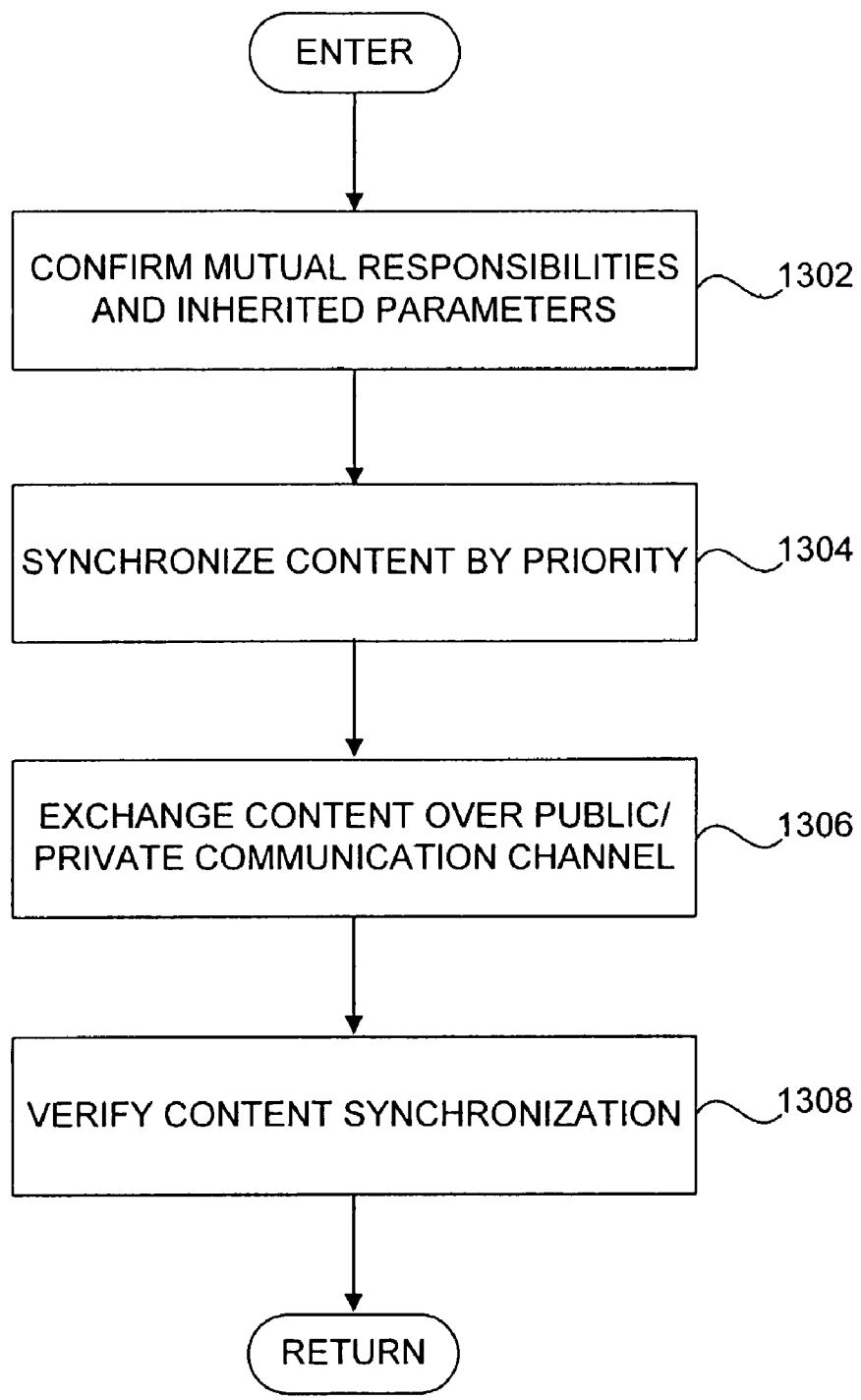
FIG. 13 shows a block flow diagram of an embodiment of the Content Synchronization Module utilized with a distributed application platform architecture of the present invention.
Figure 14:
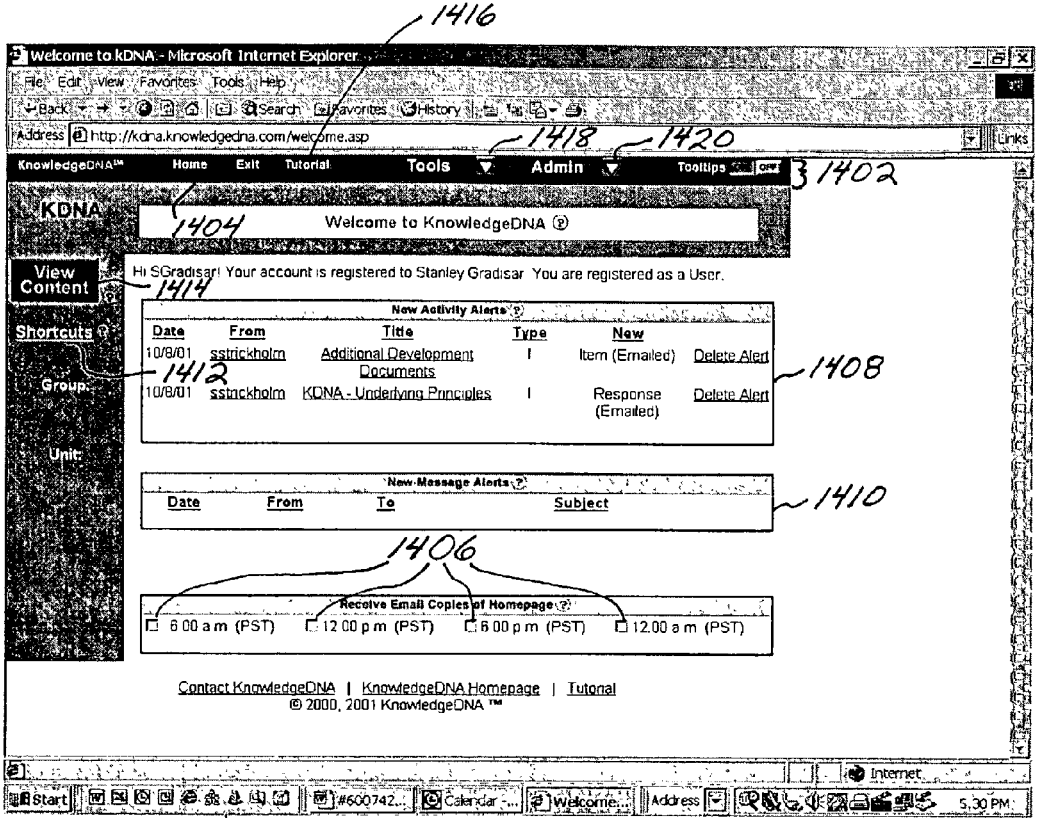
FIGS. 14-74 show representations of exemplary screen shots of Web pages delivered by a server computer that may be displayed through a Web browser on a display device of a client computer in an embodiment of the system and method for communication within a community of the present invention.

FIG. 13 shows a block flow diagram of an embodiment of the Content Synchronization Module utilized with a distributed application platform architecture of the present invention. The Content Synchronization Module is only needed when a distributed application platform architecture is utilized, and is only activated when changes are made. Referring now to FIG. 13, after being called from step 311 in FIG. 3, in step 1302 a Content Authentication Module authenticates the user that has accessed the application and local database from a remote device and database, confirms the responsibilities the user has, and verifies the inherited parameters associated with the user. In step 1304 a Content Priority Synchronization Module synchronizes the content that the user has at the remote device and database with the content of the local database according to priority criteria. A Content Exchange Interface in step 1306 sets up the interface through the public or private communication channel and exchanges content between the remote and local databases so that the two databases are now synchronized. In step 1308 a Content Synchronization and Verification Module then verifies the synchronization. Control then returns to step 310 in FIG. 3.

FIGS. 14-63 show representations of exemplary screen shots of Web pages delivered by a server device that may be displayed through a Web browser on a display device of a client device of the system and method for communication within a community of the present invention. The present invention helps users within a community to innovate, share knowledge, and make decisions in a dynamic environment. Unlike regular e-mail, each user can instantly see what all other users are thinking. Unlike traditional chat rooms or message boards, content is well organized and archived for future use. Users are able to share their best ideas with each other, save time by re-using each others experience, make better and faster decisions, communicate with customers and other outside partners, and protect and save knowledge for future use.

Referring now to FIGS. 14-63, FIG. 14 shows Home Page 1400 that every user may personalize. Access to Home Page 1400 from any of the screens displayed is accomplished by clicking on the Home Link 1404 in Tool Bar 1402 at the top of each page.

A user can choose to receive e-mail copies of Home Page 1400 by clicking on any of the four Time Boxes 1406. The contents of Home Page 1400 is then automatically e-mailed to the user on a regular basis. This saves the user the time it would take to have to access the application to check on new activity. Instead the user can easily review the status of the user's Home Page 1400 from the user's e-mail browser.

Each user can request the application to continuously scan for new activity of interest to the user by section or even by a particular user. New Activity Alerts 1408 displays the new alerts. The user may click on these links and be taken directly to the Item with the new activity. Setting up Activity Alerts is requested when the user posts a new Item or Response by clicking on Alert Me/Alert Others when reviewing an Item (see FIG. 48), or by clicking on the Alerts Button from a pull down Tools menu in Tool Bar 1402 at the top of the page (see FIG. 20).

New Message Alerts 1410 shows any messages that have been sent to the user. The user can send an instant message to any other user's Home Page by clicking on the Alerts Button from a pull down Tools menu in Tool Bar 1402 at the top of the page (see FIG. 20).

Figure 15:
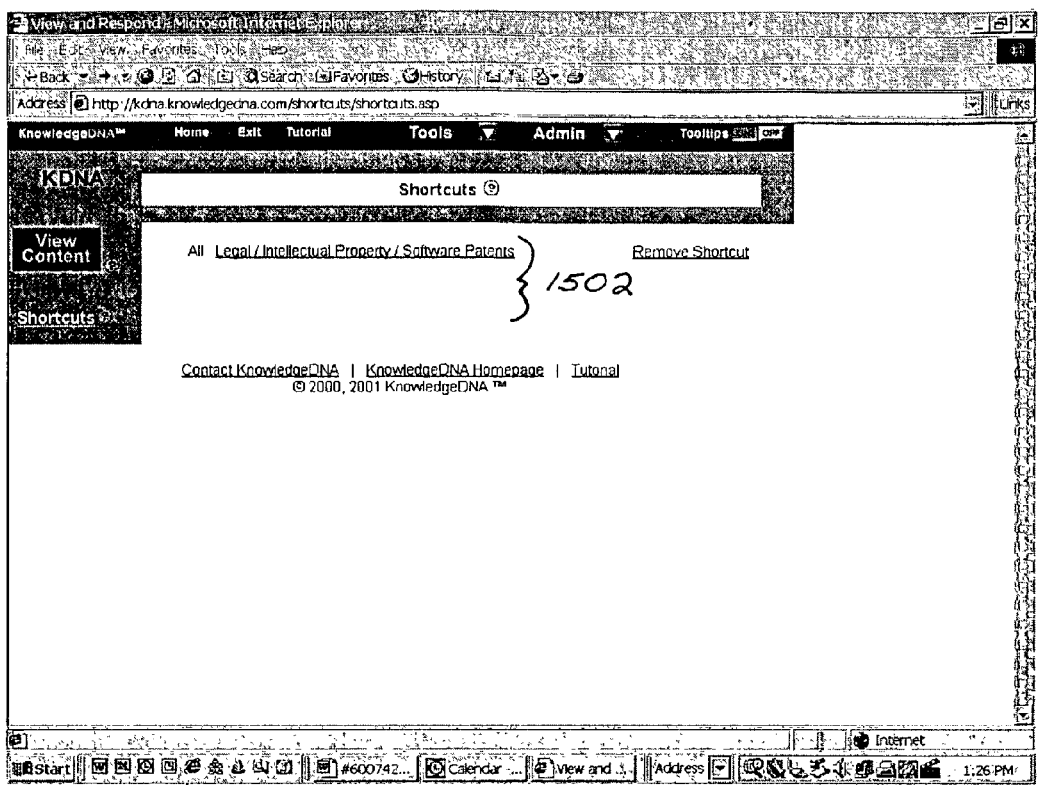

Clicking on Shortcuts Link 1412 returns Shortcuts Page 1500 shown in FIG. 15. All of the Shortcut Links 1502 that the user has established to date are listed. Shortcut Links 1502 are like Favorites or Bookmarks. While in a Topic area (see FIG. 33), the user can click on Add to Shortcuts 3354 to create a one-click navigation short-cut back to that spot. Thus, clicking on any of the Shortcut Links 1502 returns the user to the page where the link was established.

Figure 16:
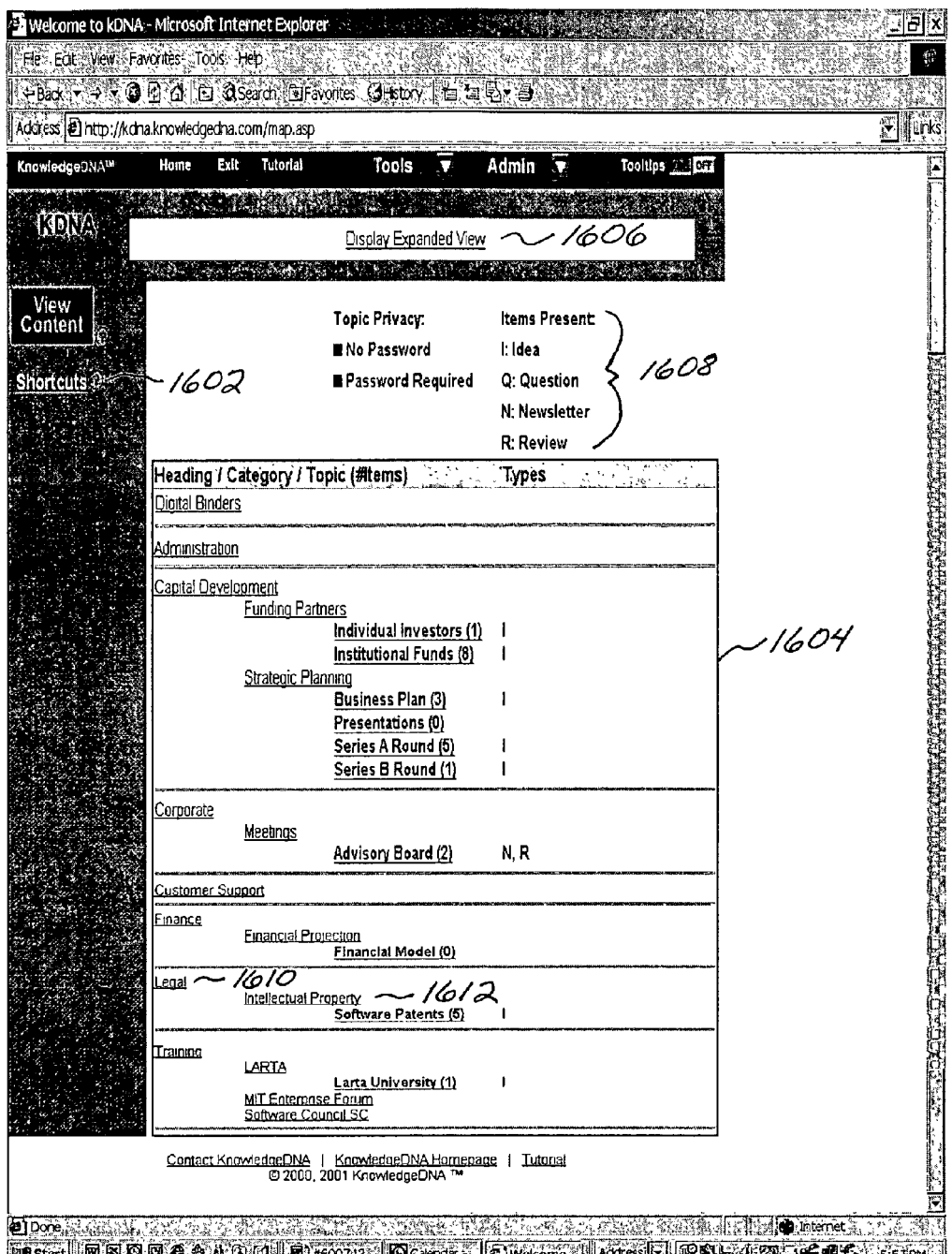

Clicking on the View Content Button 1414 returns Navigation Page 1600 shown in FIG. 16. By showing the complete outline, users can click on any of the Headings, Categories, or Topics to immediately view Items in that area. If a Topic is password protected, its letters may be displayed in a certain color, such as red, or displayed in a different font size or type to help distinguish between non-password protected Topics. Non-password protected Topics may be displayed in a different color, such as green, or displayed in a different font size or type to help distinguish between password protected Topics. Users must use a password to enter password restricted Topic areas.

Items Present Key 1608 indicates that there are currently four different types of Items present, each of which can contain a discussion thread. Ideas allow rating and group feedback on the validity of an emerging concept. Questions create a forum for asking questions and capturing solutions community-wide. Newsletters provide real-time RSVP's, pre-meeting documents and discussion, plus information on events. Reviews record agreement or non-agreement by members and their responses to proposed courses of action. Not yet present are Events, Surveys, and Action Items.

All seven types of Items can allow 1) response and discussion threads, 2) links to other Items in the database, 3) links to Internet sites and 4) attachments that help explain a person's position (spreadsheet, text, slide show, Adobe Acrobat, graphic files, etc.). In addition, a user can change a previous rating, RSVP, or agreement at any time, which creates real time feedback for all Items.

Figure 17:
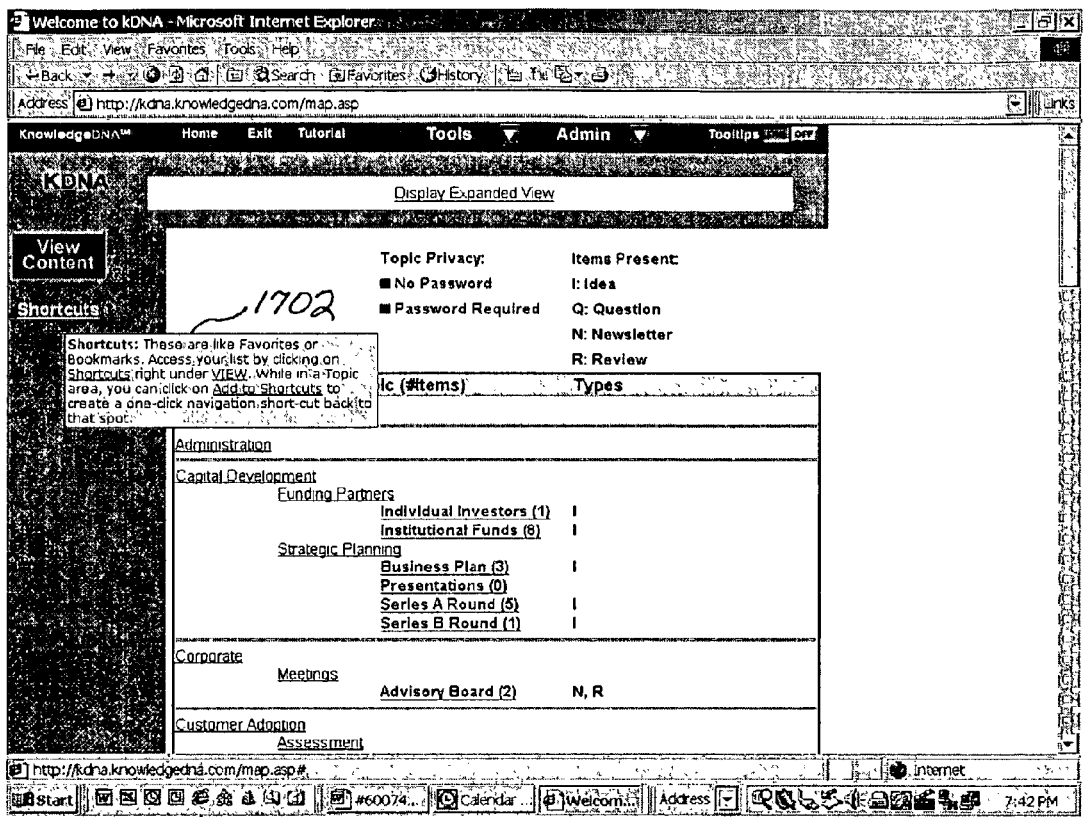
Figure 18:
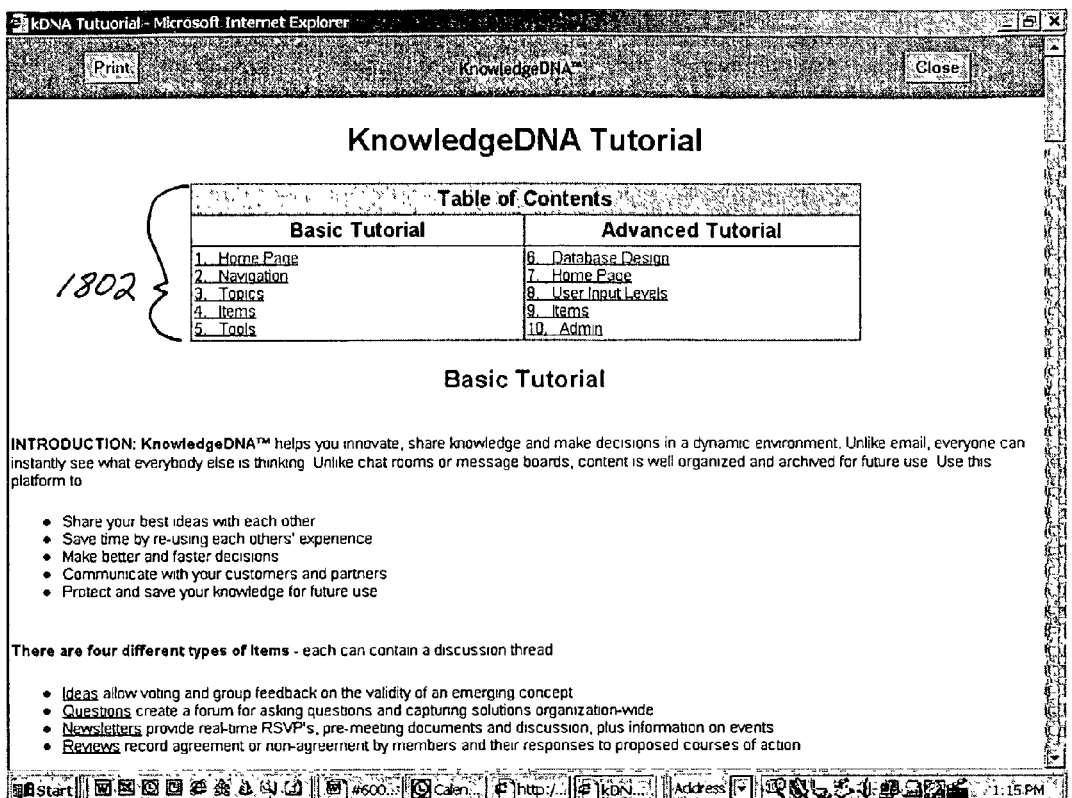

Moving the mouse pointer over any of the question marks displayed on the various pages, such as Question Mark 1602, pops up a help window, such as Help Window 1702 shown in FIG. 17. Clicking on Tutorial Link 1416 in Tool Bar 1402 returns Tutorial Page 1800, shown in FIG. 18, to the user's web browser. Clicking on any of the Table of Content Topics 1802 will jump to the portion of the web page where that topic begins.

Users may choose between two different viewing outlines: basic view and expanded view. The Basic View 1604, as shown in Navigation Page 1600, shows the Headings, Categories, Topics and number of Items per Topic. It also shows the different types of Items currently residing in each Topic. Basic View 1604 accommodates quick navigation.

Figure 19:
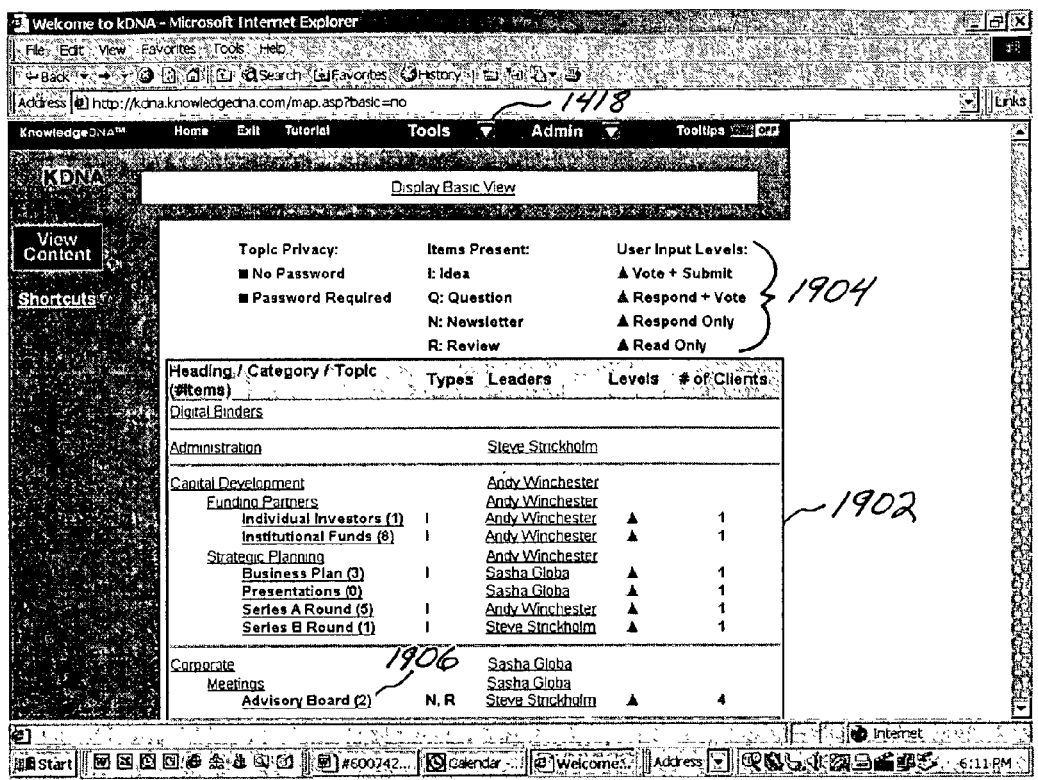

By clicking on Display Expanded View 1606 Navigation Page 1600 is displayed in expanded view as shown in FIG. 19. Expanded View 1902 shows the basic view plus the Leaders for each area, the number of Clients per Topic and the User Input level (read/write ability) for each Topic utilizing User Input Levels Key 1904. The user input level symbols are color coded. Expanded View 1902 accommodates more thorough research and Topic selection.

Figure 20:
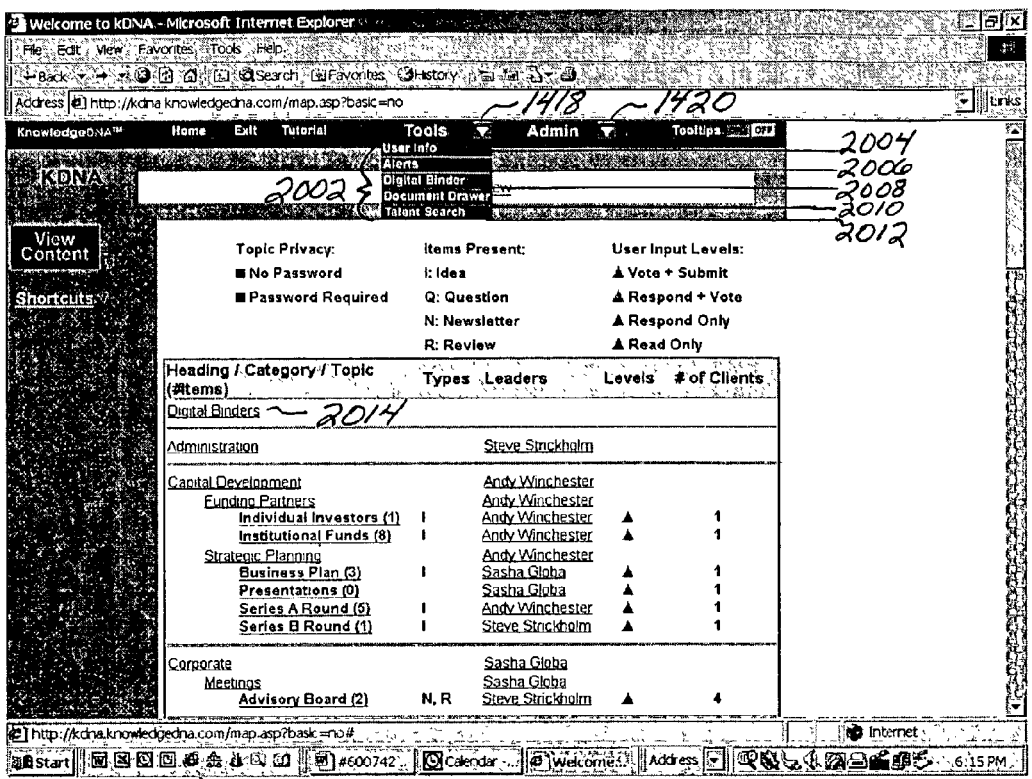
Figure 21:
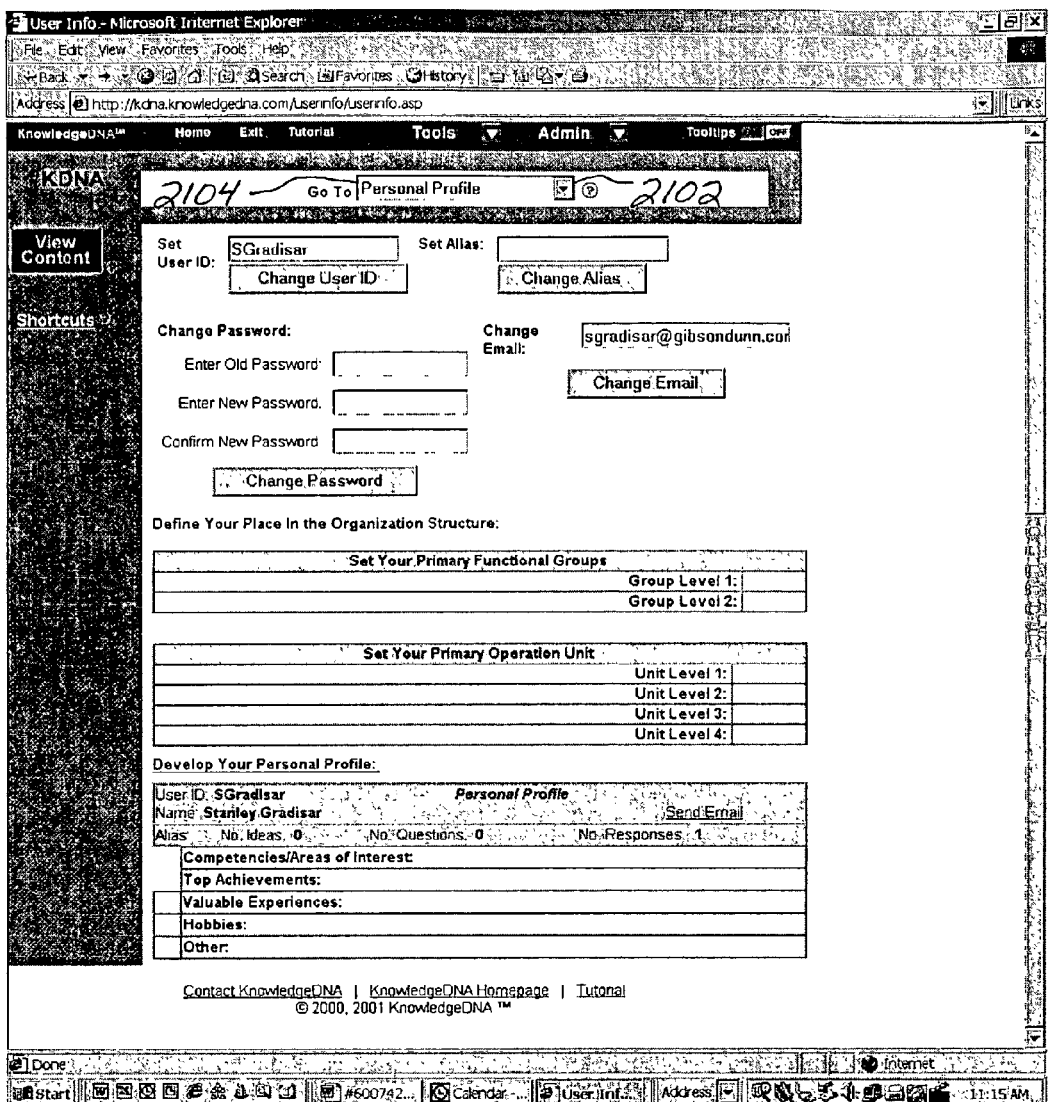
Figure 22:
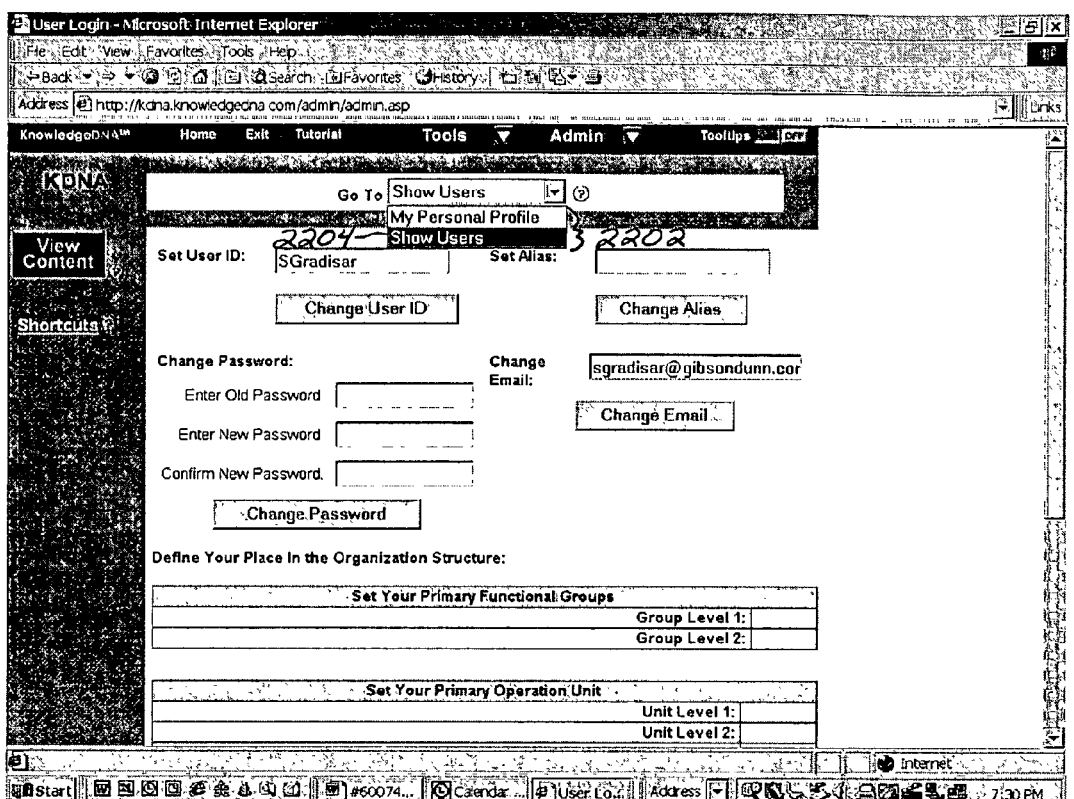
Figure 23:
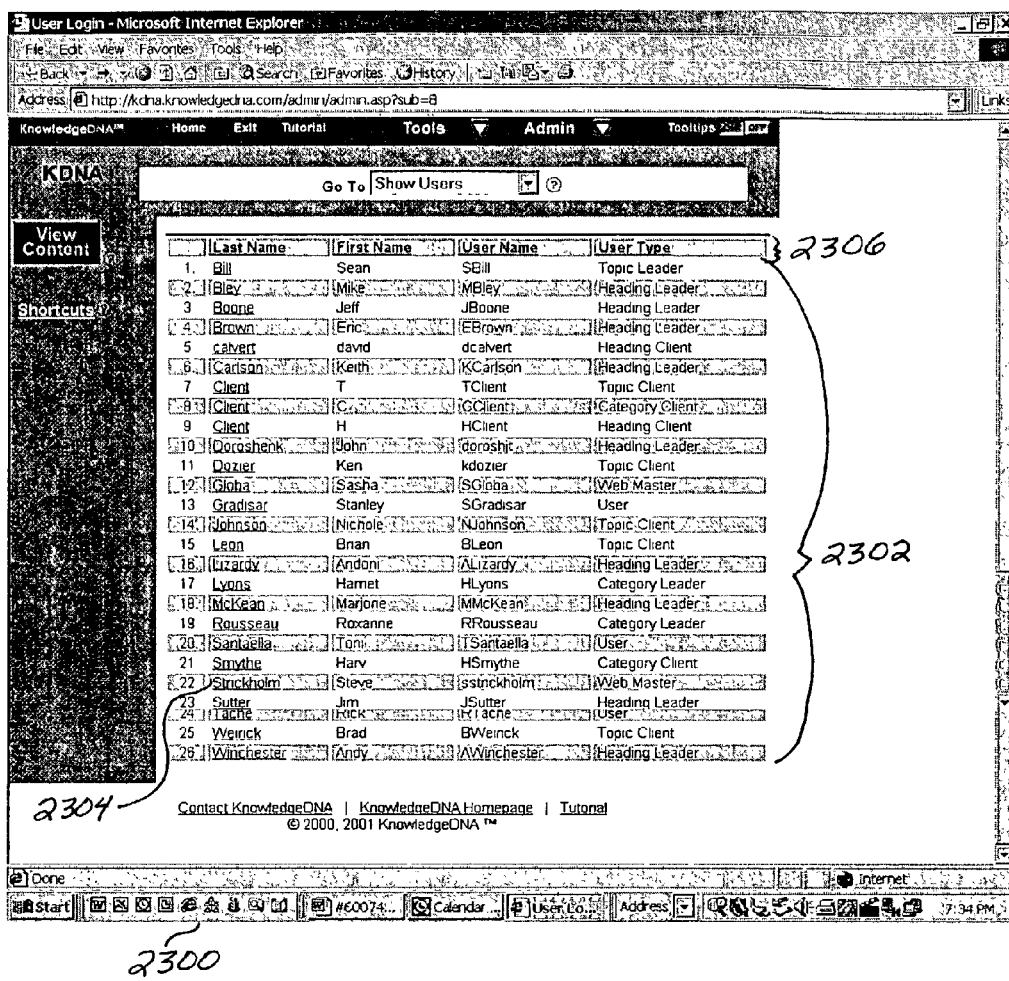
Figure 41:
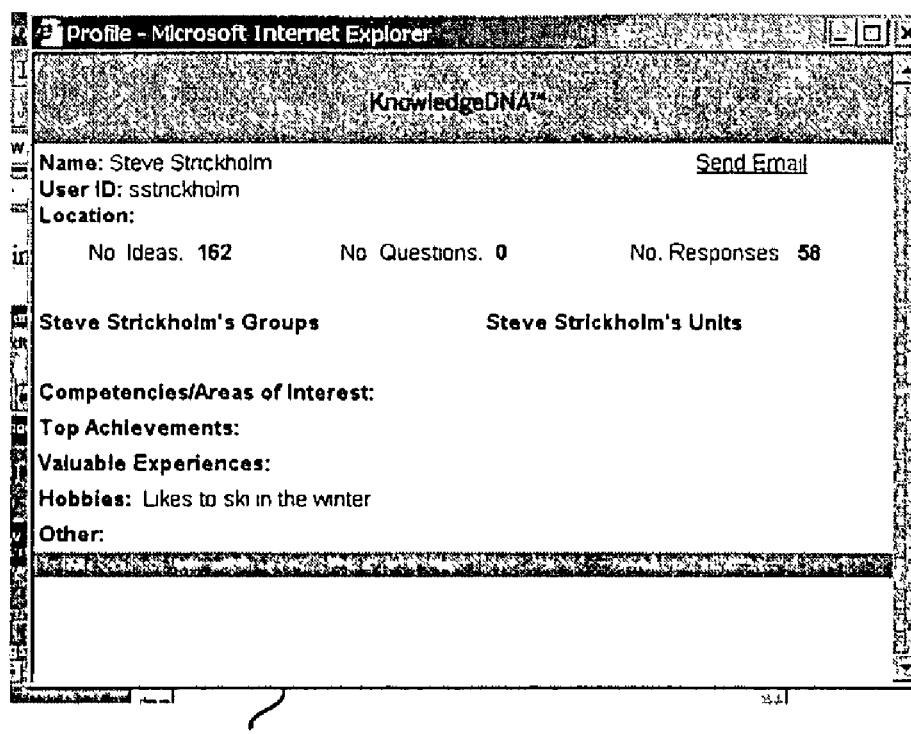

Moving the mouse pointer over Tools Down Arrow 1418 displays Drop Down List 2002 as shown in FIG. 20. Clicking on User Info Link 2004 returns User Info Page 2100 as shown in FIG. 21. This displays the user's Personal Profile and allows the user to change user ID, change alias, change password, change e-mail address, and define the user's place in the community. The user may include a photo or information about the user that other users may find of value or interest. Clicking on Go To Down Arrow 2102 of Go To Navigation Bar 2104 reveals Pull Down Menu 2202 shown in FIG. 22. Clicking on Show Users Link 2204 returns Show Users Page 2300 as shown in FIG. 23. User List 2302 shows the current registered users. Clicking on any last name link in User List 2302, such as Strickholm Link 2304 will return Profile Pop Up Window 4100 as shown in FIG. 41, which displays the personal profile of the user selected. Clicking on any of the Column Headings 2306 will sort User List 2302 alphabetically by that parameter.

Figure 24:
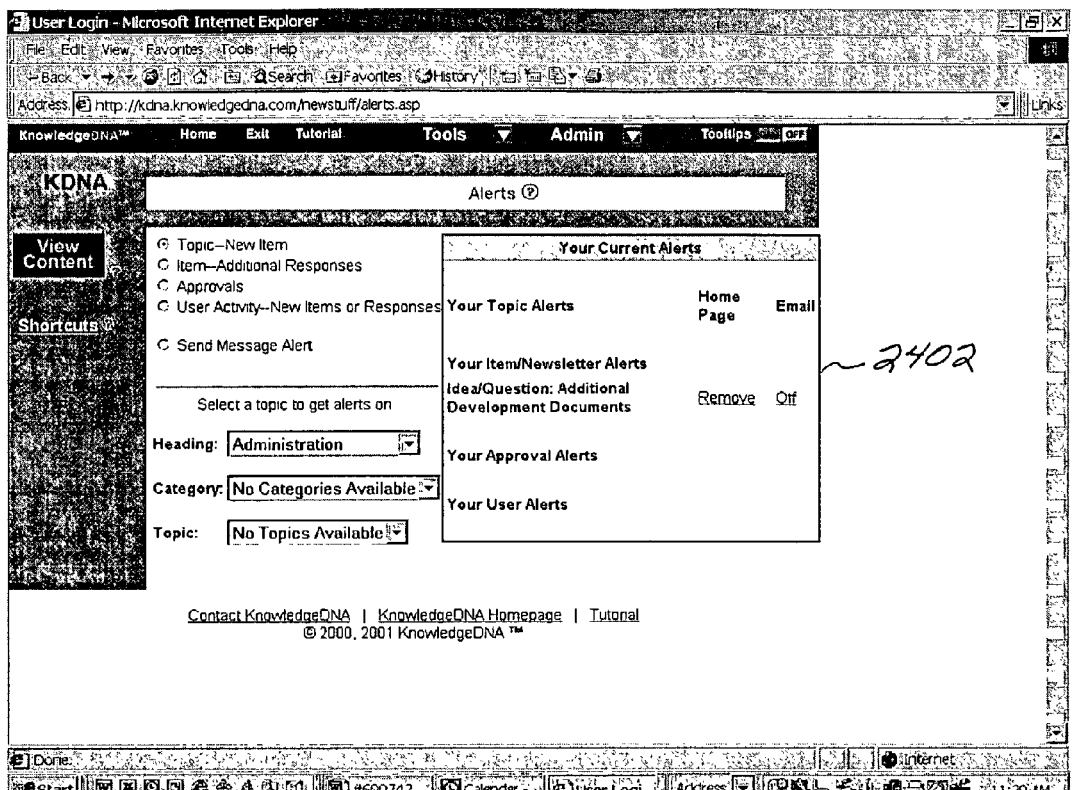

Clicking on Alerts Link 2006 returns Alerts Page 2400 as shown in FIG. 24. Alerts are utilized by users who want to visit the application to check out new and important content to the user. Your Current Alerts Box 2402 shows the user the current alerts the user has established. The user can also set up new alerts to important activity—by Topic, Item, Approvals, or even activity by certain specific users. These Alerts can be sent to the user's homepage or immediately to the user's e-mail inbox.

Alerts, besides being sent to the user, can also be sent to others. Alerts to others may be related to Items or responses that are sent via an e-mail or other communication channels that includes a link back to the application. The person alerted can then review the content and if they wish to respond, access the application and contribute their ideas. By creating a central record of knowledge sharing, all user's best ideas get leveraged throughout the community.

Figure 25:
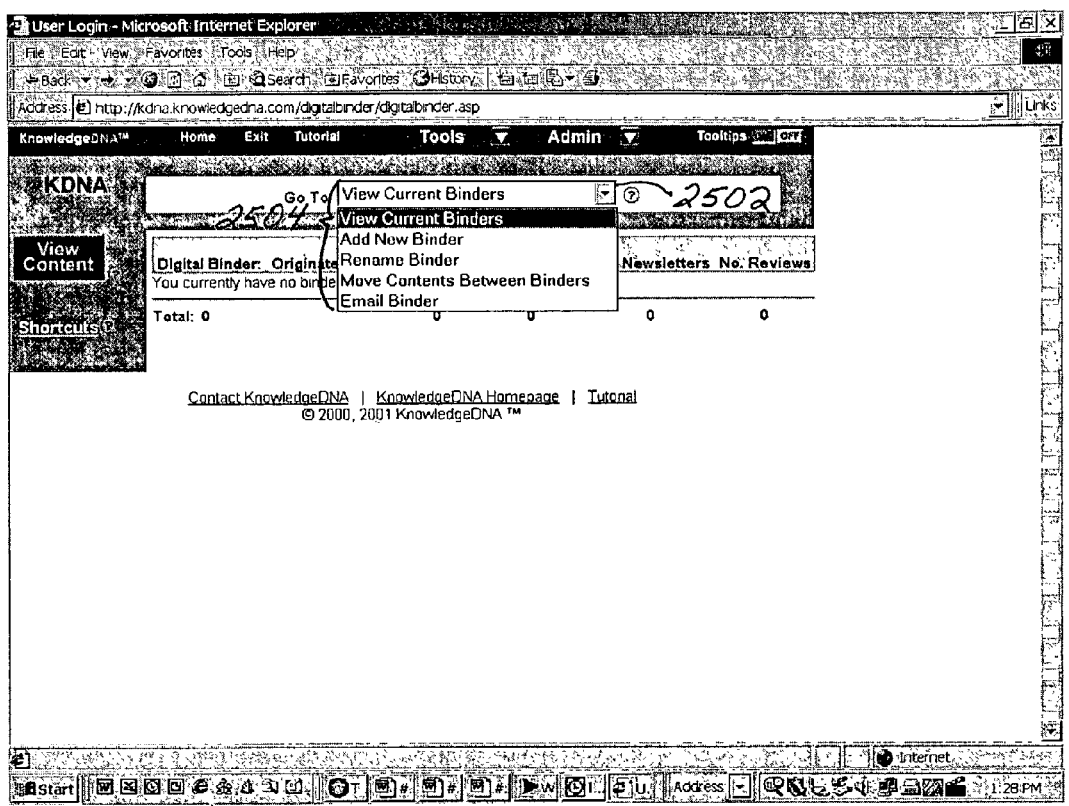

Clicking on Digital Binder Link 2008 or Digital Binders Heading 2014 returns Digital Binder Page 2500 as shown in FIG. 25. Go To Down Arrow 2502 has been clicked on revealing Pull Down Menu 2504 from which the user can set up personal digital binders. From Pull Down Menu 2504 the user can view current digital binders, add new digital binders, rename existing digital binders, move contents between digital binders, and send the digital binder to someone via e-mail or some other form of communication. When viewing a particular Item, the user may click on Add to Digital Binder to copy that Item to one of the user's Digital Binders (see FIGS. 49 and 53). As a user navigates through the database, the user may select important Items from different Topics and place them together in the same Digital Binder. The Items remain dynamically linked—allowing the user to rate, respond, etc. from within the Digital Binder. The contents of the Digital Binders stay continuously updated in the database.

Figure 26:
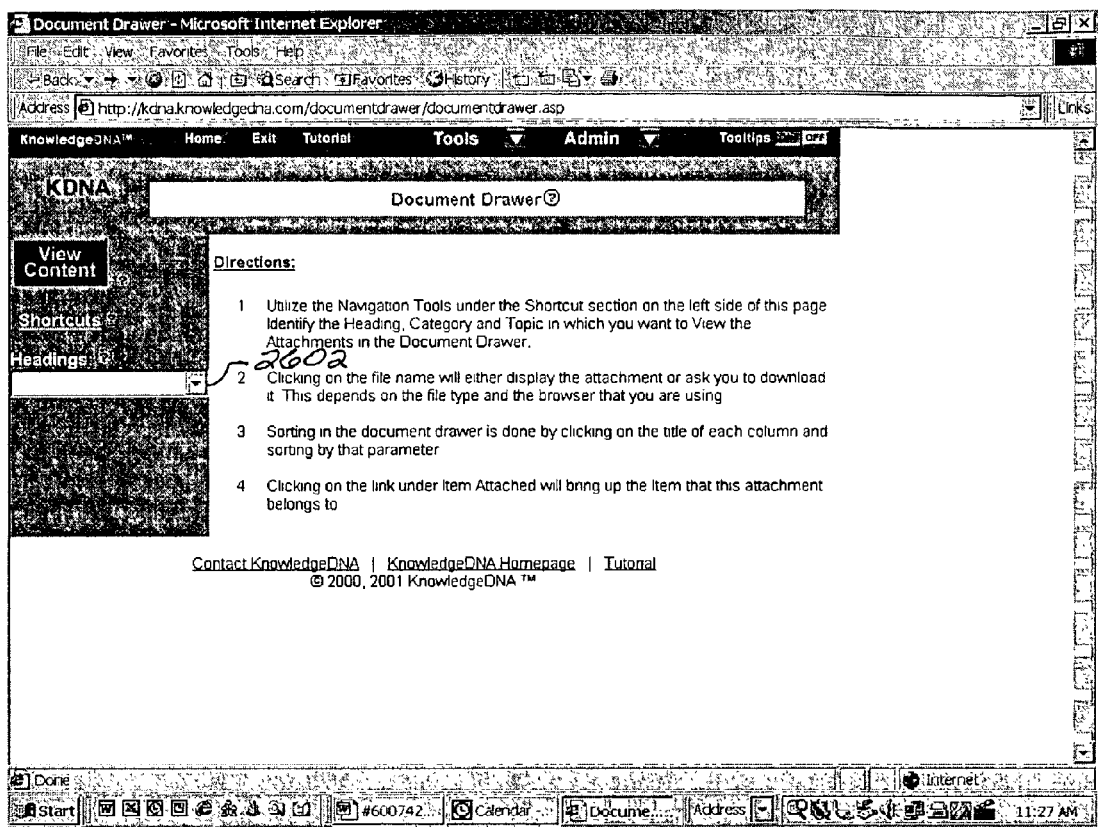

Clicking on Document Drawer Link 2010 returns Document Drawer Access Page 2600 as shown in FIG. 26. Clicking on Headings Down Arrow 2602 displays a pull-down menu (see FIG. 34) where the user can select a Heading, Category, and Topic for which the user wants to view all of the Documents or Attachments that have been associated with the current selection.

FIG. 27 shows a sample Document Drawer Page 2700 where a user has selected the Heading "Legal", the Category "All Categories" and the Topic "All Topics" which displays Document Drawer 2702. Items which have been archived are shown, as well as any Documents in password protected Topics which require a password to view and access. Clicking on the name of a file will either display the attachment or download it. Sorting in Document Drawer 2702 is done by clicking on any of the Column Headings 2704, which sorts Document Drawer 2702 by that parameter. Clicking on a link in the Attachment/Document column of Column Headings 2704 will retrieve the Item that the attachment/document belongs to.

Figure 28:
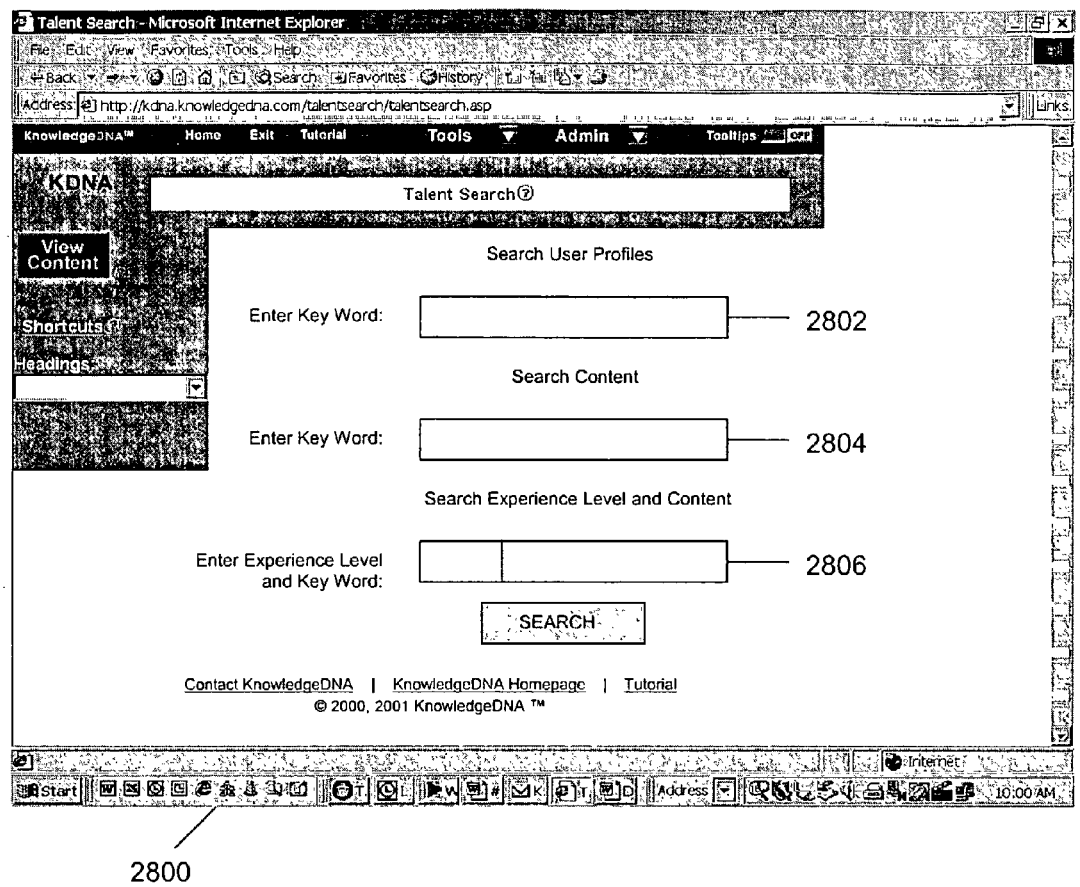

Clicking on Talent Search Link 2012 returns Talent Search Access Page 2800 as shown in FIG. 28. This page is a tool which enables a user to identify other users who are experts in a particular subject. Talent search goes beyond a traditional user profile based expert identification by offering the user several options by which to perform the search: Search User Profiles Bar 2802 allows the user to enter a key word that is searched against the user profiles, which include personal background, work experiences, etc.). Search Content Bar 2804 allows the user to enter a key word that is searched against the entire content of the database (ideas, responses, documents, etc.). Search Experience Level and Content Bar 2806 allows the user to enter a desired experience level and a key word. Users can self-rate their level of expertise on a particular item or topic, which is then applied as a weighting factor to voting/rating of an item. Users are then able to contact an expert directly through either internal messaging, e-mail, or other communications channels.

Figure 29:
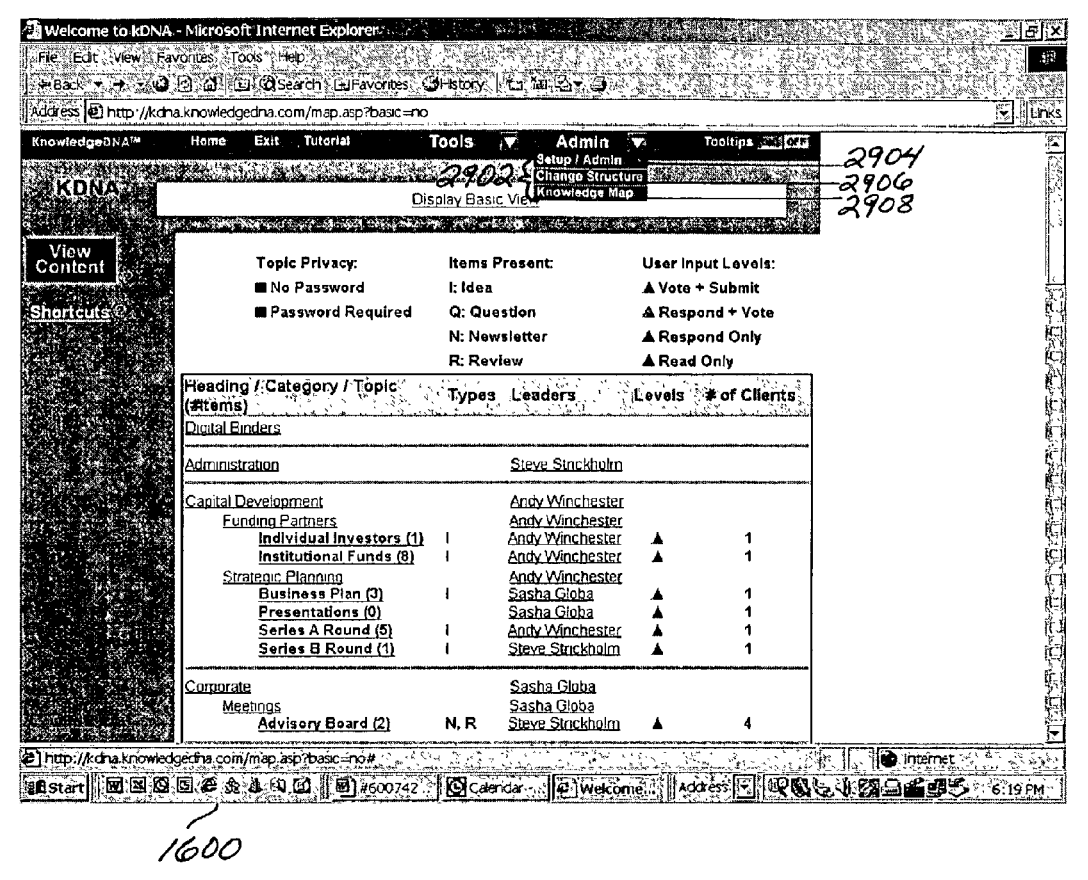
Figure 30:
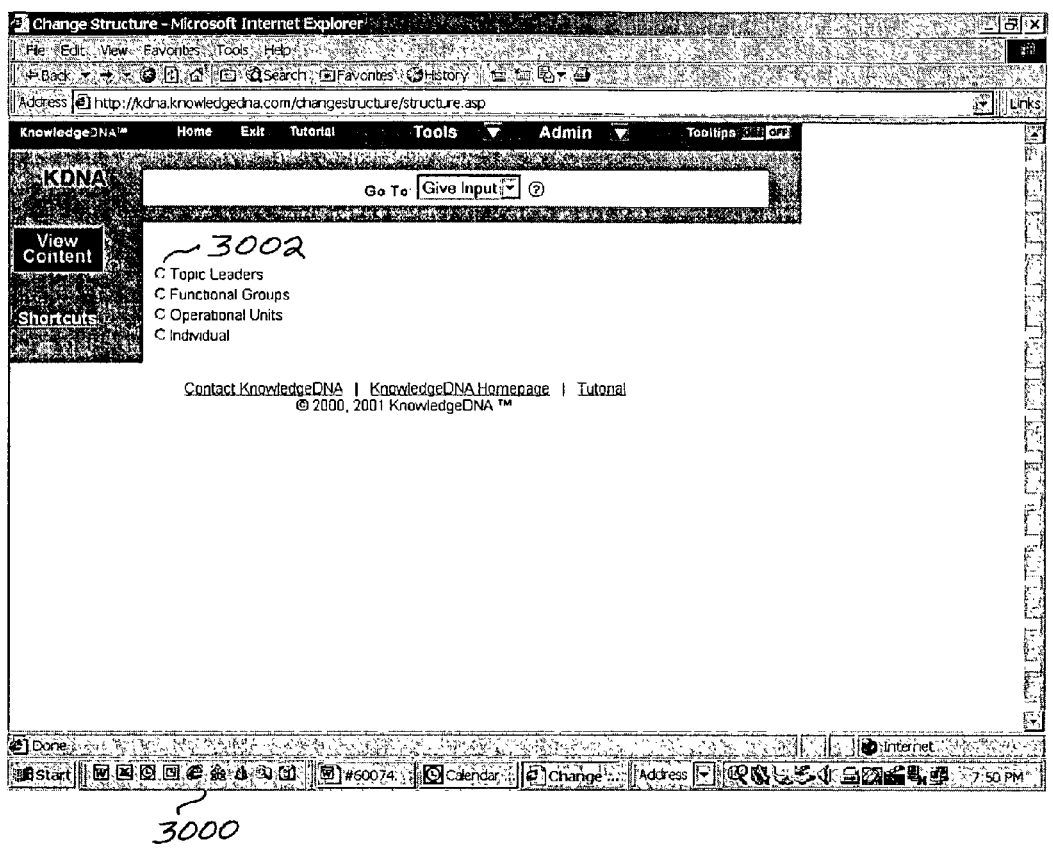
Figure 31:
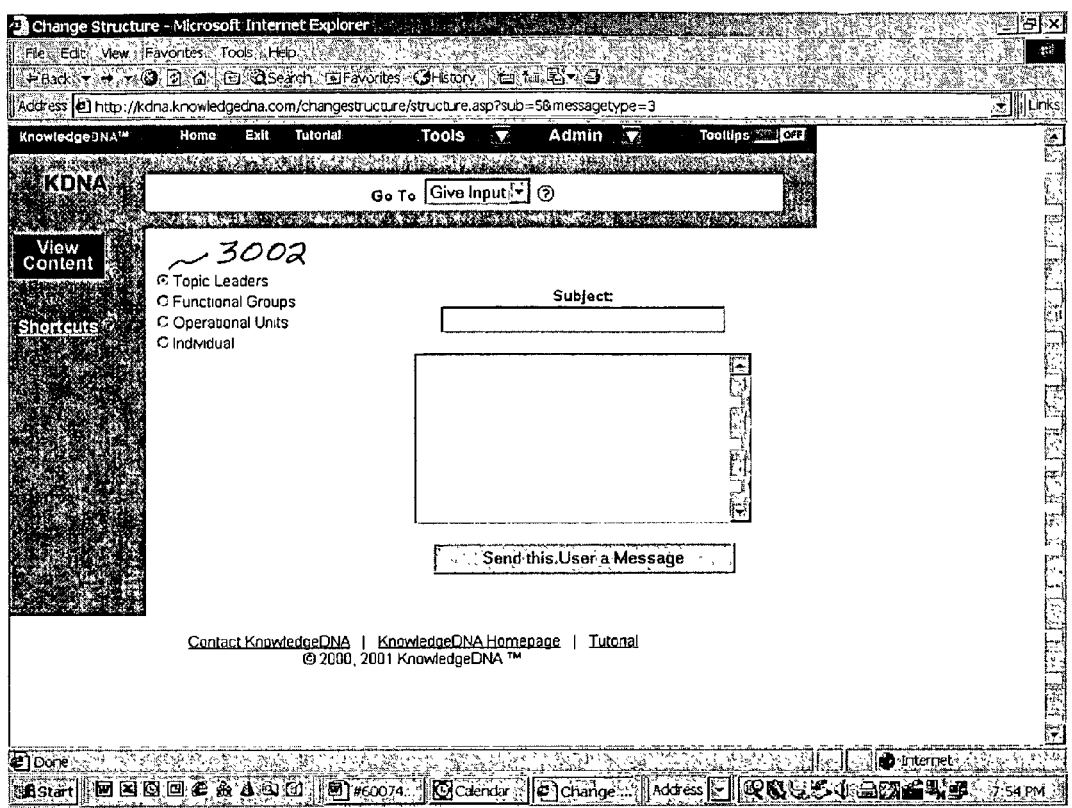
Figure 63:
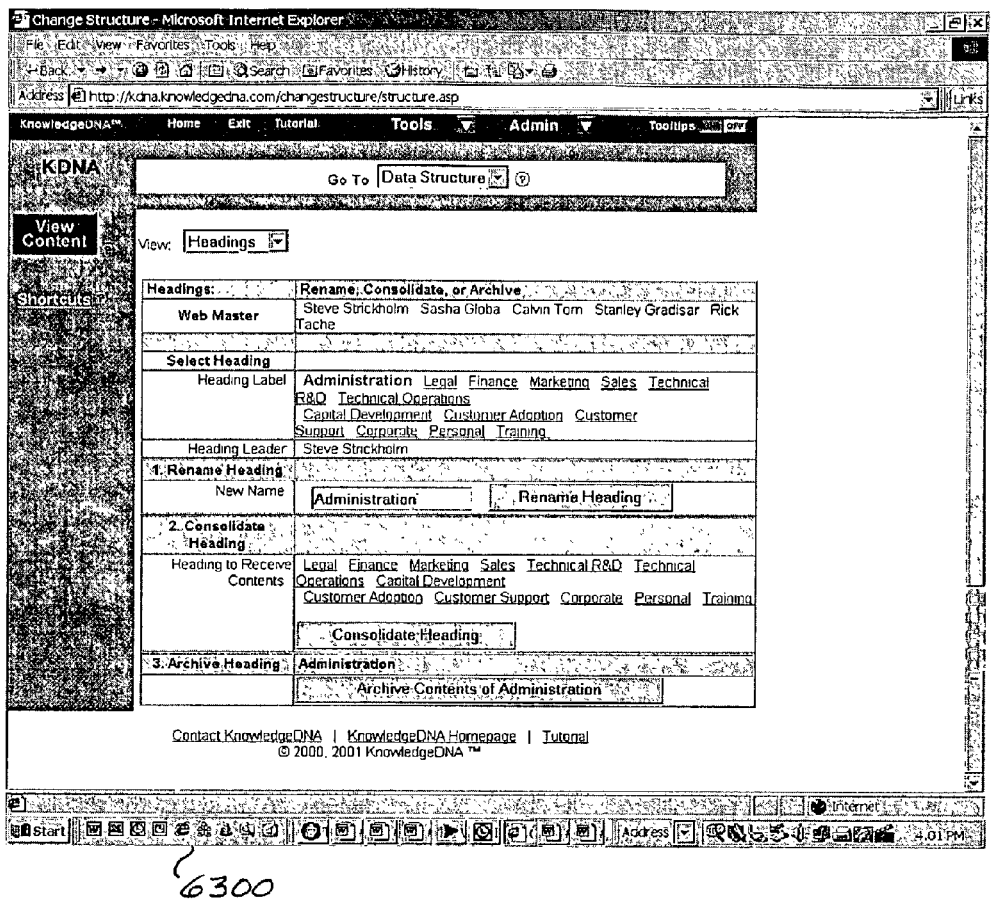

Moving the mouse pointer over Admin Down Arrow 1420 displays Drop Down List 2902 as shown in FIG. 29. For a user, Clicking on Setup/Admin Link 2904 returns User Info Page 2100 as shown in FIG. 21. Clicking on Change Structure Link 2906, if you are a user, returns Change Structure Page 3000 as shown in FIG. 30, and returns Change Structure Page 6300 as shown in FIG. 63 if you are a Web Master. The user has no access to any functionality that will allow changes to the database in Change Structure Page 3000, but can give input. Clicking on Topic Leaders Radio Button 3002 returns Give Input Page 3100 as shown in FIG. 31 allowing the user to send a message alert. Similarly, by clicking on any of the other radio buttons, the user may give input for the particular group or individual.

The Web Master, however, can change the structure of the database from Change Structure Page 6300. Heading Leaders, Category Leaders, and Topic Leaders have descending authority to change the structure from the Change Structure Page that is returned to them after clicking on Change Structure Link 2906.

The database in this embodiment of the invention has a three-level hierarchy—Headings, Categories, and Topics. The Web Master creates the Headings and assigns the Heading Leaders. The Heading Leaders then create the Categories and assign the Category Leaders. The Category Leaders then create the Topics and assign the Topic Leaders. The Topic Leaders each supervise their particular Topic areas. All seven Item types may be placed within any give Topic area.

Three different groups can use the application: Content Leaders, Users, and Clients. Content Leaders are in charge of certain areas of the database. They have "Inclusive Membership" meaning that they can go anywhere except those areas that are password protected. Users are not in charge of any areas but they can also go anywhere except where password protected. Clients have "Exclusive Membership" meaning that they can only enter those areas where they have been explicitly assigned.

Figure 32:
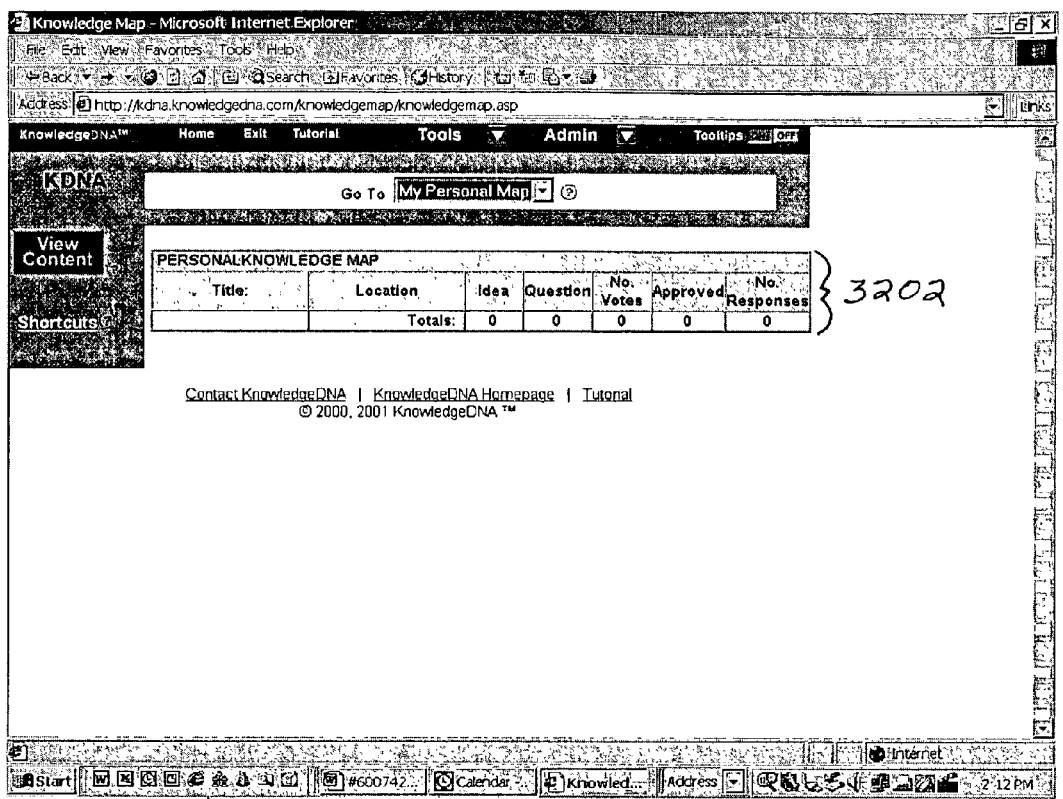

Clicking on Knowledge Map Link 2908 returns Knowledge Map Page 3200 as shown in FIG. 32. This page shows in Personal Map 3202 how many Items, Responses, etc. have been contributed by the user in each of the different areas.

Figure 33:
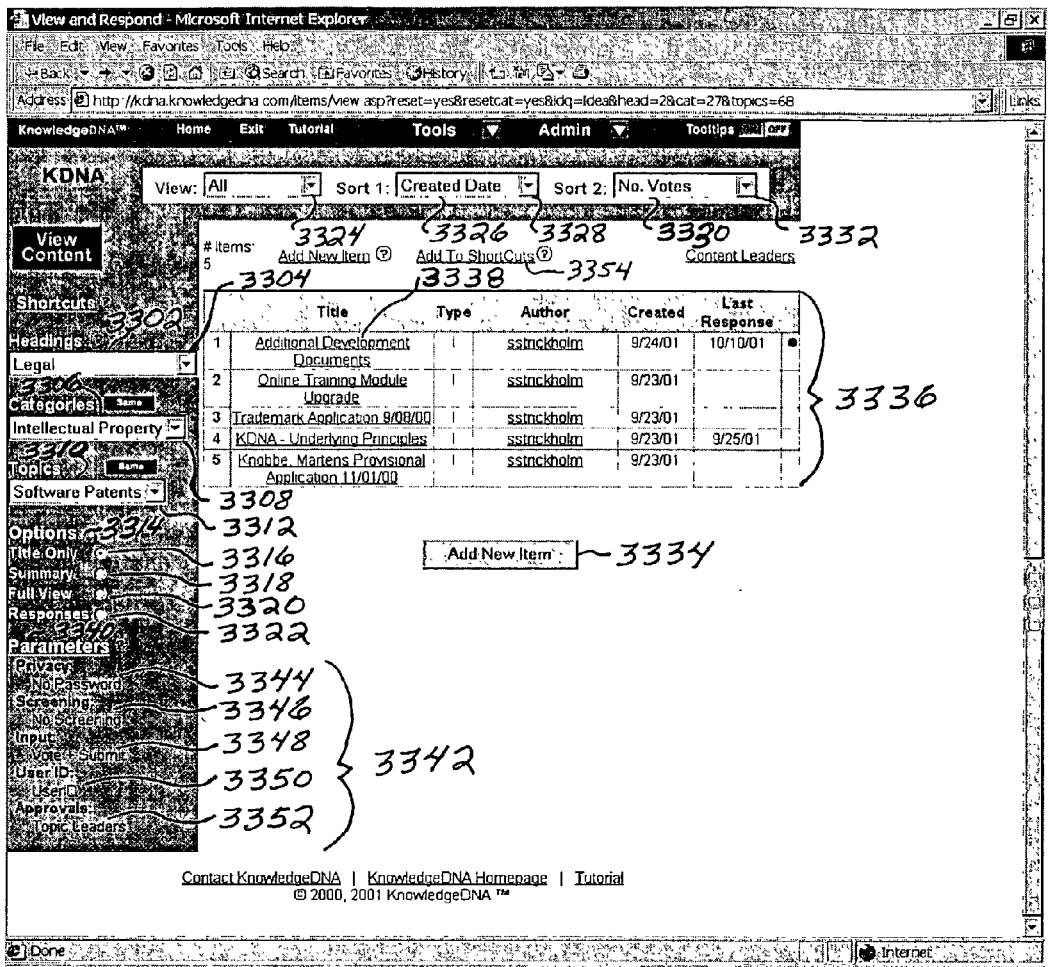

Clicking on Intellectual Property Link 1612 returns Topics Title Page 3300 as shown in FIG. 33. Topics List 3336 in this page shows the titles of all of the Topics that have been captured under the Heading "Legal" and the Category "Intellectual Property." Since there is only one Category under the Heading "Legal," clicking on Legal Heading Link 1610 will also return Topics Title Page 3300.

Figure 34:
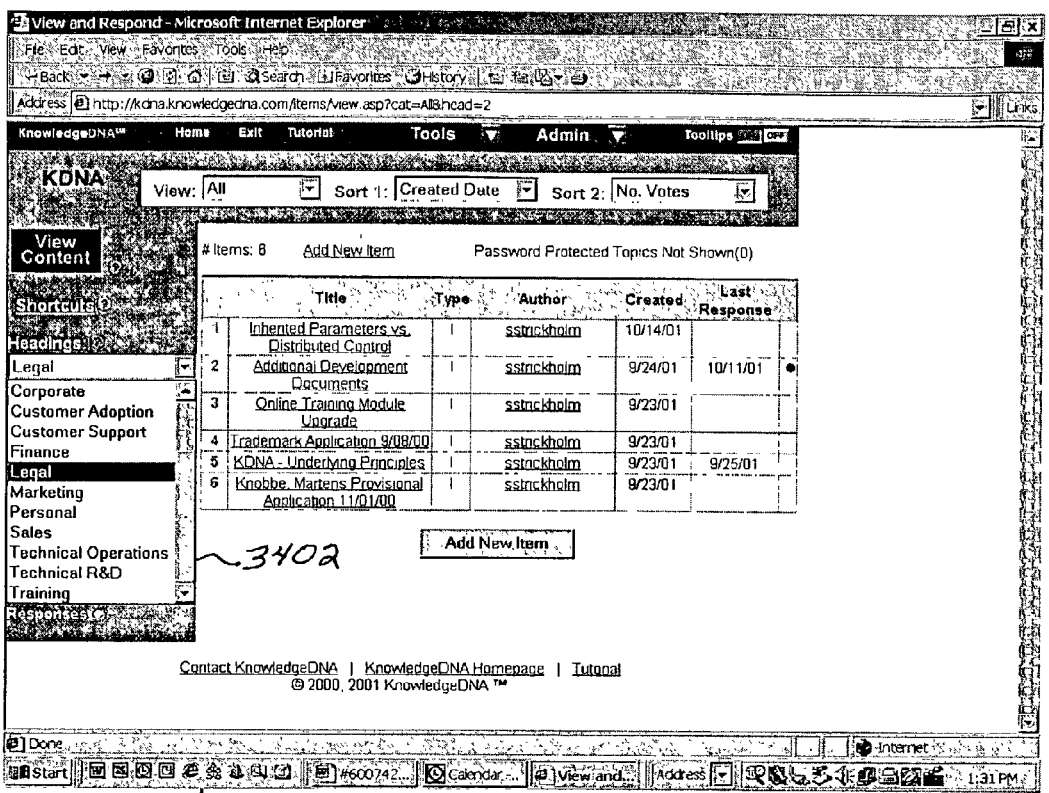

Headings Bar 3302 shows the user what Heading the user is presently in after making a selection from Navigation Page 1600 or from Shortcuts Link 1412. Clicking on Headings Down Arrow 3304 reveals Headings Pull Down Menu 3402 as shown in FIG. 34. From here the user can also click on an individual Heading directly, or the contents of All Headings.

Figure 35:
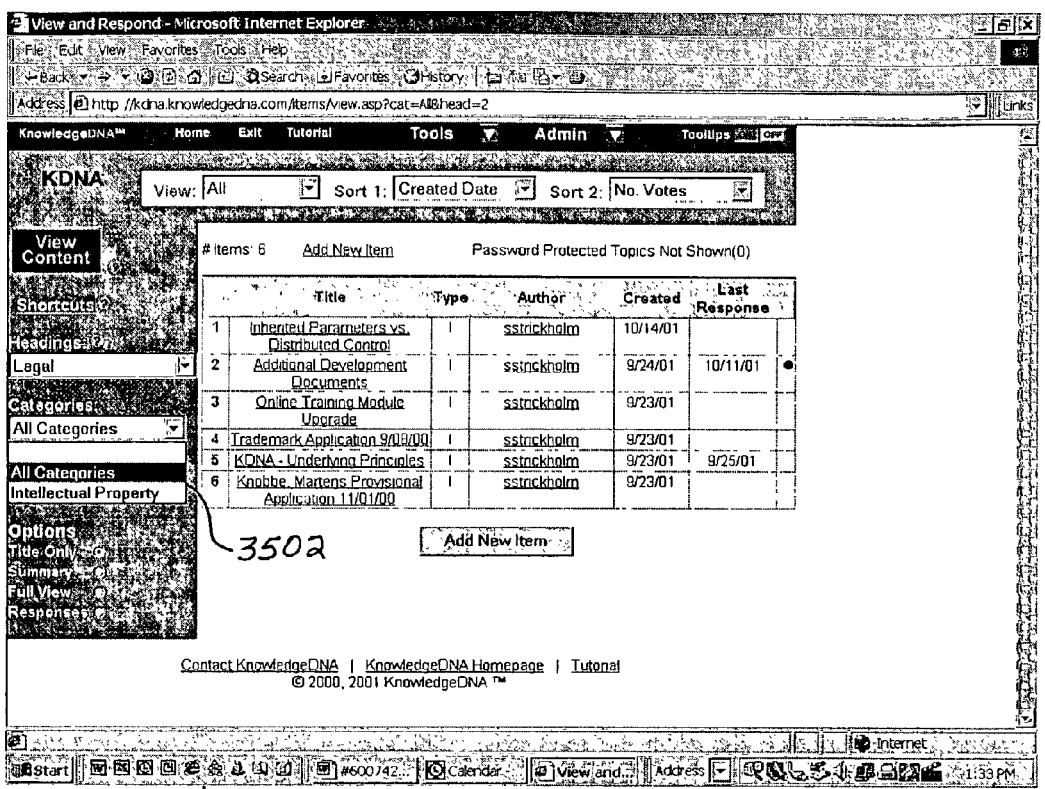

Categories Bar 3306 shows the user what Category the user is presently in after making a selection from Navigation Page 1600 or from Shortcuts Link 1412. Clicking on Category Down Arrow 3308 reveals Categories Pull Down Menu 3502 as shown in FIG. 35. From here the user can also click on an individual Category directly, or the contents of All Categories, after having chosen a Heading.

Topics Bar 3310 shows the user what Topic the user is presently in after making a selection from Navigation Page 1600 or from Shortcuts Link 1412. Clicking on Topics Down Arrow 3312 reveals a Topics Pull Down Menu (not shown). From here the user can also click on an individual Topic directly, or the contents of All Topics, after having chosen a Category.

Options 3314 allows the user to choose from four different viewing options by selecting one of four radio buttons. Title Only Radio Button 3316 gives a one-line description for each Item. Summary Radio Button 3318 provides more content, along with rating results, etc. Full View Radio Button 3320 provides all of the above plus full text and detailed information, options and attachments. Responses Radio Button 3322 shows the complete view of all content including all responses and additional attachments. At any time a user can click on the Title of an Item and see the Response View just for that one Item.

Figure 36:
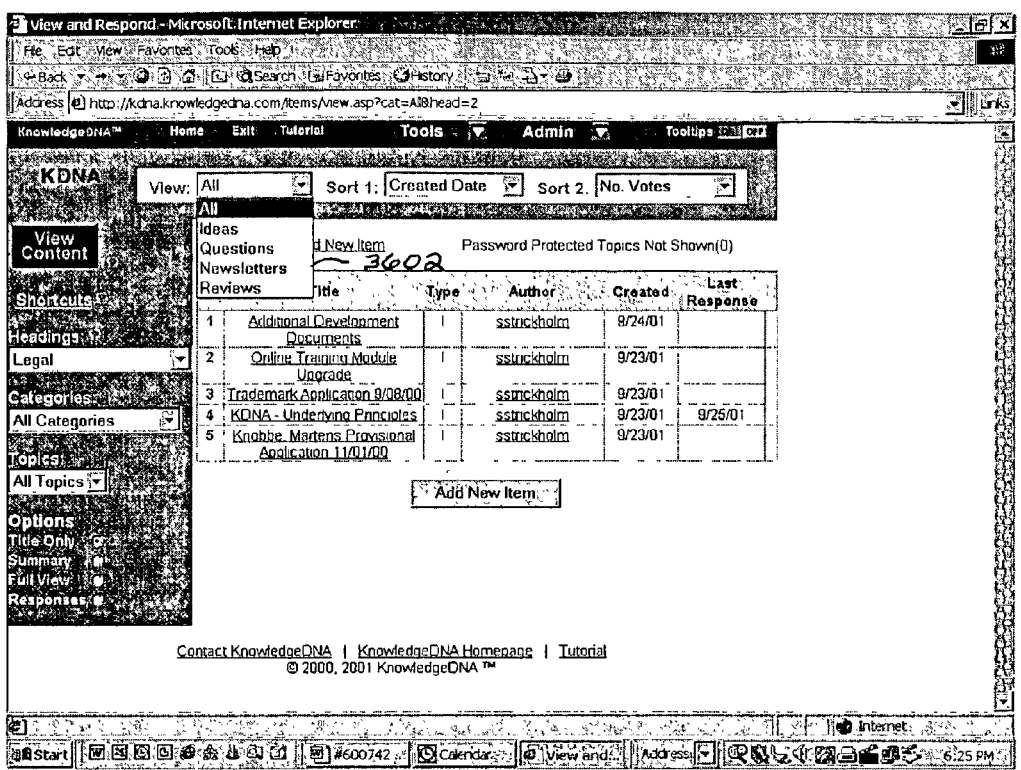

Clicking on All Down Arrow 3324 reveals View Pull Down Menu 3602 as shown in FIG. 36. The user can filter the current view from displaying all topic types to displaying only an individual topic type (Ideas, Questions, Newsletters, Reviews, etc.)

Figure 37:
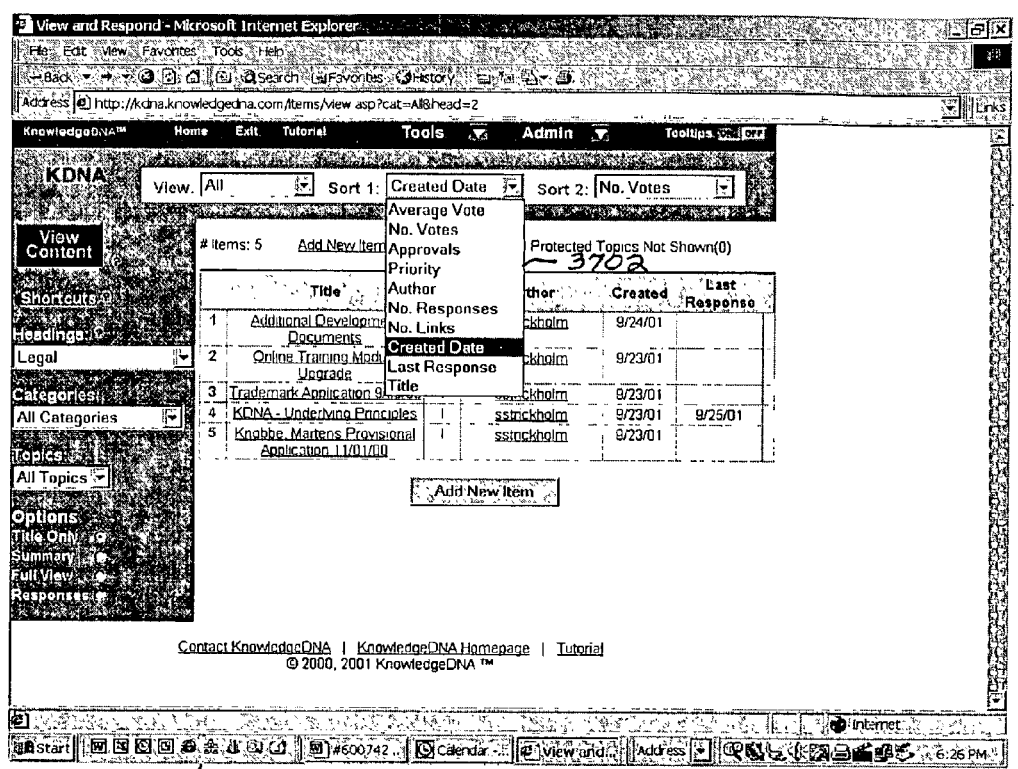

There are two sort bars, Sort 1 3326 and Sort 2 3330 which display the current sort settings. Clicking on Sort 1 Down Arrow 3328 reveals Sort 1 Pull Down Menu 3702 as shown in FIG. 37. Sort 1 Pull Down Menu 3702 allows the user to rank Items on-the-fly by different parameters, such as by highest average rating, number of ratings, approvals, priority, by author, number of responses, number of links, by title, by last response date, etc.

Figure 38:
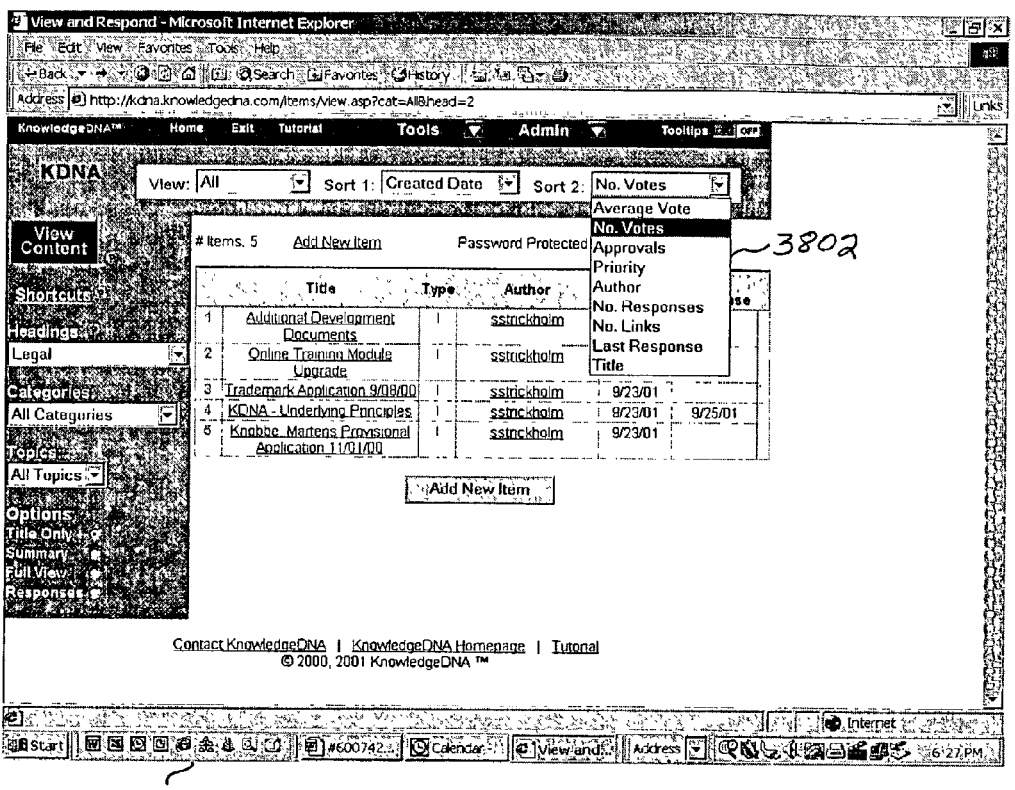

Clicking on Sort 2 Down Arrow 3332 reveals Sort 2 Pull Down Menu 3802 as shown in FIG. 38. Sort 2 Pull Down Menu 3802 is used as a "tie-breaker" for Items ranked equally by Sort 1 (same author, same number of ratings, etc.). The type of knowledge a user may be looking for may vary from one day to the next. This sorting functionality lets the user rank Items differently depending upon current needs.

Clicking on Add New Item Button 3334 allows the user to add new Item Types (Ideas, Questions, Newsletters, Reviews, etc.) which involves a four step process. First, the user chooses the type of new Item the user wishes to add. Second, the user enters in the Title, Summary, and the Full Text, and then clicks on Add New Item. Third, the user can add links to other internal Items, external Internet sites, or upload Attachments (see discussion of FIG. 46 below). This allows others to review additional content that clarifies or substantiates the user's position. Finally, if desired, the user can select Alert Me or Alert Others to future activity for this Item. This sends a link to the New Activity section of the Home Page that, when clicked on, takes the user or others back to this Item. Alerts can also be sent as an immediate e-mail or some other form of communication.

Figure 39:
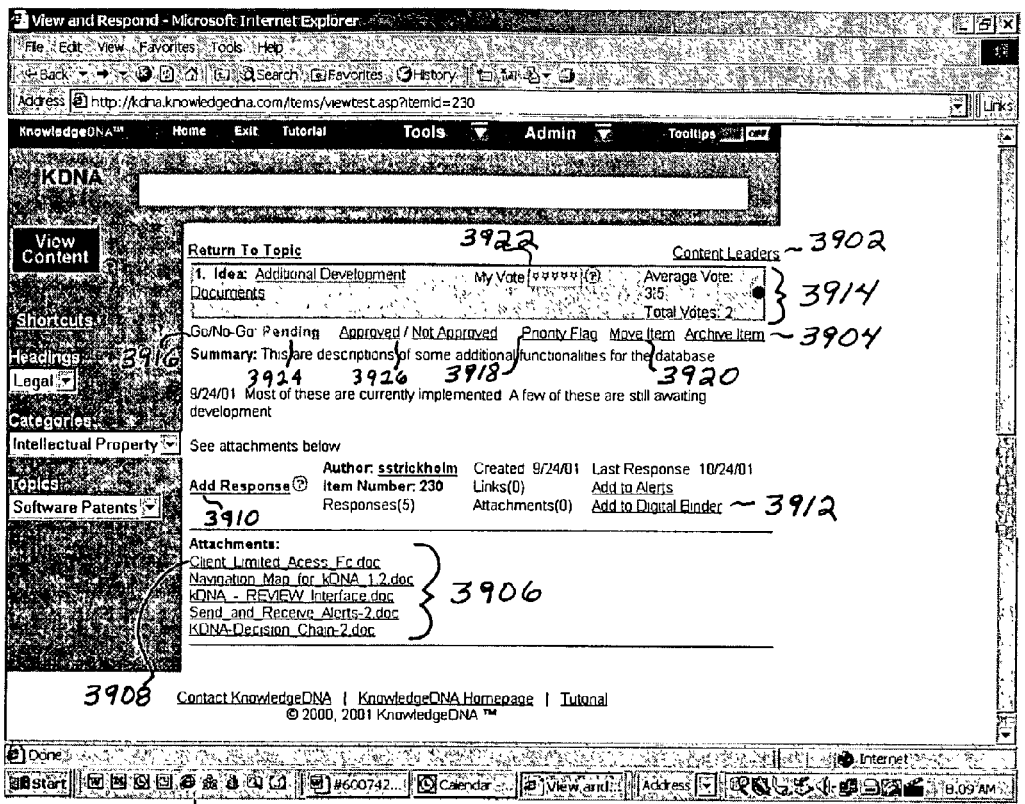
Figure 40:
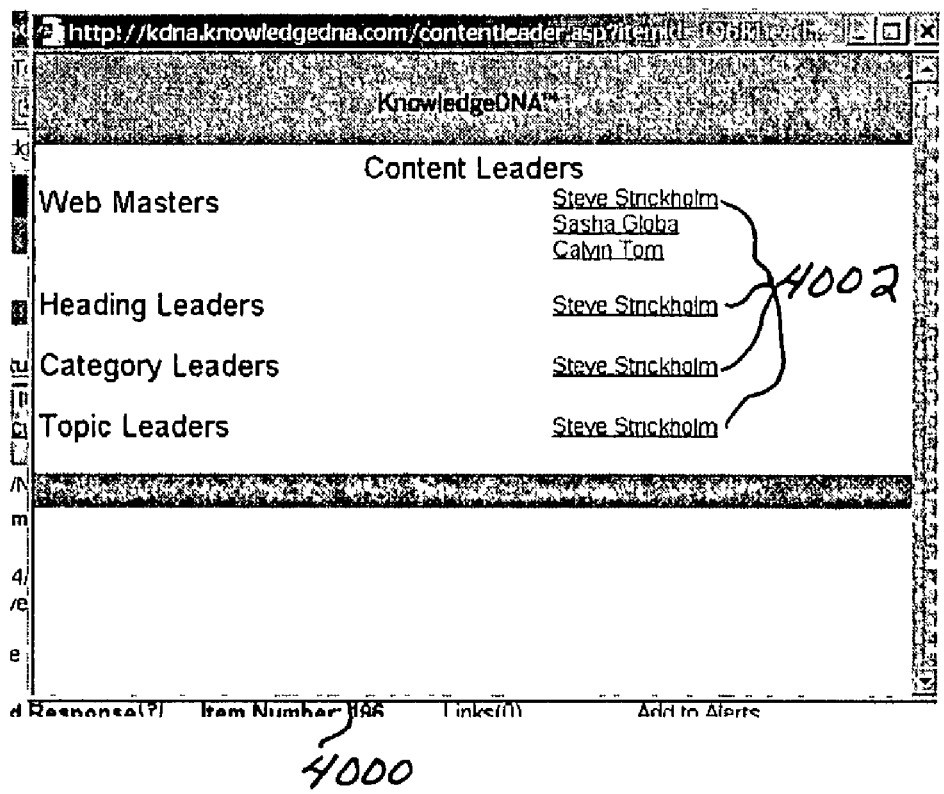

Clicking on a particular Topic title, such as Additional Development Documents 3338, returns Topic Page 3900 to the user's web browser as shown in FIG. 39. Clicking on Content Leaders Link 3902 displays Content Leaders Pop Up Window 4000 as shown in FIG. 40. This shows the Web Master, Heading Leaders, Category Leaders, and Topic Leaders for the topic selected. Clicking on a content leader link, such as Steve Strickholm Link 4002 displays Profile Pop Up Window 4100 as shown in FIG. 41.

Figure 42:
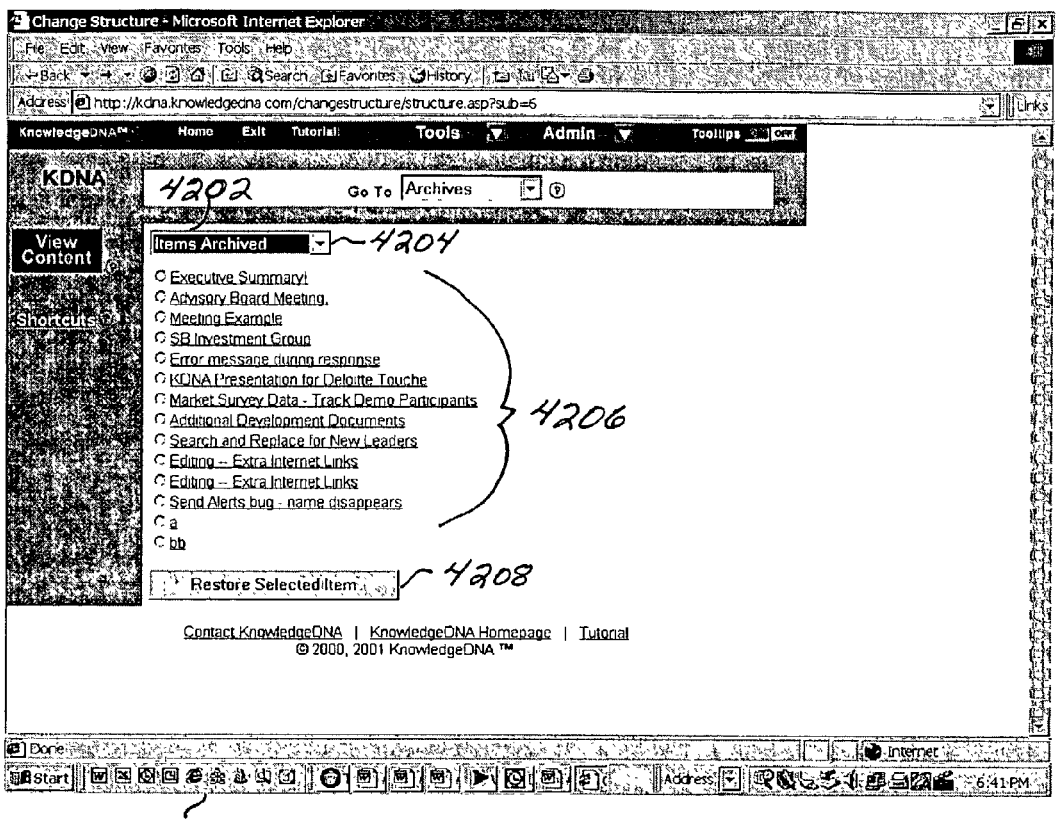
Figure 43:
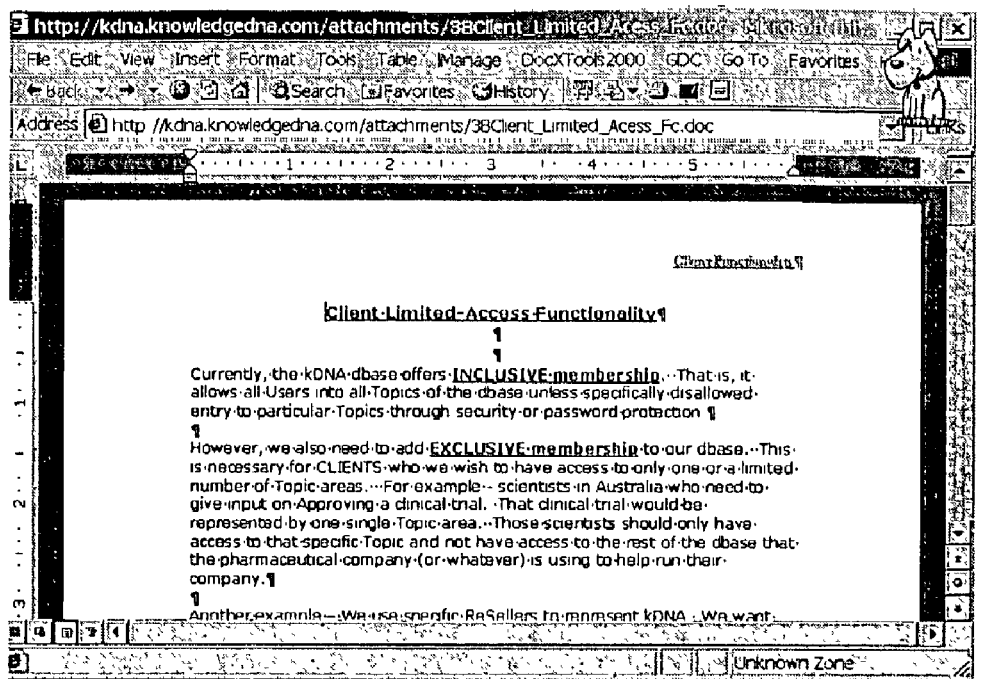

Clicking on Archive Item Link 3904 returns Archive Item Page 4200 to the user's web browser as shown in FIG. 42 if the user has the authority to archive items. Items can only be archived, not fully deleted—in case this content is deemed to have value in the future. Content Archived Bar 4202 shows the type of archived items that are displayed in Archive List 4204. Clicking on Content Archived Bar Down Arrow 4204 reveals a pull down menu (not shown) where the user can select Topics, Categories, Headings, or Items for display in Archive List 4204. Clicking on a radio button by a content item in Archive List 4204, and then clicking on Restore Selected Item Button 4208 will restore the archived content.

Figure 44:
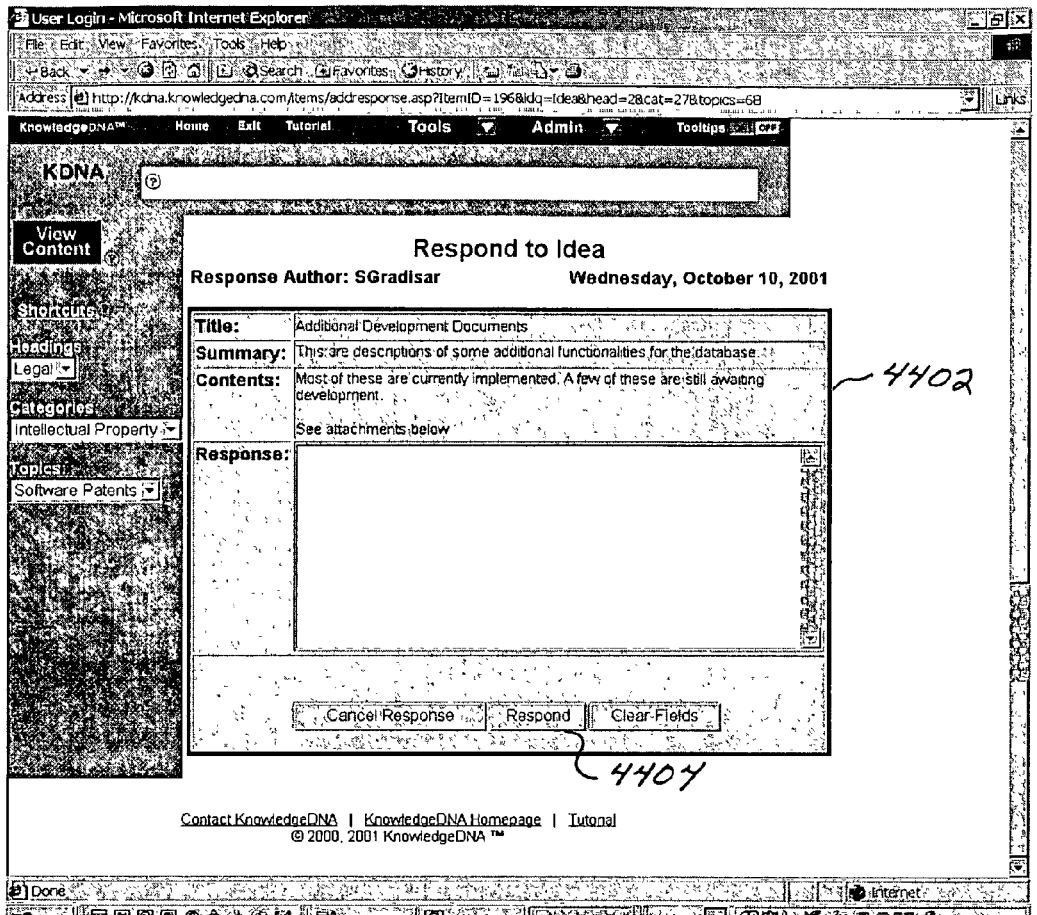
Figure 45:
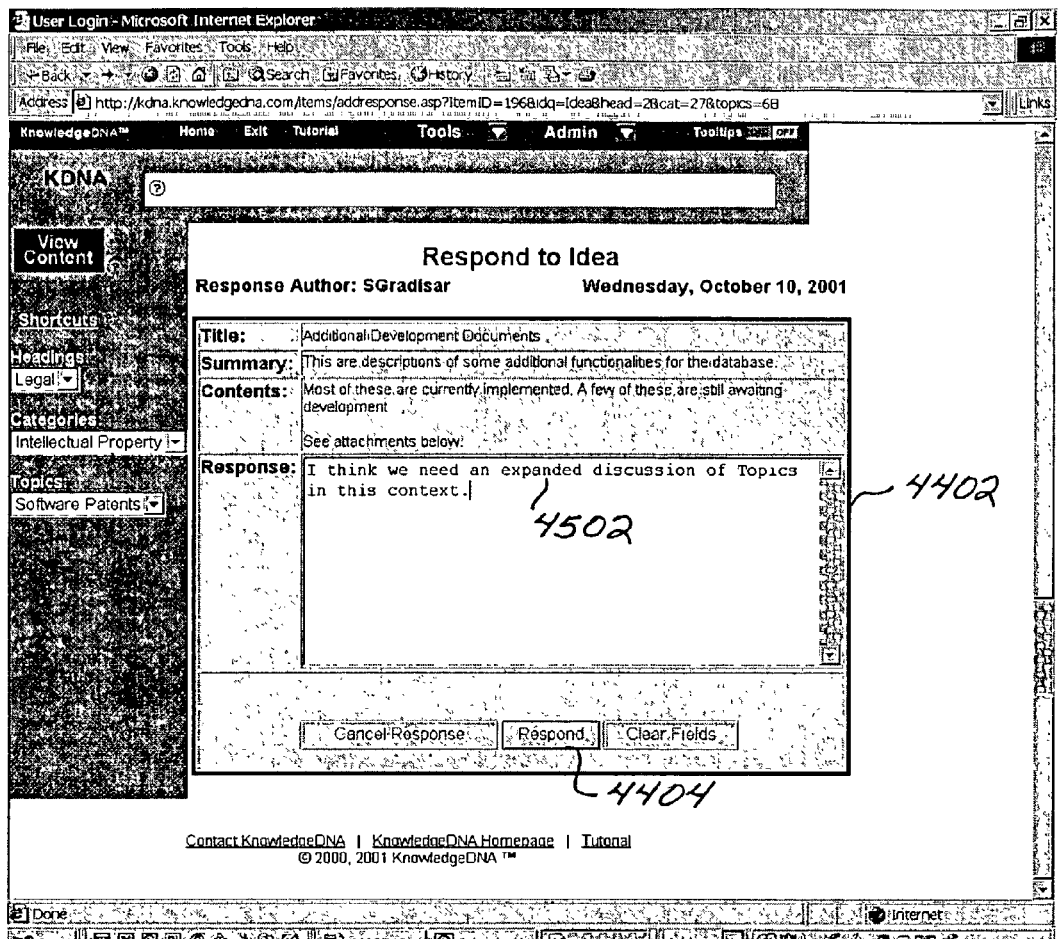
Figure 46:
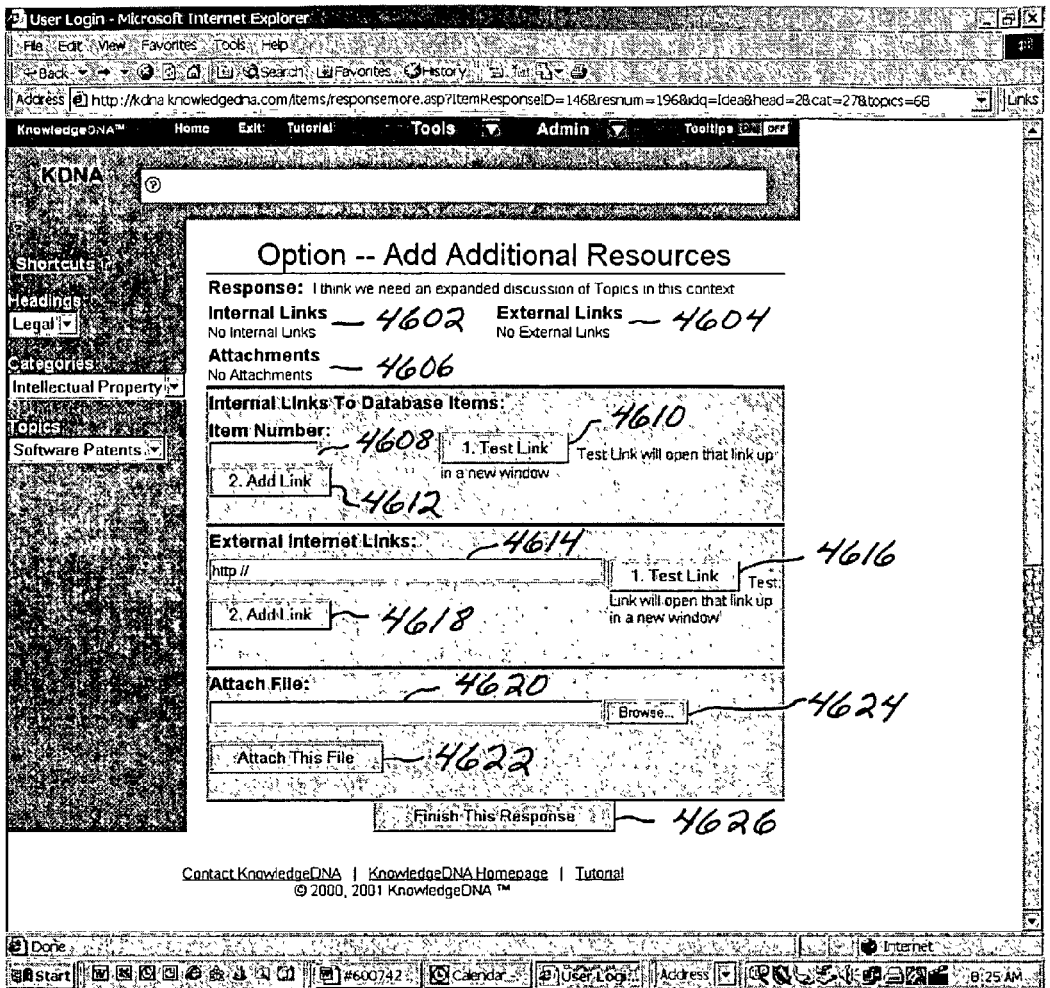

Attachment List 3906 lists the attachments that are associated with current topic. Clicking on any one of the attachment links, such as Client_Limited_Access_Fc.doc Link 3908 returns the attachment in Attachment Pop Up Window 4300 shown in FIG. 43. Clicking on Add Response Link 3910 returns Respond Page 4400 to the user's web browser as shown in FIG. 44. The user can type in a Response 4502 in Respond Window 4402, as shown in FIG. 45. Clicking on Respond Button 4404 returns Add Additional Resources Page 4600 to the user's web browser as shown in FIG. 46. From here, the user can add links to other internal Items, external Internet sites, or upload Attachments for other users to review that clarify or substantiate the user's position.

Clicking on any Internal Links 4602, External Links 4604, or Attachments 4606 when present will open up another browser window which will show another Internal Item in the database that relates to the current Item, an External Internet site that relates to the current item, or a device file (text, spreadsheet, image, etc.) that relates to the Item will download (not shown).

Internal links can be added by entering an item number in Item Number Box 4608, clicking on Test Link Button 4610, and then clicking on Add Link Button 4612. External Internet links can be added by entering the URL of the link in URL Box 4614, clicking on Test Link Button 4616, and then clicking on Add Link Button 4618. File attachments can be added by entering the file address from the local or network hard drive in Local File Address Box 4620, and then clicking on Attach This File Button 4622. The user may also click on Browse Button 4624 to locate the file on the local or network hard drive. This same functionality is followed when adding a New Item to the database that the user wants to associate related documents or internal or external links to the New Item.

Figure 47:
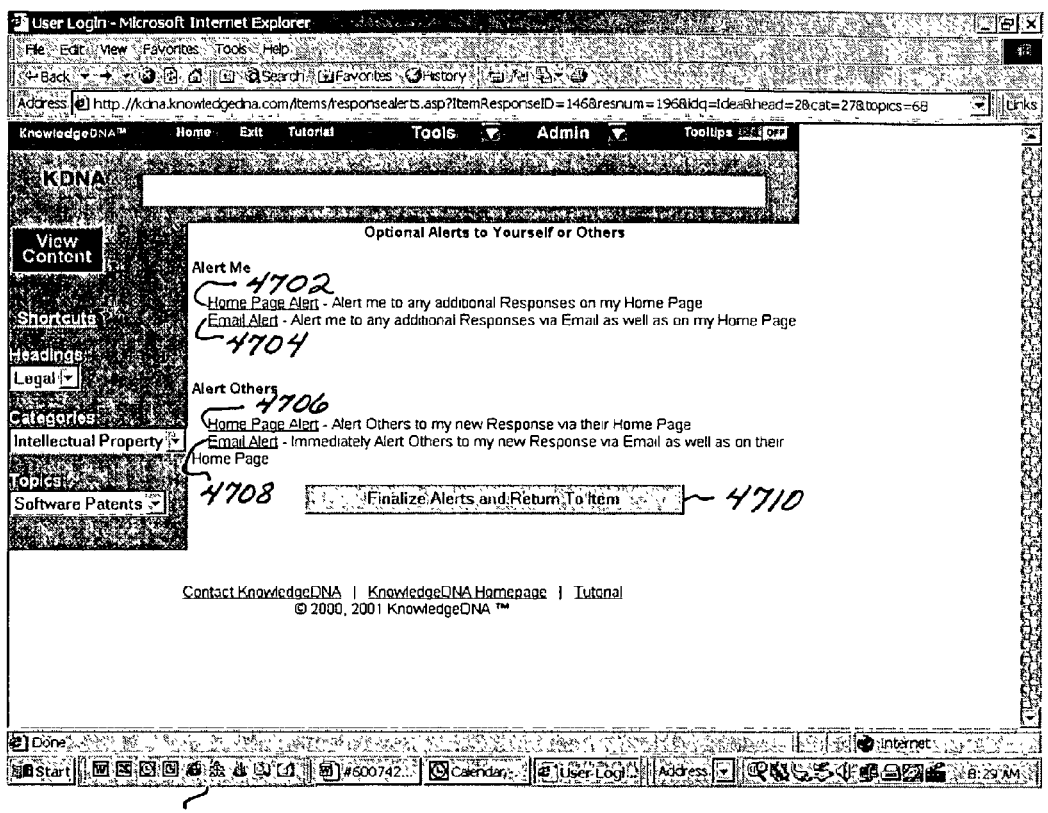

Clicking on Finish This Response Button 4626 returns Optional Alerts Page 4700 shown in FIG. 47. If desired the user can select options that will automatically alert the user or others to future responses. Selecting Home Page Alert 4702 will automatically alert the user to any additional responses to this Item on the user's Home Page. Selecting E-mail Alert 4704 will automatically alert the user to any additional responses to this Item via an e-mail sent to the user's e-mail address in addition to the user's Home Page, allowing the user to read the response without having to access the application.

Figure 48:
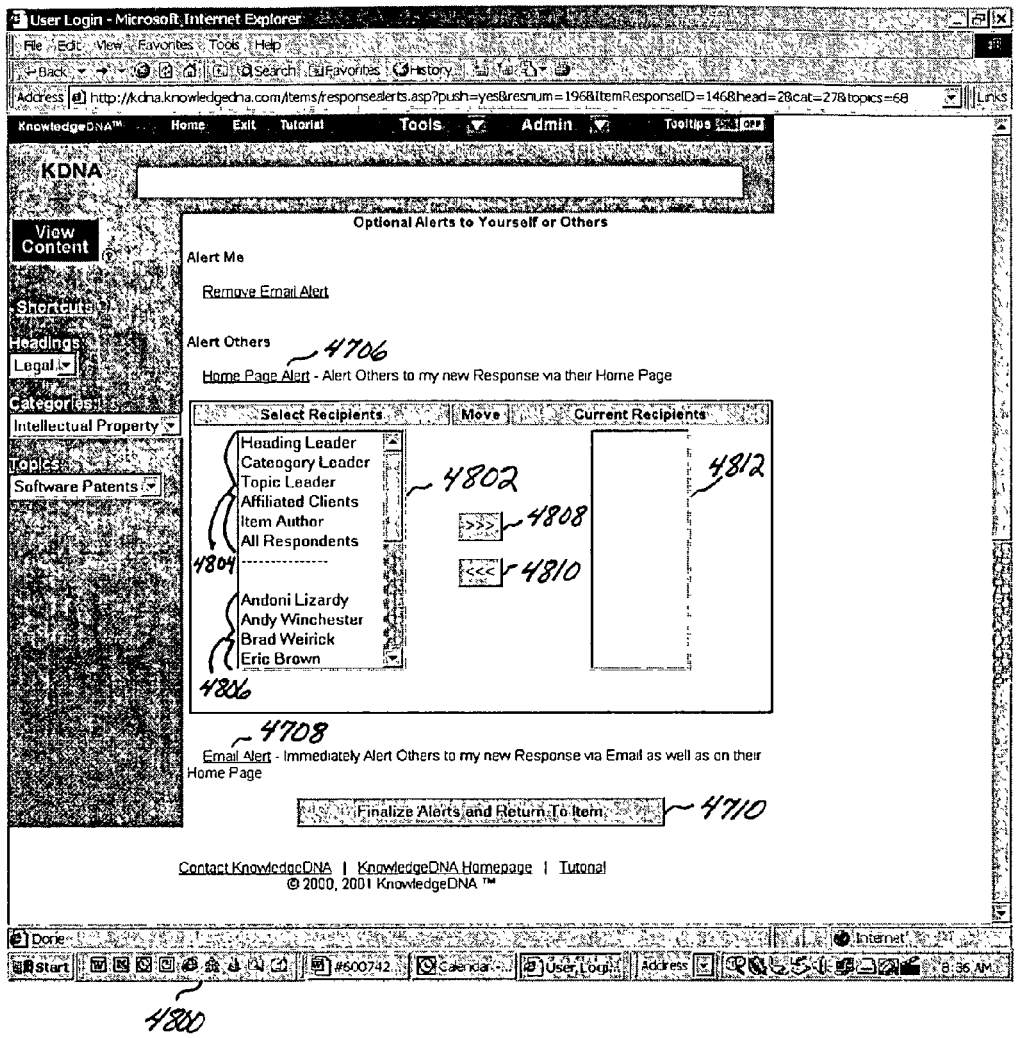

Selecting Home Page Alert 4706 or E-mail Alert 4708 returns Optional Alerts Page 4800 as shown in FIG. 48. Select Recipients Box 4802 allows the user to select from Groupings 4804 one or more groups of users, such as Heading Leader(s) or Category Leader(s). If Heading Leaders is selected, then all Heading Leaders will be automatically alerted to any future responses related to the Item. In addition, the user can select individual users from User List 4806. After making a selection from either Groupings 4804 or User List 4806, clicking on Move Button 4808 will place the selected group or individual user in Current Recipients Box 4812. Conversely, to remove a Grouping or an individual user from Current Recipients Box 4812, the user would select the Grouping or individual user in Current Recipients Box 4812 and then click on Remove Button 4810.

After the user has finished placing Groupings or individual users in Current Recipients Box 4812, Selecting Home Page Alert 4706 will automatically alert the members of the selected Grouping or individual users to any additional responses to this Item on the user's Home Page. Selecting E-mail Alert 4708 will automatically alert the members of the selected Grouping or individual users to any additional responses to this Item via an e-mail sent to the user's e-mail address in addition to the user's Home Page, allowing the users to read the response without having to access the application. This alert functionality is also available when adding a New Item or potentially at any time to any user.

Figure 49:
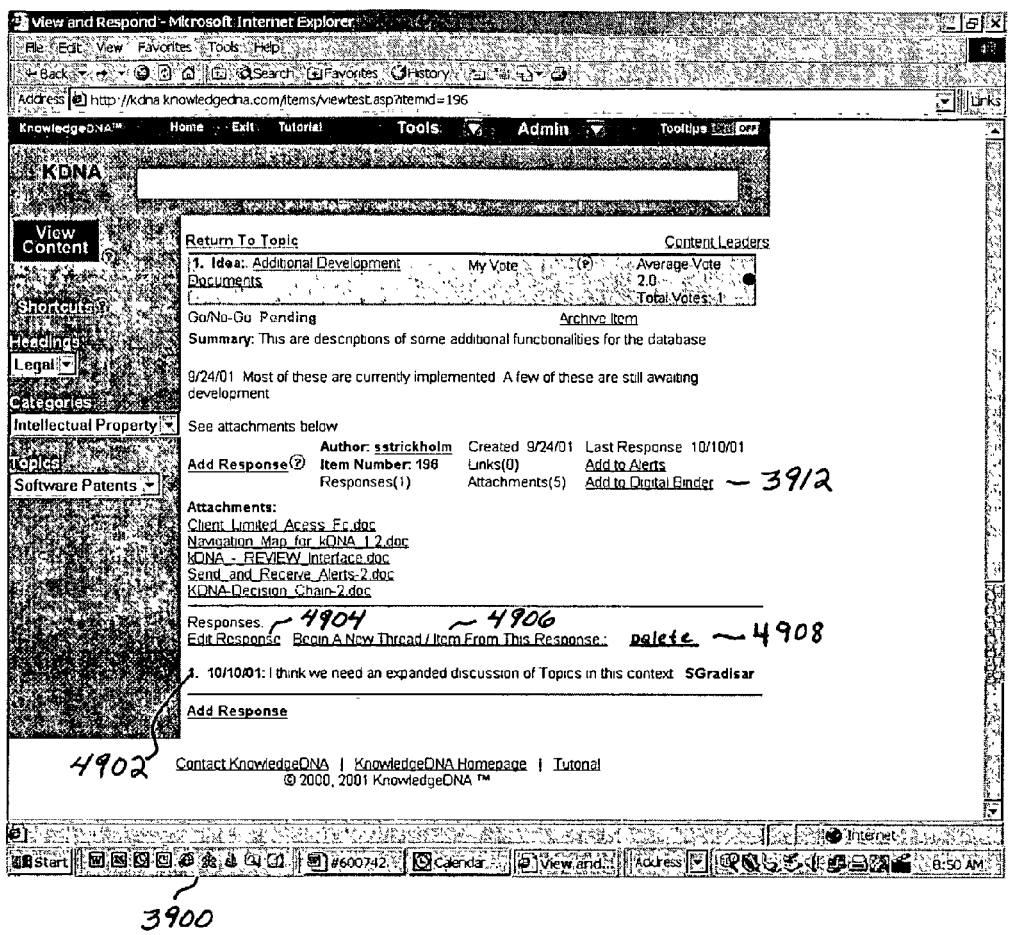

Clicking on Finalize Alerts and Return To Item Button 4710 returns Topic Page 3900 as shown in FIG. 49, which now shows Response 4902 that has just been added. If the user is an Author of a Response, Topic Leader, or above for this area, then the user can delete the Response using an active Delete Link 4908 will be displayed right above the Response.

Figure 50:
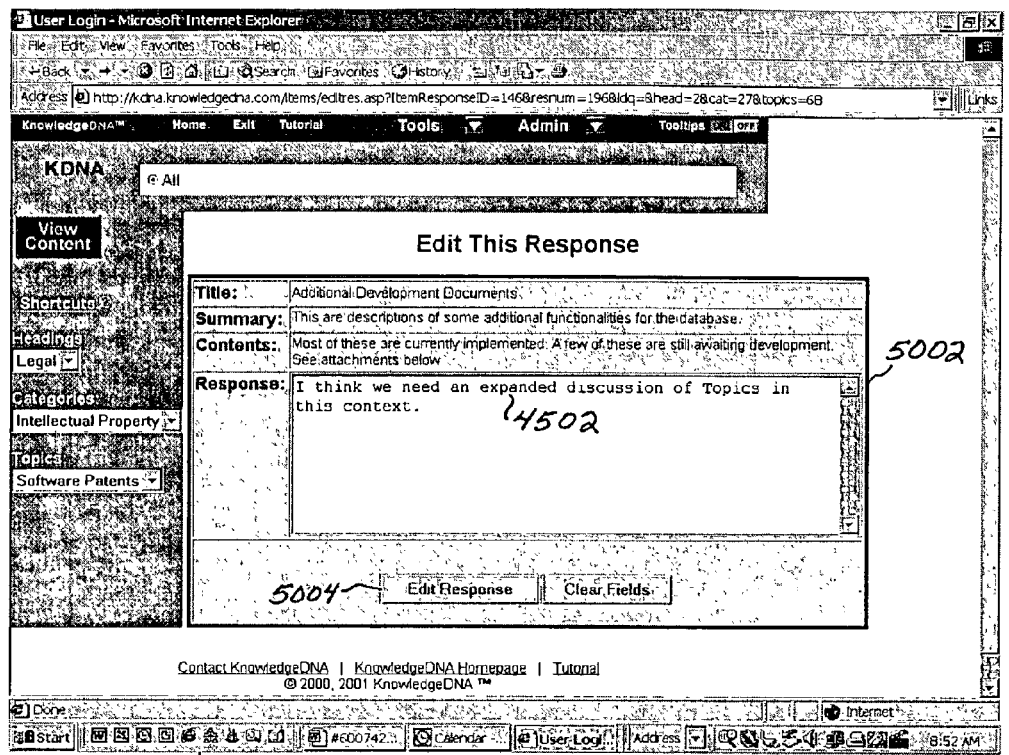

Clicking on Edit Response Link 4904 returns Edit This Response Page 5000 as shown in FIG. 50. Response 4502 appears in Edit Box 5002 where the user can edit the response. After editing the response, the user clicks on Edit Response Button 5004. This functionality is also available to the author of an Item.

Figure 51:
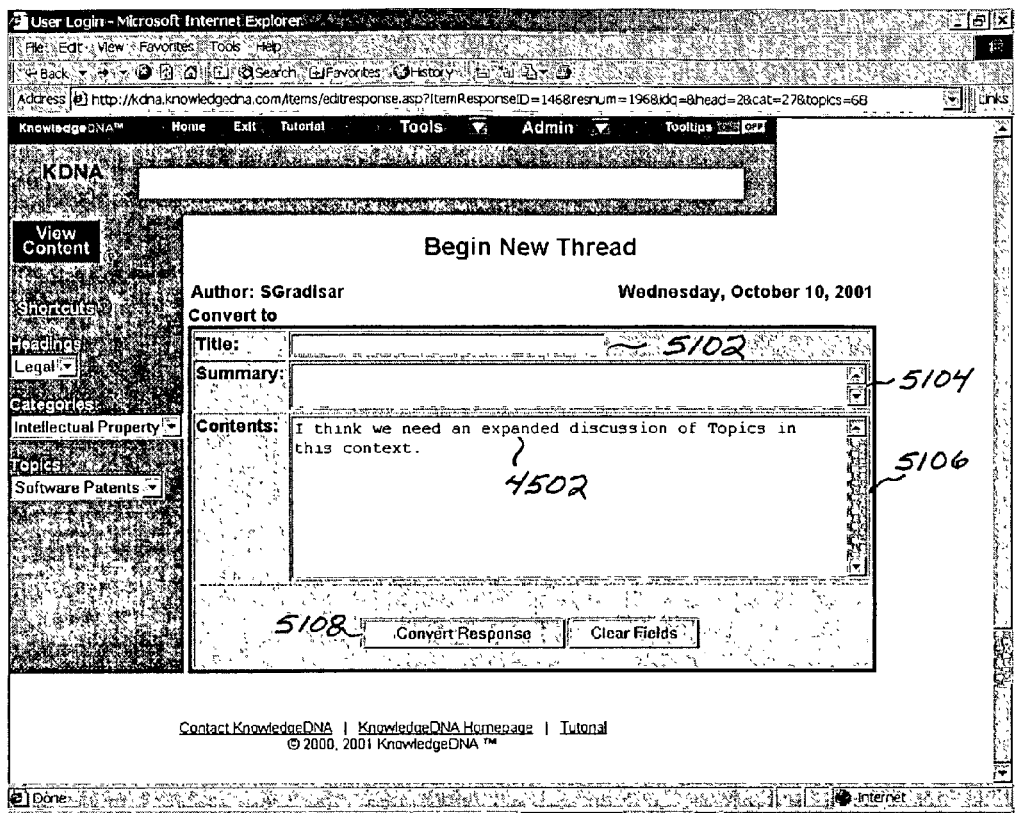
Figure 52:
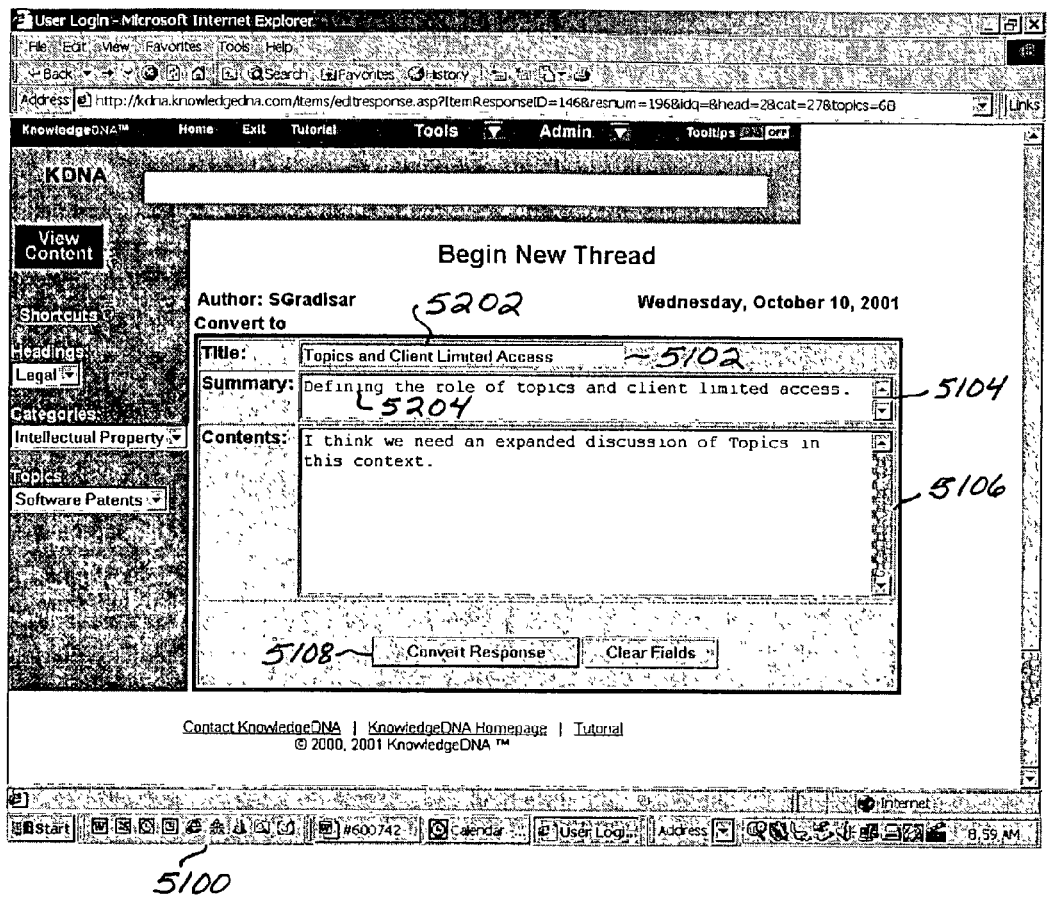

Clicking on Begin A New Thread/Item From This Response Link 4906 returns Begin New Thread Page 5100 as shown in FIG. 51. This functionality is only available to a user if the user is the author of a Response, or the user is a Topic Leader or above for this Category. If so, then the user/Topic Leader you can turn the Response into a new thread or Item. Response 4502 is displayed in Content Box 5106. The user must enter a Title 5202 in Title Box 5102 and a Summary 5204 in Summary Box 5102 as shown in FIG. 52. Clicking on Convert Response Button 5108 then affects the change.

Figure 53:
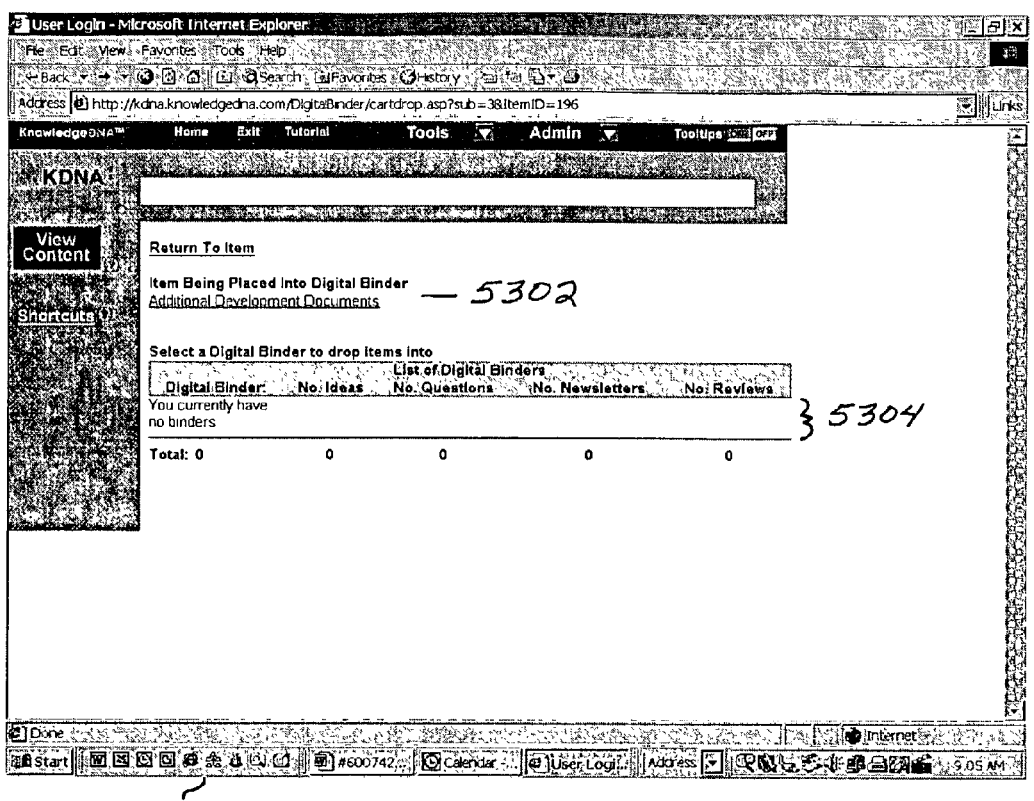

Clicking on Add To Digital Binder Link 3912 returns Add To Digital Binder Page 5300 as shown in FIG. 53. Item 5302 is the Item to be placed in the digital binders listed in Digital Binder List 5304. In this particular case, the user has no digital binders set up. The user would have to first go and create a digital binder (see FIG. 25), and then return to this page to select the digital binder.

Interactive Bar 3914 provides the leader with several interactive tools. Go/No-Go 3916 is for Items only. If Approvals have been activated by the Leaders, and if a leader is designated to give final Approval for this Item, then active links Pending 3924, Approved/Not Approved 3926, will be displayed. Otherwise, GO/No Go 3916 is displayed.

Priority Flag 3918 is for Items Only. If the user is a Topic Leader or above for this Area, the user can Priority Flag a red exclamation mark for other users to the far right of this Item.

Move Item 3920 is for Items Only. If the user is a Topic Leader or above for this Area, then the user can move this Item to other parts of the database that are under the user's control.

My Vote/RSVP/I Agree 3922 etc. allows the user to scroll the cursor across the five stars at the top of Idea, Newsletter, and Review Items for rating purposes. By clicking on a star, one to five, the user can show the user's level of approval rating. The user can change this rate selection, RSVP, I Agree, etc. at any time, as more information becomes available via different Responses. Thus the user's entire interaction with the application is real-time.

Referring again to FIG. 33, Parameters Settings 3342 shows the parameters that have been set for the current Topic. Each Topic has five Input or Access Parameters that are independent of each other. Privacy Parameter 3344 shows whether any user can enter that Topic area or whether a password is required. Screening Parameter 3346 indicates if a Content Leader must screen new Items before they go into the database. Input (Read/Write) Parameter 3348 determines whether users can submit Items, rate, respond or simply read the content for that Topic. User ID Parameter 3350 lets the any Leader in the responsibility hierarchy turn on or off all identification for users for that Topic area (and replace with Aliases, for example). Approvals Parameter 3352 allows any Leader in the responsibility hierarchy to give a "Go or No Go" to an Idea for implementation.

These Parameters let the Content Leaders configure Topics for maximum usability. For example, one Topic may require a password, but no screening. Another may allow full access, with screening in place, allow users to use Aliases, but require Approvals prior to any implementation. To meet changing needs, the entire database is customizable on-the-fly.

Figure 54:
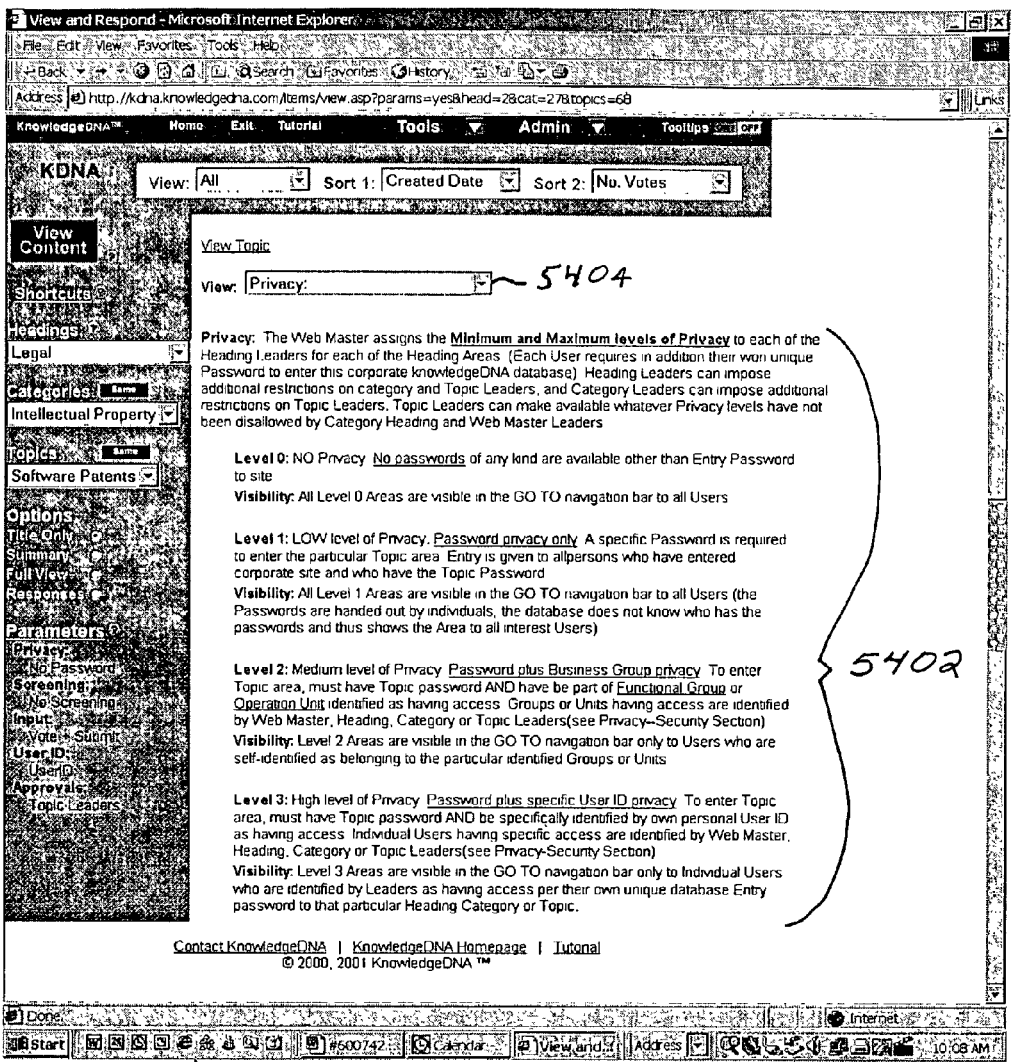

Clicking on Parameters Link 3340 returns Privacy Definitions Page 5400 as shown in FIG. 54. This page has a description of the Privacy Levels 5402 currently being invoked in the application. The four levels of privacy in this embodiment of the invention are: Level 0—no privacy; Level 1—low level of privacy; Level 2—medium level of privacy; and Level 3—high level of privacy. The level of privacy determines the visibility of the Area to users.

In Level 0 no passwords of any kind are available other than the entry password required to enter the site. All Level 0 Areas are visible in the GO TO navigation bar to all users.

Level 1 allows password privacy only. A specific password is required to enter a Level 1 Topic area. Entry is given to all users who have entered the application and who have the Topic Password. All Level 1 Areas are visible in the GO TO navigation bar to all Users (the Passwords are handed out by individuals; the database does not know who has the passwords and thus shows the Area to all interested users).

Level 2 allows a password plus business group privacy. To enter a Level 2 Topic area, the user must have the Topic password AND be a part of a Functional Group or Operational Unit identified as having access. Groups or Units having access may be identified by the Web Master, Heading, Category, or Topic Leaders. Level 2 Areas are visible in the GO TO navigation bar only to users who are self-identified as belonging to the particular identified Groups or Units.

Level 3 allows a password plus specific User ID privacy. To enter a Level 3 Topic area, the user must have a Topic password AND be specifically identified by the user's own personal User ID and set up as having access. Individual Users having specific access are identified by the Web Master, Heading, Category, or Topic Leaders. Level 3 Areas are visible in the GO TO navigation bar only to individual users who are identified by Leaders as having access per their own unique database entry password to that particular Heading, Category, or Topic.

Clicking on Drop Down List 5404 displays a list of additional parameters: Screen Ideas/Questions, Input (Read/Write) Capabilities, Use of User ID, and Go/NO-Go Approval of Ideas (not shown). Clicking on any one of the parameters will return a page similar to Privacy Definitions Page 5400 providing the user with information on each parameter (not shown).

Regarding Screening Ideas/Questions, the Web Master determines which Leadership Levels must pre-screen User Ideas/Questions/Newsletters. The Web Master can allow No Screening, or require at least Topic, Category or Heading Leader screening. Responses do not get screened. They can be deleted by appropriate topic leaders and above in each item.

Level 0 allows No Screening. All User Ideas/Questions can be posted without review prior to their being posted into the database. In Level 1 Topic Leader screening is required. The Topic Leader must review submissions prior to their being posted into the database. For Level 2 Category Leader screening is required. Category Leaders must review submissions prior to their being posted into the database. In Level 3 Heading Leader screening is required. Heading Leaders must review submissions prior to their being posted into the database. All of these Screening Levels are indicated in the Summary and Full Text views of the content.

Regarding Input (Read/Write) Capabilities, the Web Master assigns the minimum and maximum levels of Input (Read/Write) Capabilities to each of the Heading Leaders for each of the Heading Areas. Heading Leaders can impose additional restrictions on Category and Topic Leaders, and Category Leaders can impose additional restrictions on Topic Leaders. Topic Leaders can make available whatever levels have not been disallowed by Category, Heading, and Web Master Leaders.

Level 0 allows the user to rate/vote and submit. Users below the Web Master (current Level of Authorization) have full use of database. They can read all content, comment on the material via bulletin boards, rate/vote plus submit Ideas and Questions and related attachments in each of the Topics to which they have privacy access.

Level 1 allows the user to comment and rate/vote only. Users below the Web Master (current Level of Authorization) can read all content, comment on the material via bulletin boards and vote on Ideas but do not have the ability to submit Ideas or Questions and attachments.

Level 2 allows users to comment only. Users below the Web Master (current Level of Authorization) can read all content, comment on the material via bulletin boards, but do not have rate/vote and submit access to the material.

Level 3 is read only. Users below the Web Master (current Level of Authorization) have read only access to the material.

Regarding the Use Of User ID, the Web Master assigns the minimum and maximum ability to allow Aliases to each of the Heading Leaders for each of the Heading Areas. Heading Leaders can impose additional restrictions on Category and Topic Leaders, and Category Leaders can impose additional restrictions on Topic Leaders. Topic Leaders can make available whatever levels have not been disallowed by Category, Heading, and Web Master Leaders.

Level 0 requires no ID. Users can cloak their identities by having the system show no identification for each entry. This creates a true impartial rating/voting system, in that ideas cannot be identified as belonging to the same User Alias, or to the same User ID. Thus, experience level, seniority, position, gender, etc. become truly irrelevant to the Idea rating/voting process. The Leaders can however elect to have the lack of identity expire after a certain time period (after the feedback cycle is complete) to reveal the true ID of the contributor. Access to the User's Profile will be disabled.

Level 1 requires membership in a Group. Users can cloak their identities by having the system assign their group for their submissions. This creates a true impartial rating/voting system, in that ideas cannot be identified as belonging to the same User Alias, or to the same User ID, but rather to the group itself. Thus, experience level, seniority, position, gender, etc. become truly irrelevant to the Idea rating/voting process. The Leaders can however elect to have Groups expire after a certain time period (after the feedback cycle is complete) to reveal the true ID of the contributor. Access to the User's Profile will be disabled.

Level 2 allows the User to have an Alias. Users can cloak their identities by having the system assign an Alias for their submissions. This creates a true impartial rating/voting system, in that Ideas can be identified as belonging to the same User Alias, but not to the same User ID. Thus, experience level, seniority, position, gender, etc. become truly irrelevant to the Idea rating/voting process. The Leaders can however elect to have Aliases expire after a certain time period (after the feedback cycle is complete) to reveal the true ID of the contributor. Access to the User's Profile will be disabled.

Level 3 requires a User ID. Users cannot cloak their identities by having the system assign an Alias. Their User ID will be displayed for all entries and access to their profile will be allowed.

Regarding Go/No-Go Status, the Web Master assigns which Leadership Levels must approve Ideas prior to User implementation as a Best Practice. The Web Master can allow No Approval, or require at least Topic, Category or Heading Leader Approval. This gives management control over the implementation of ideas expressed in the database. For example, an idea may be met with high marks by Users, but not be practical due to reasons known by management (such as cost). Or, management may want to approve Best Practices that have safety considerations.

Level 0 requires no approval. All User Ideas can be implemented without approval by Leaders. Level 1 requires Topic Leader approval. The Topic Leader must approve the implementation of Ideas. Level 2 requires Category Leader approval. The Category Leaders must approve the implementation of Ideas. Level 3 requires Heading Leader approval. The Heading Leader must approve the implementation of Ideas. All Screening Levels are indicated in the Summary and Full Text views of the content.

Figure 55:
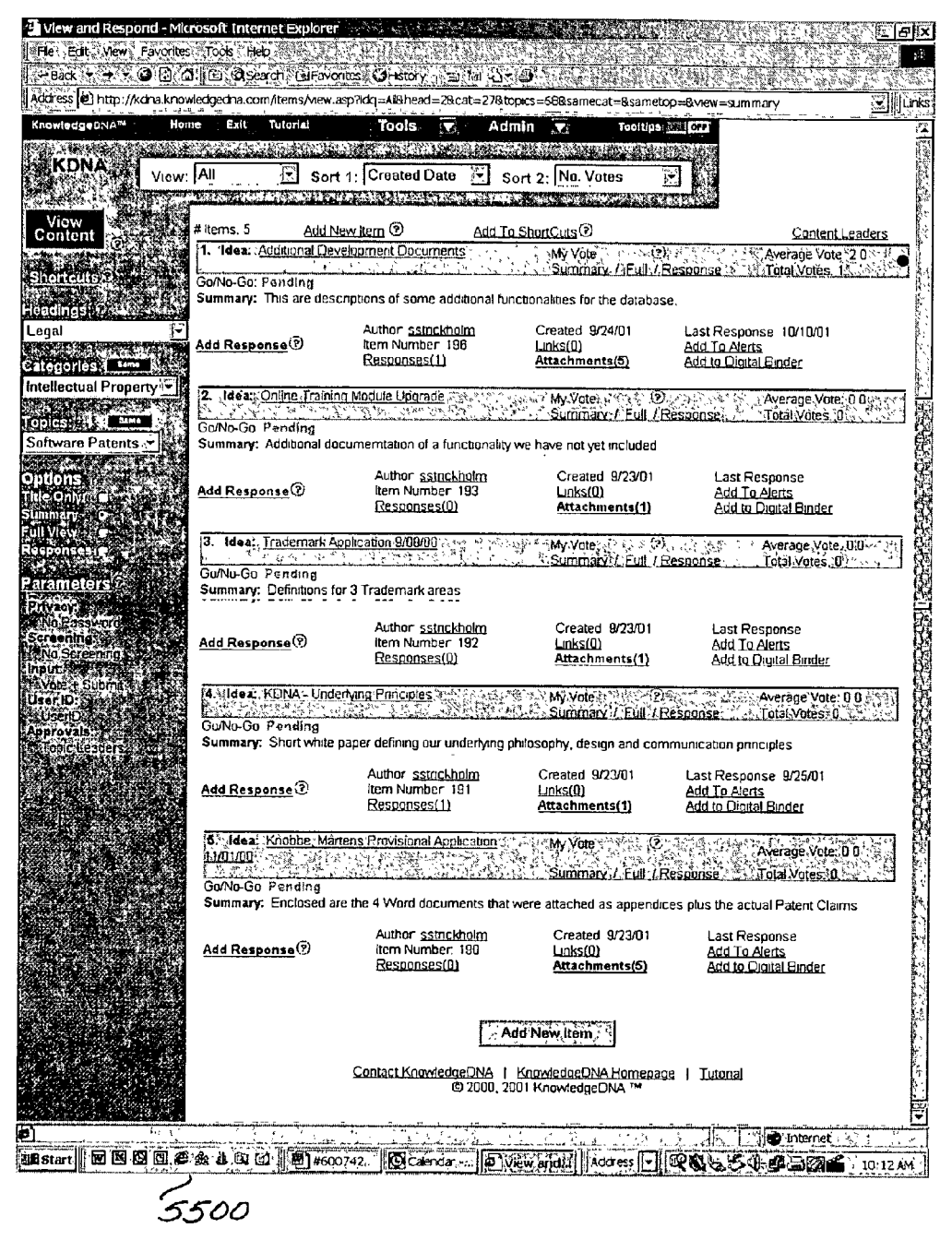
Figure 56:
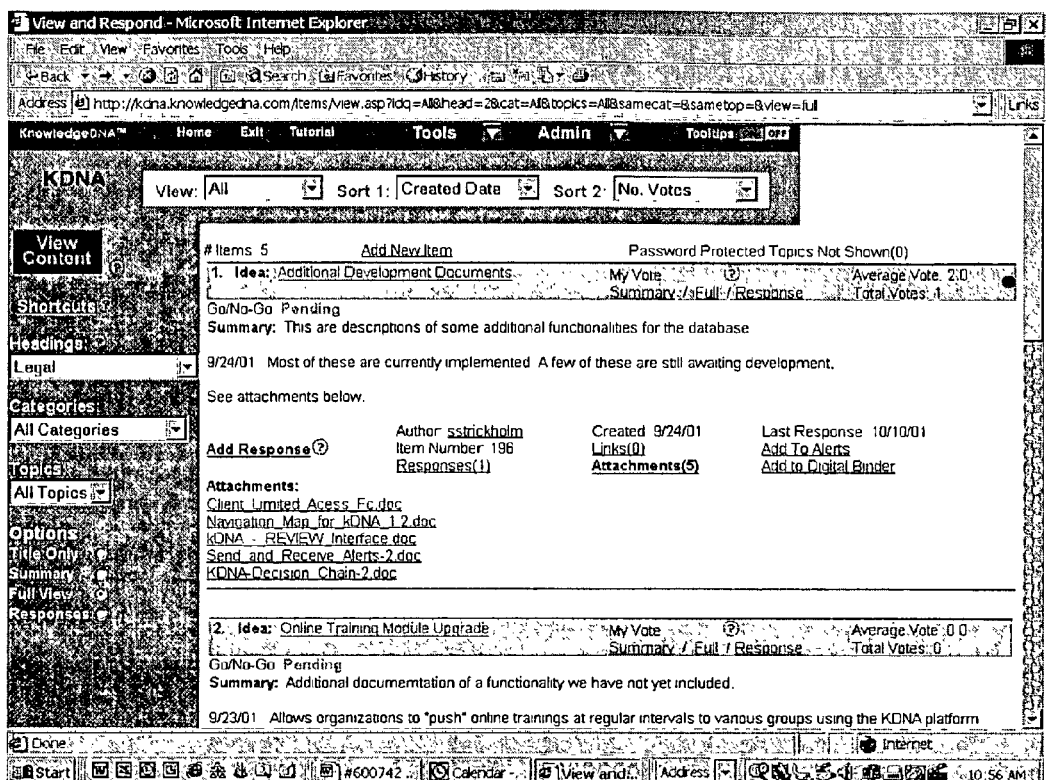
Figure 57:
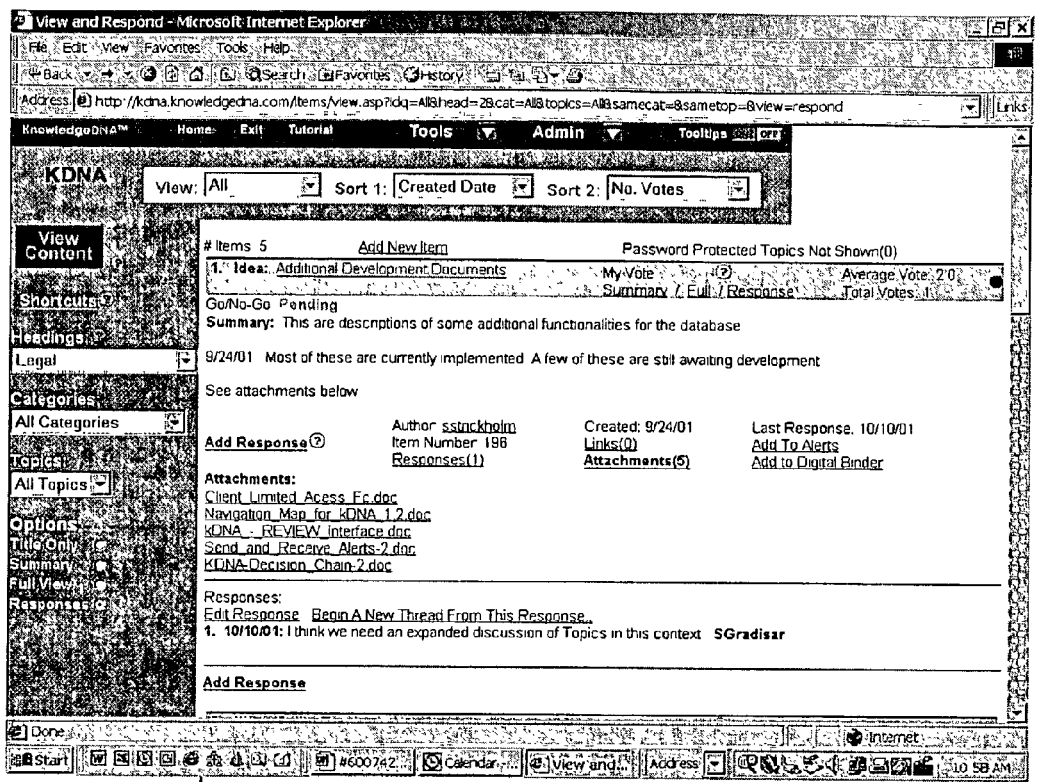

Clicking on Summary Radio Button 3318 returns Topics Summary Page 5500 as shown in FIG. 55. Clicking on Full View Radio Button 3320 returns Topics Full View Page 5600 as shown in FIG. 56. Clicking on Responses Radio Button 3322 returns Topics Responses Page 5700 as shown in FIG. 57. Thus, each successive view provides more information about the topic, so the user can select which view the best meets the user's needs for a particular purpose.

Figure 58:
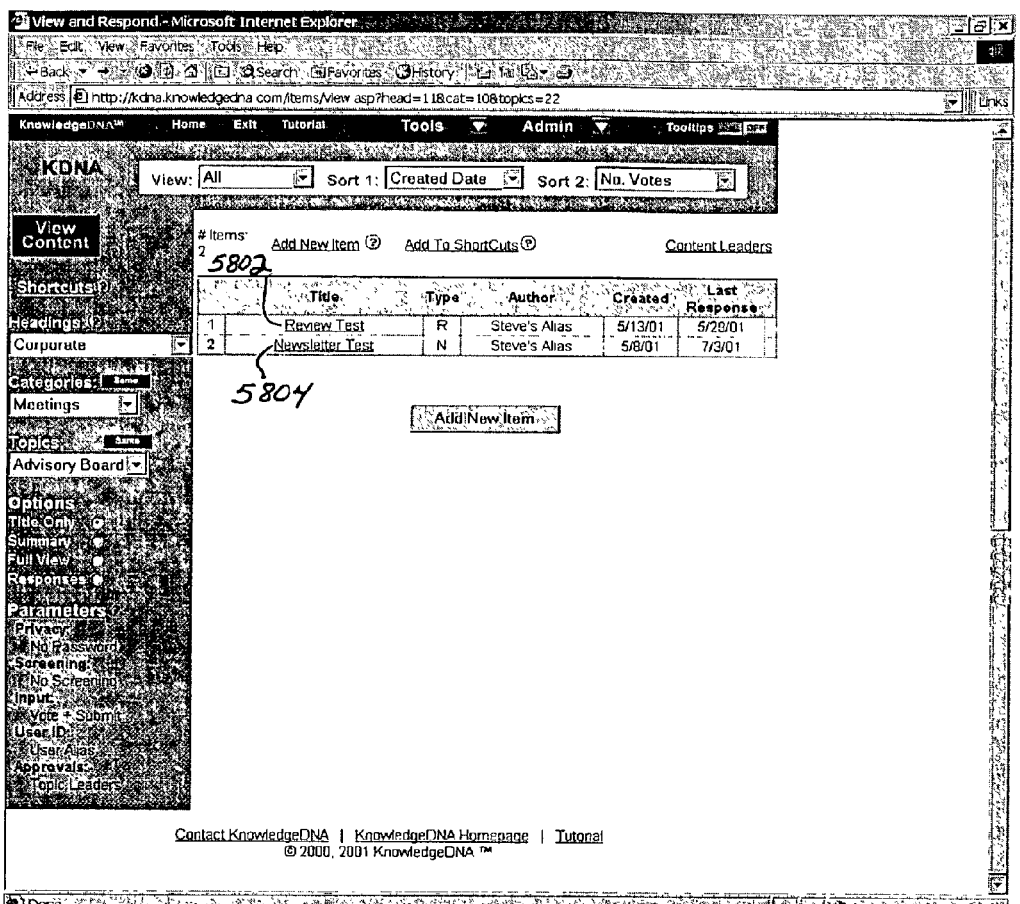
Figure 59:
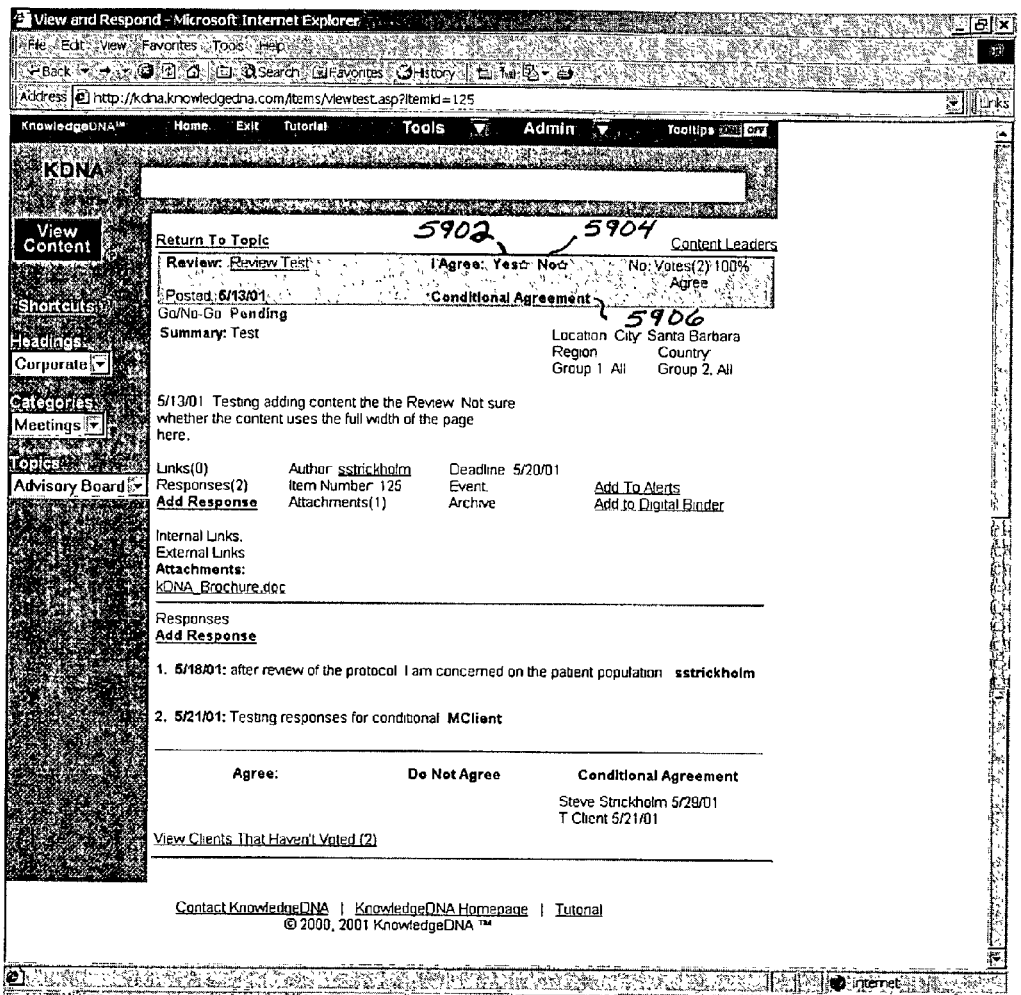
Figure 60:
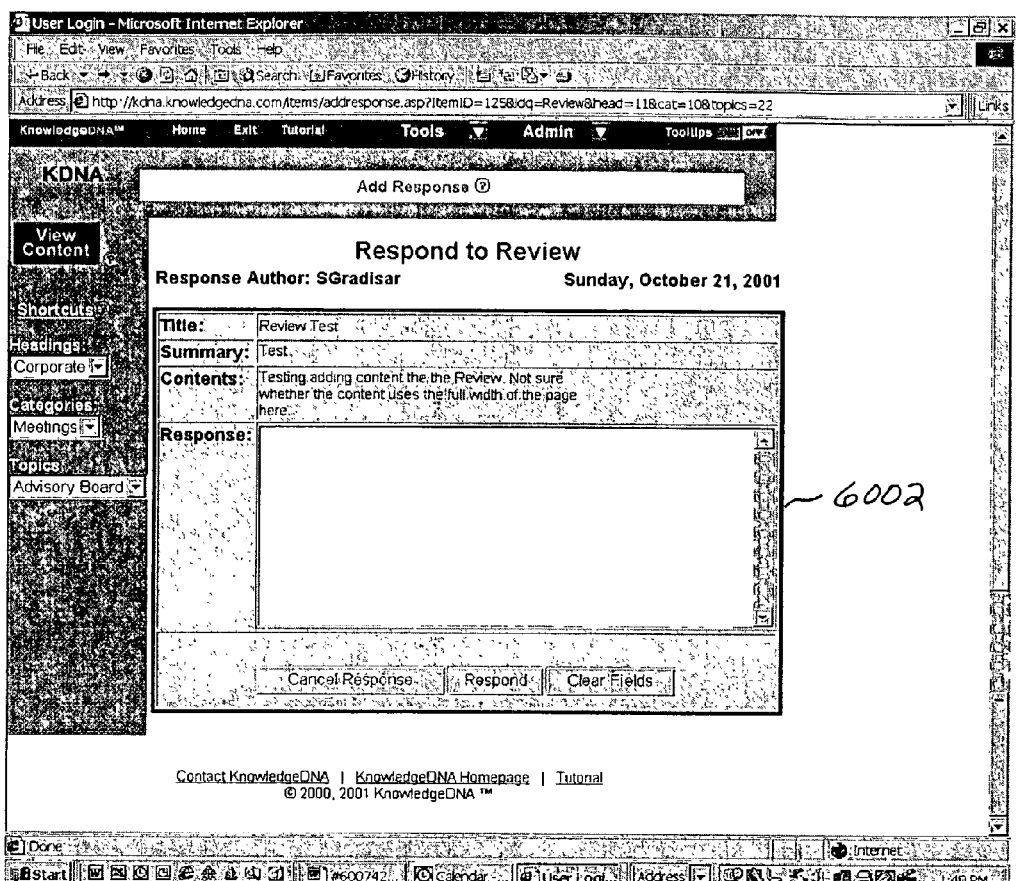
Figure 61:
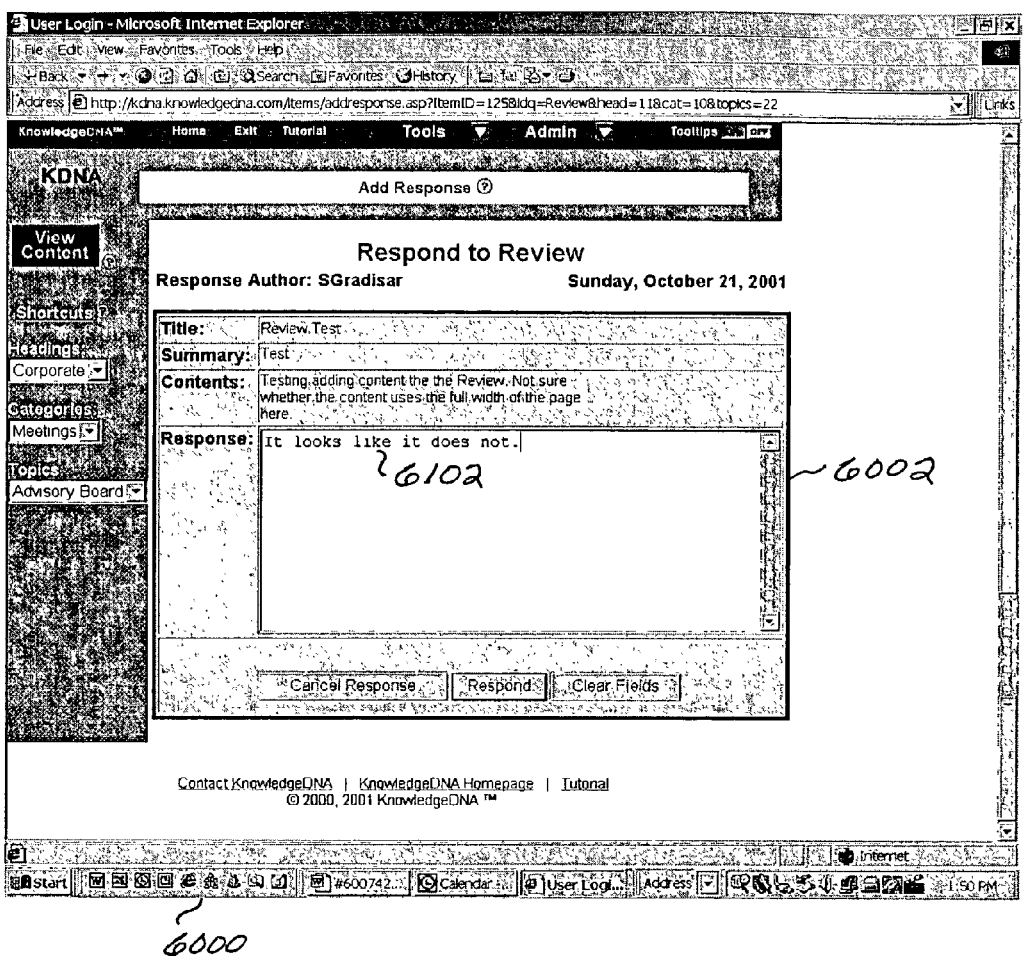
Figure 62:
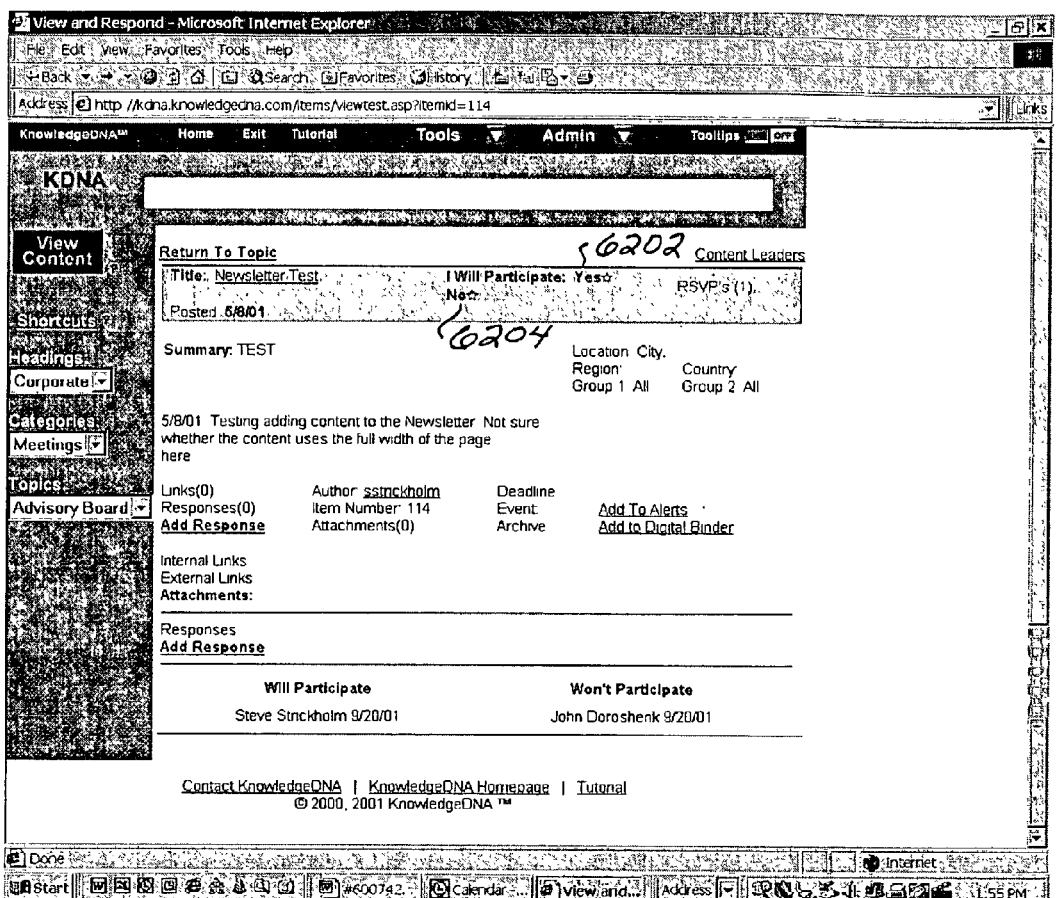

Clicking on Advisory Board (2) Link 1906 returns Topics Title Page 5800 as shown in FIG. 58. Clicking on Review Test Link 5802 returns Topic Page 5900 as shown in FIG. 59. Users can utilize the interactive components displayed to register their view. The user can click on Yes Star 5902, No Star 5904, or Conditional Agreement Star 5906. Clicking on Conditional Agreement Star 5906 returns Respond Page 6000 as shown in FIG. 60. The user can type in a Response 6102 in Respond Window 6002, as shown in FIG. 61. The user can then send the response and add additional resources as described above in the discussion of FIGS. 44 and 45.

Clicking on Newsletter Test Link 5804 returns Topic Page 6200 to the user's web browser as shown in FIG. 6200. Users can utilize the interactive components displayed to register their view. The user can click on Yes Star 6202, No Star 6204 to RSVP their participation.

Figure 64:
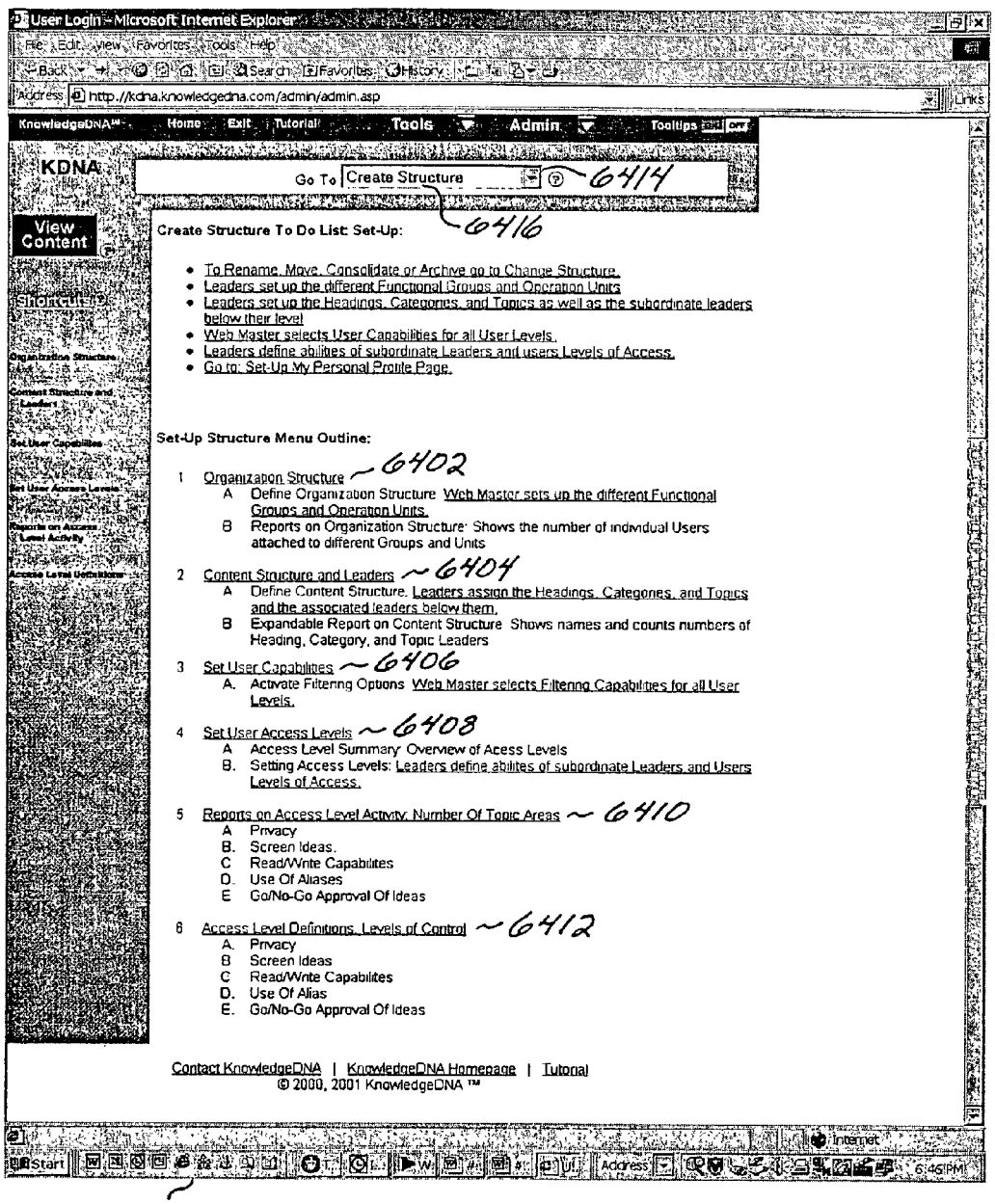
Figure 65:
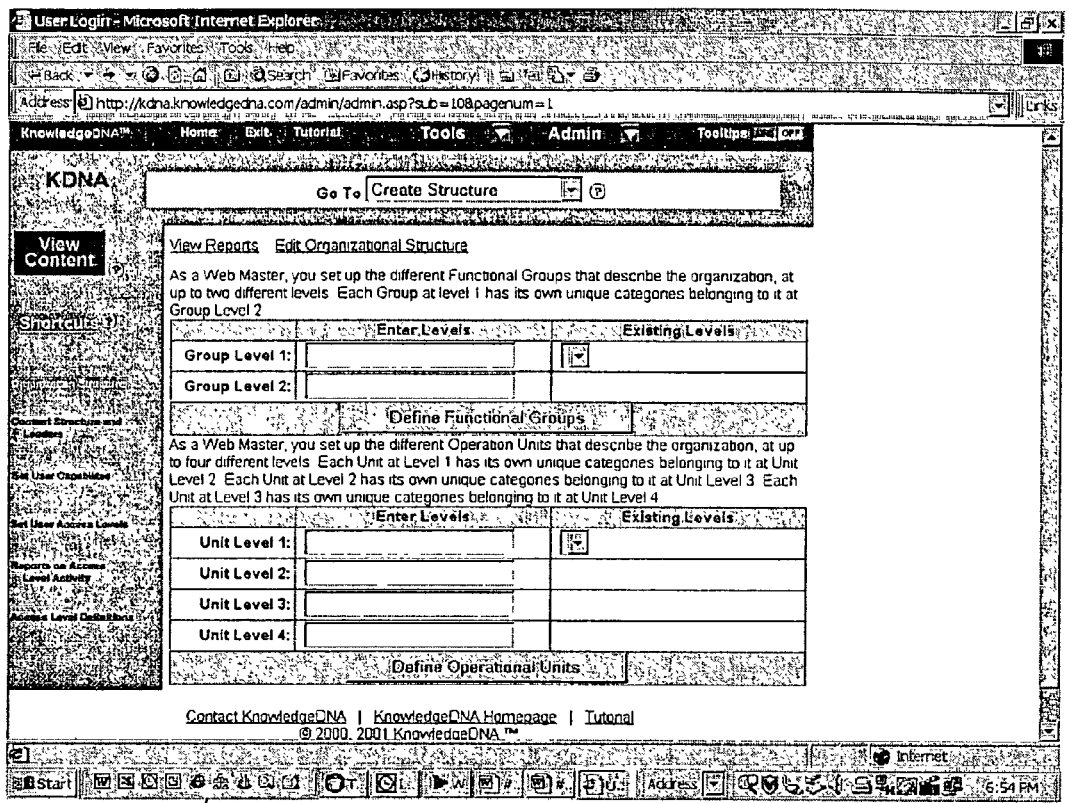

For a Web Master, clicking on Setup/Admin Link 2904 returns Set Up Structure Page 6400 as shown in FIG. 64. Clicking on Organization Structure Link 6402 returns Define Organization Structure Page 6500 as shown in FIG. 65. From this page the Web Master can set up the different function groups for the organization and different operation units. A design of the system is that each Leader has access to nearly all of the Setup/Admin functions when the Leader is in the section of the database for which the Leader has responsibility.

Figure 66:
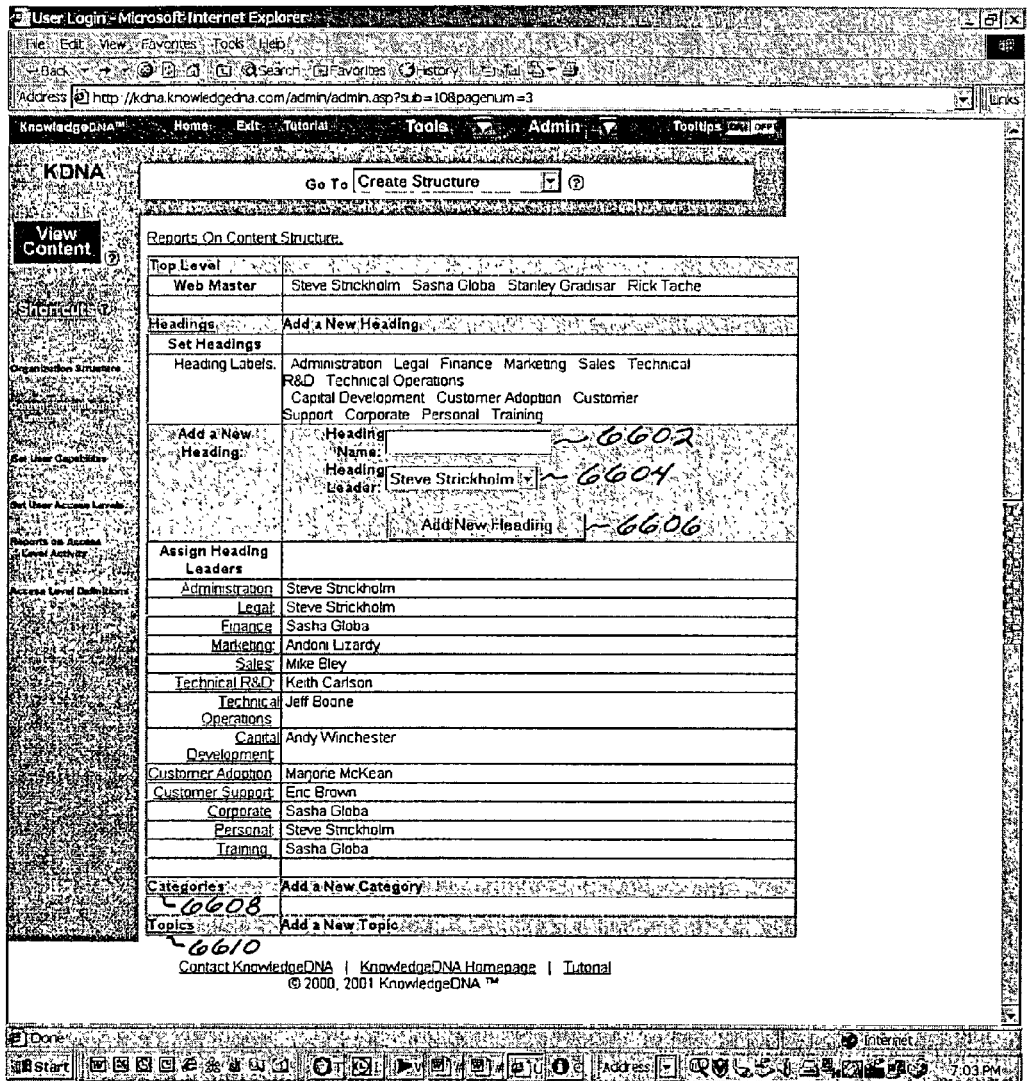

Clicking on Content Structure and Leaders Link 6404 returns Define Content Structure Page 6600 as shown in FIG. 66. From this page the Web Master can add a new Heading and assign a Heading Leader by entering the heading name in Heading Name Box 6602, entering a leader name in Heading Leader Name Box 6604 (or selecting a name from the pull down list revealed by clicking on the down arrow (not shown)) and then clicking on Add New Heading Button 6606.

Figure 67:
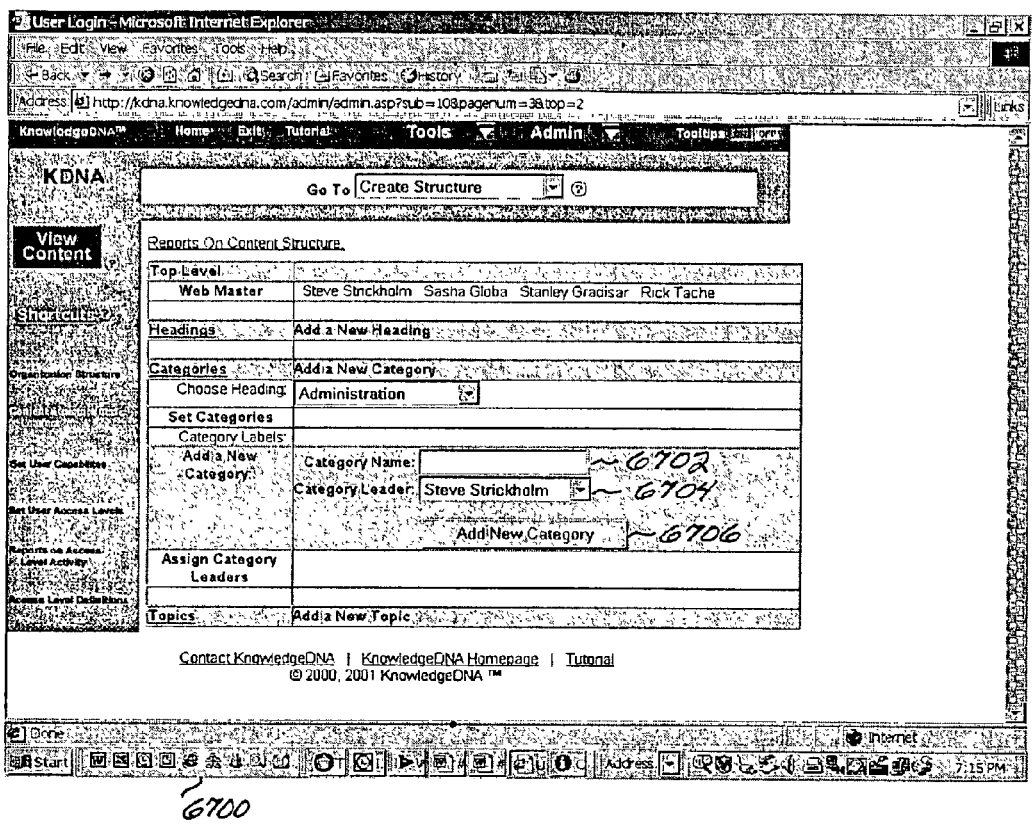

Clicking on Categories Link 6608 returns Define Category Structure Page 6700 as shown in FIG. 67. From this page the Web Master can add a new Category and assign a Category Leader by entering the category name in Category Name Box 6702, entering a leader name in Category Leader Name Box 6704 (or selecting a name from the pull down list revealed by clicking on the down arrow (not shown)), and then clicking on Add New Category Button 6706.

Clicking on Topics Link 6610 returns Define Topics Structure Page (not shown) which is similar in function to Define Category Structure Page 6700. From this page the Web Master can add a new Topic and assign a Topic Leader.

Figure 68:
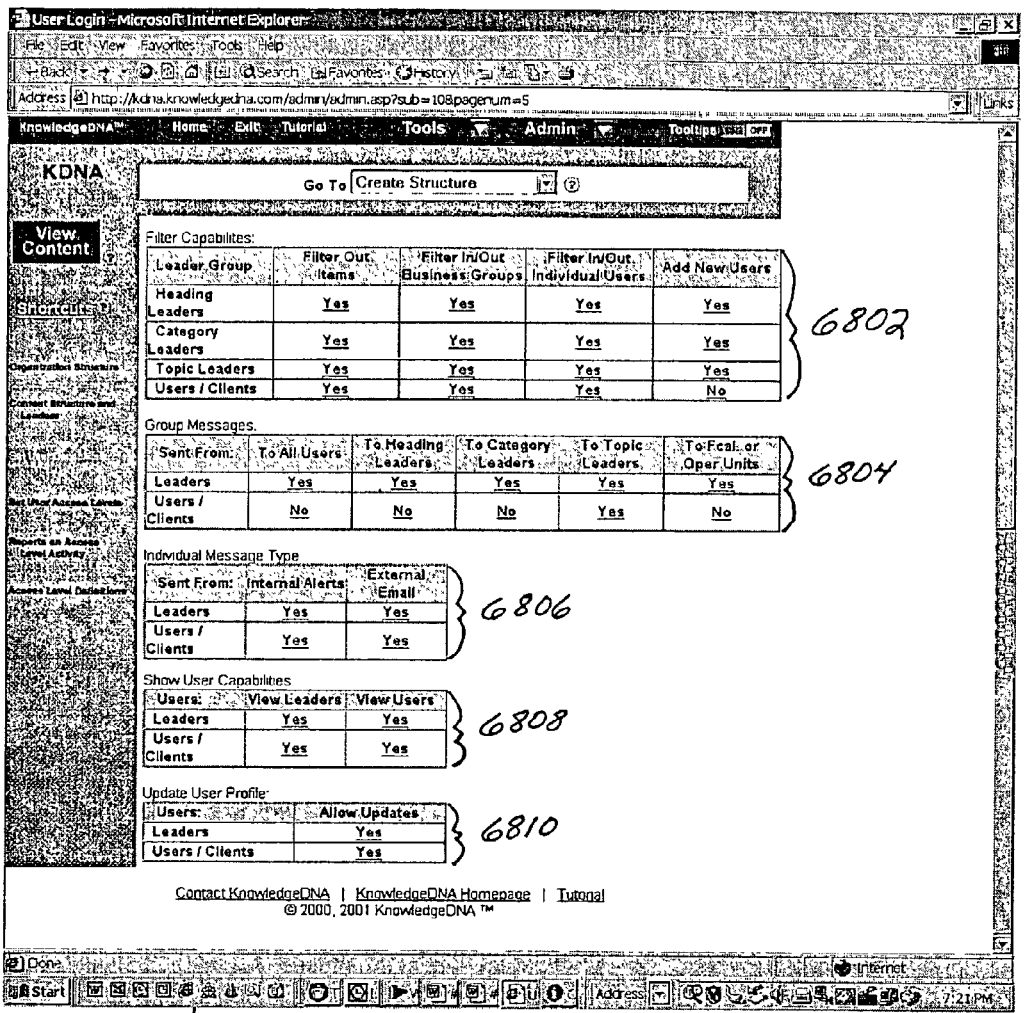

Clicking on Set User Capabilities Link 6406 returns Activate Filtering Options Page 6800 as shown in FIG. 68. Filter Capabilities Table 6802 allows the Web Master to toggle options yes or no regarding filtering Items, Groups, Individual Users, and Add New Users by Heading Leaders, Category Leaders, Topic Leaders, and Users/Clients.

Group Messages Table 6804 allows the Web Master to toggle options yes or no regarding messages sent from Leaders and Users/Clients to All Users, Heading Leaders, Category Leaders, Topic Leaders, and to Functional/Operational units.

Individual Messages Table 6806 allows the Web Master to toggle options yes or no regarding individual messages sent from Leaders and Users/Clients for Internal Alerts and External E-mail.

Show User Capabilities Table 6808 allows the Web Master to toggle options yes or no regarding Leaders and Users/Clients viewing Leaders and Users.

Update User Profile Table 6810 allows the Web Master to toggle options yes or no regarding allowing Leaders and Users/Clients to update their user profile.

Figure 69:
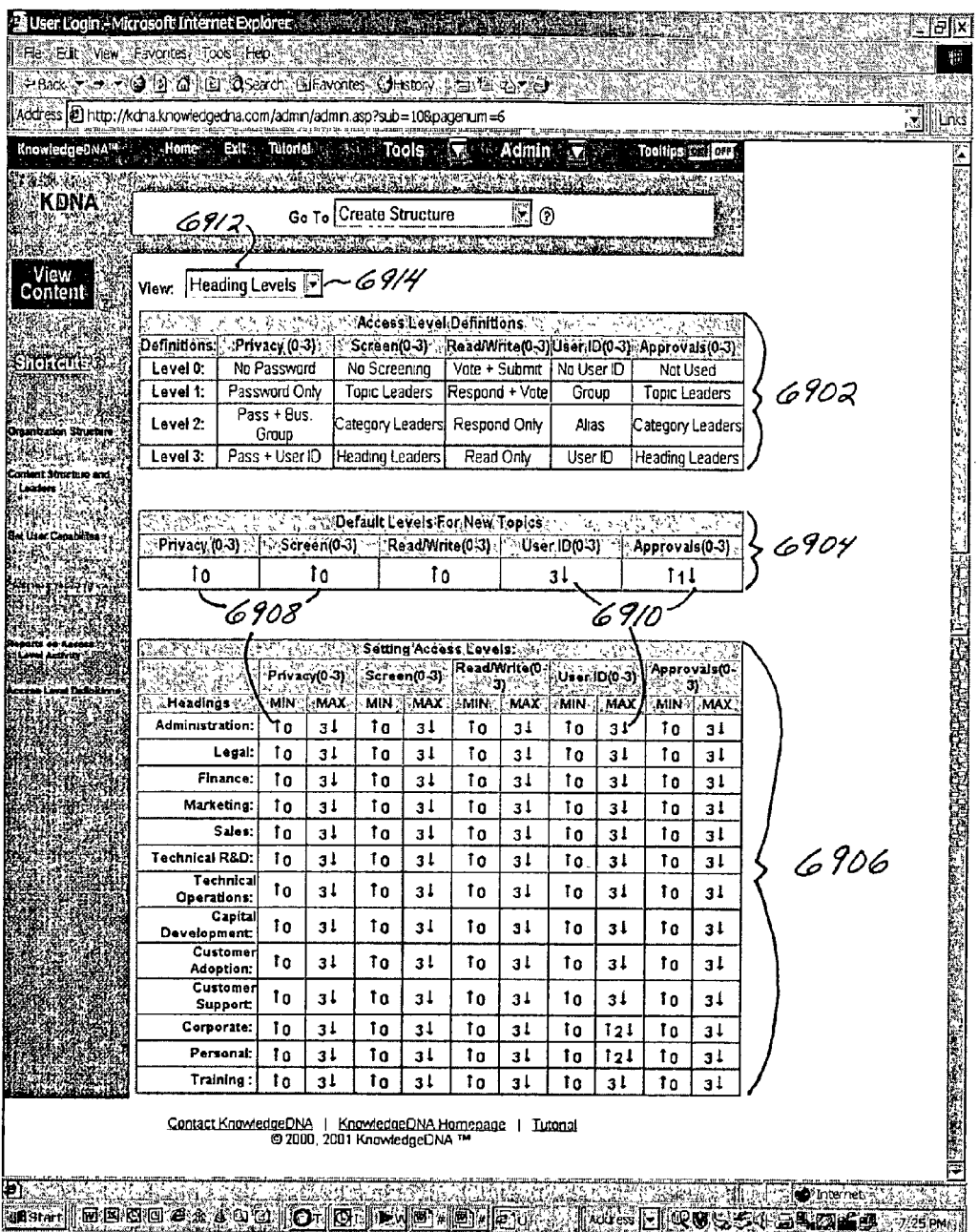

Clicking on Set User Access Levels Link 6408 returns Headings Access Level Summary Page 6900 as shown in FIG. 69. Access Level Definitions Table 6902 shows a brief summary of the current level definitions for the five Input or Access Parameters (Privacy, Screening, Input (Read/Write), User ID, and Approvals) for all Headings. Default Levels For New Topics Table 6904 shows the current default levels established for the five Parameters. The Web Master can increase levels by clicking on an Up Arrows 6908 or decrease levels by clicking on a Down Arrows 6910. Each click changes the level setting up or down by one level.

Setting Access Levels Table 6906 shows the current levels for the five Parameters for each of the current Headings. This table allows the Web Master to increase levels by clicking on an Up Arrows 6908 or decrease levels by clicking on a Down Arrows 6910. Each click changes the level setting up or down by one level.

Figure 70:
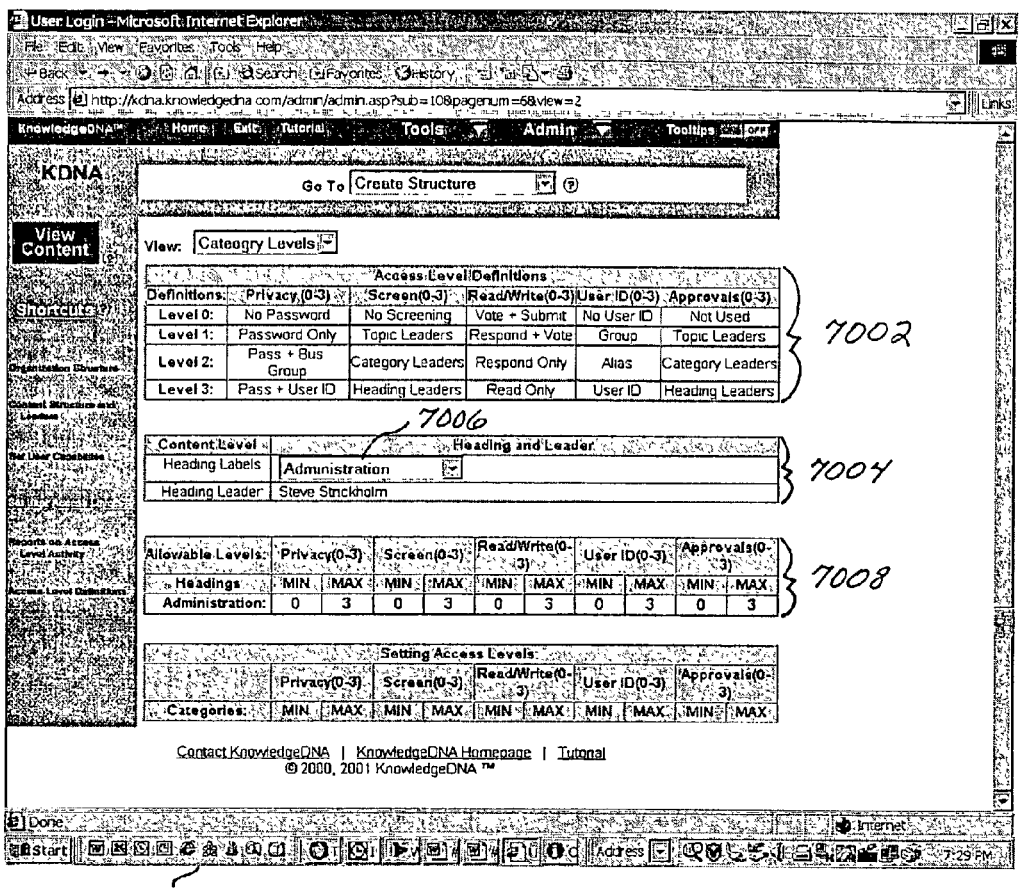

Clicking on View Down Arrow 6914 of View Bar 6912 reveals a drop down list (now shown). Clicking on Category Levels from the drop down list returns Category Access Level Summary Page 7000 as shown in FIG. 70. Access Level Definitions Table 7002 shows a brief summary of the current level definitions for the five Input or Access Parameters (Privacy, Screening, Input (Read/Write), User ID, and Approvals) for all Categories. Heading and Leader Table 7004 allows the Web Master to select a Heading in Heading Bar 7006 which populates Allowable Levels Table 7008 for the Heading selected.

Figure 71:
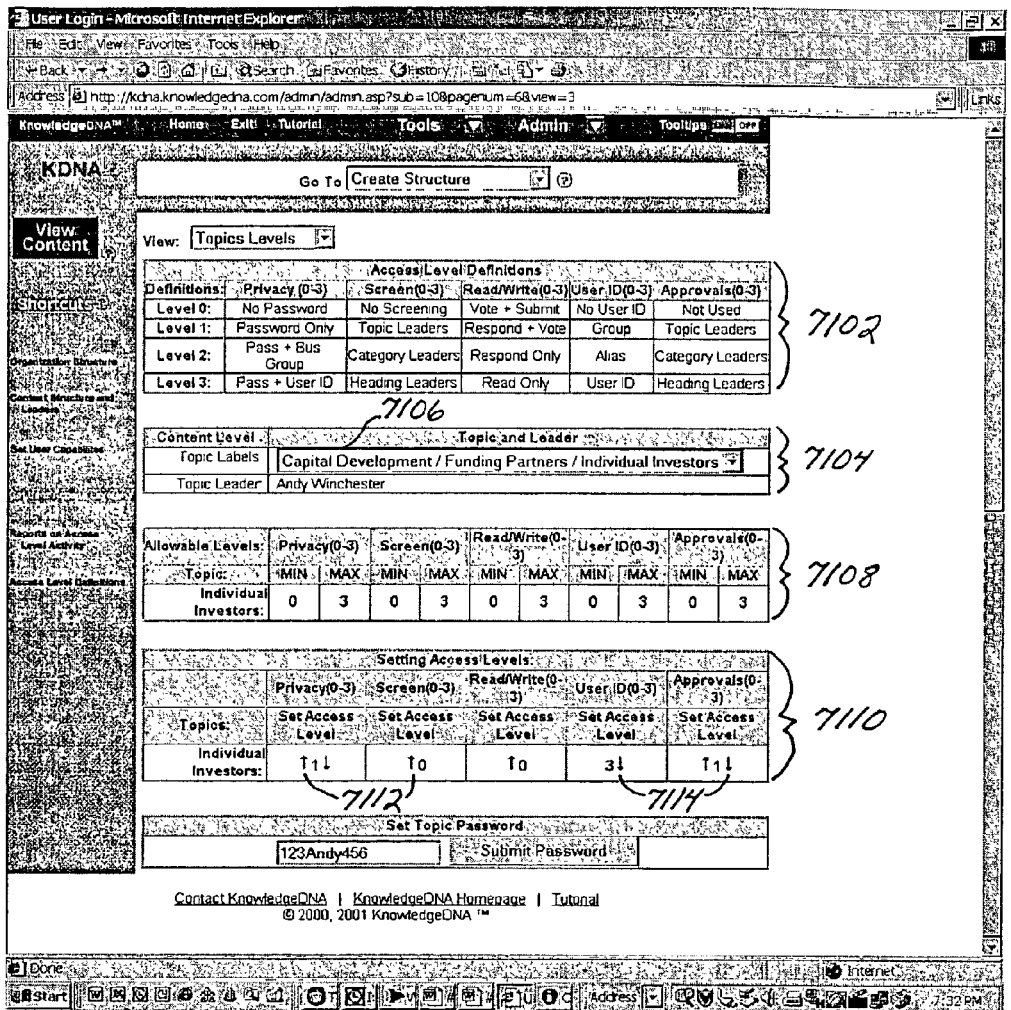

Clicking on View Down Arrow 6914 of View Bar 6912 reveals a drop down list (now shown). Clicking on Topic Levels from the drop down list returns Topic Access Level Summary Page 7100 as shown in FIG. 71. Access Level Definitions Table 7102 shows a brief summary of the current level definitions for the five Input or Access Parameters (Privacy, Screening, Input (Read/Write), User ID, and Approvals) for all Topics. Topic and Leader Table 7104 allows the Web Master to select a Topic in Topic Bar 7106 which populates Allowable Levels Table 7108 for the Topic selected. Setting Access Levels Table 7110 shows the current levels established for the five Parameters for this topic. The Web Master can increase levels by clicking on an Up Arrows 7112 or decrease levels by clicking on a Down Arrows 7114. Each click changes the level setting up or down by one level.

Figure 72:
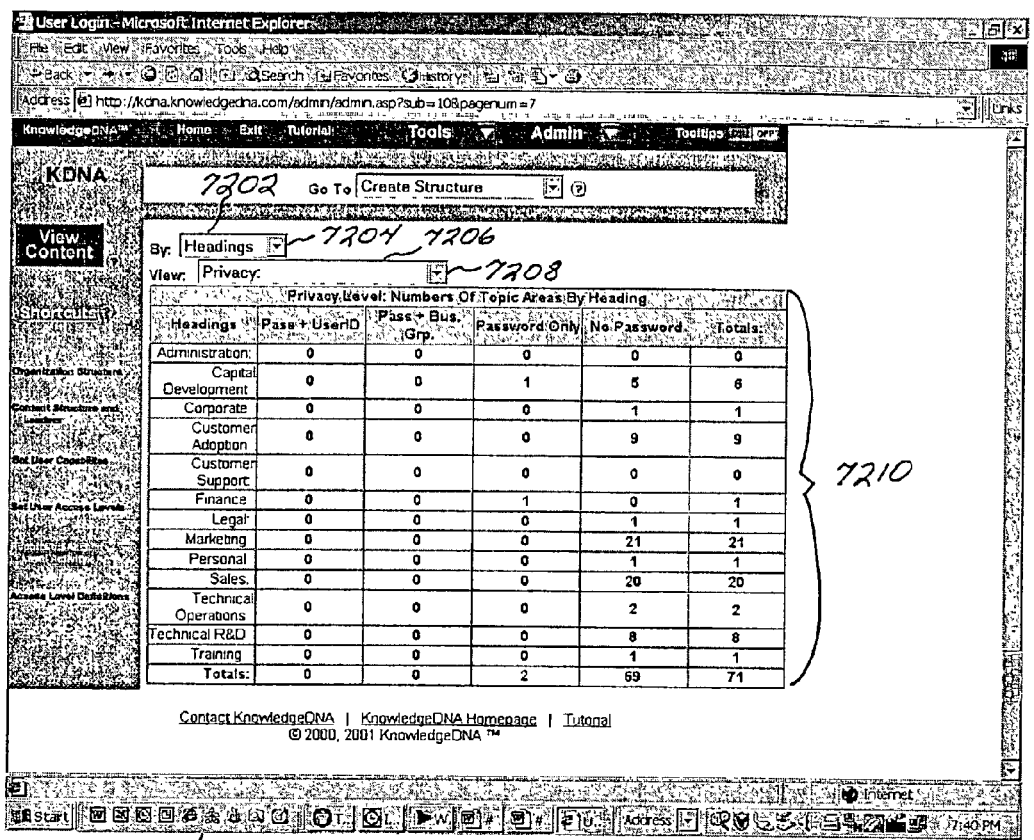

Clicking on Reports On Access Level Activity Link 6410 returns Reports On Access Level Page 7200 as shown in FIG. 72. Clicking on By Down Arrow 7204 of By Bar 7202 reveals a drop down list (not shown) which allows the Web Master to select between Headings, Categories, and Topics. Clicking on View Down Arrow 7208 of View Bar 7206 reveals a drop down list (not shown) which allows the Web Master to select between the five Parameters (Privacy, Screening, Input (Read/Write), User ID, and Approvals). Making these two selections populates Report Table 7210 with the statistics associated with the two options selected.

Clicking on Access Level Definitions Link 6412 returns Privacy Definitions Page 5400 as shown in FIG. 54 (discussed above).

Figure 73:
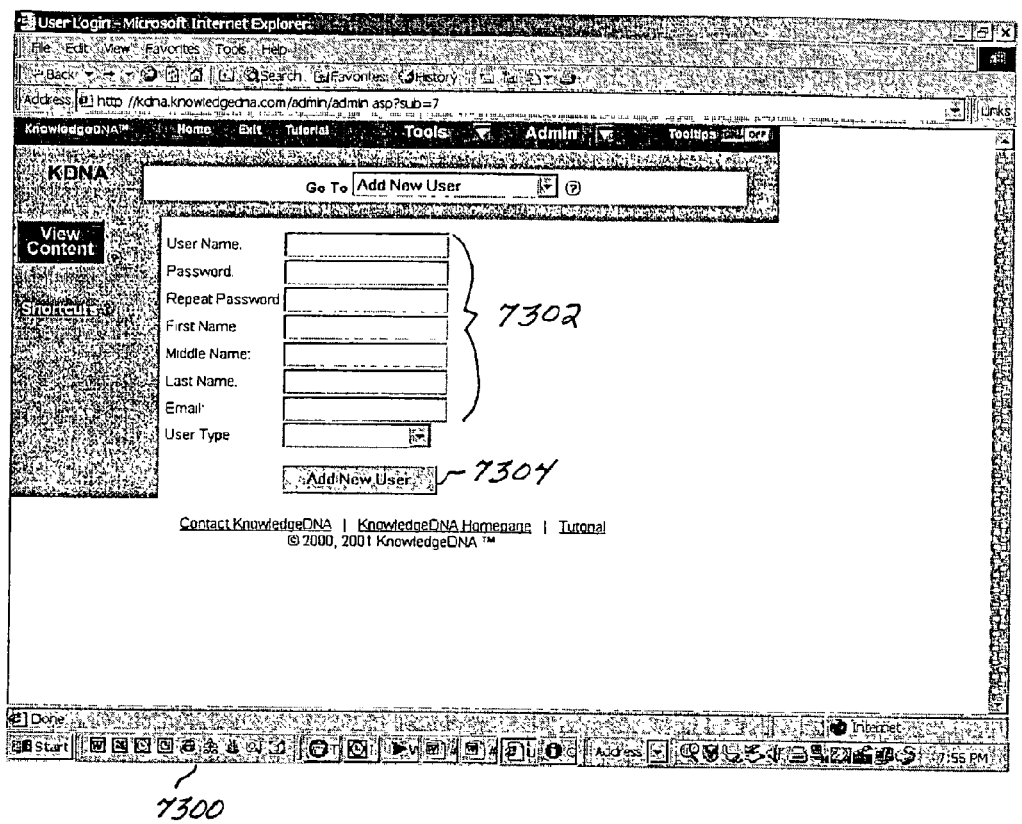

Clicking on Go To Down Arrow 6414 of Go To Bar 6412 reveals a drop down list (now shown). Clicking on Add New User from the drop down list returns Add New User Page 7300 as shown in FIG. 73. The Web Master enters in the user information in User Information Boxes 7302 and then clicks on Add New User Button 7304 to add the new user.

Figure 74:
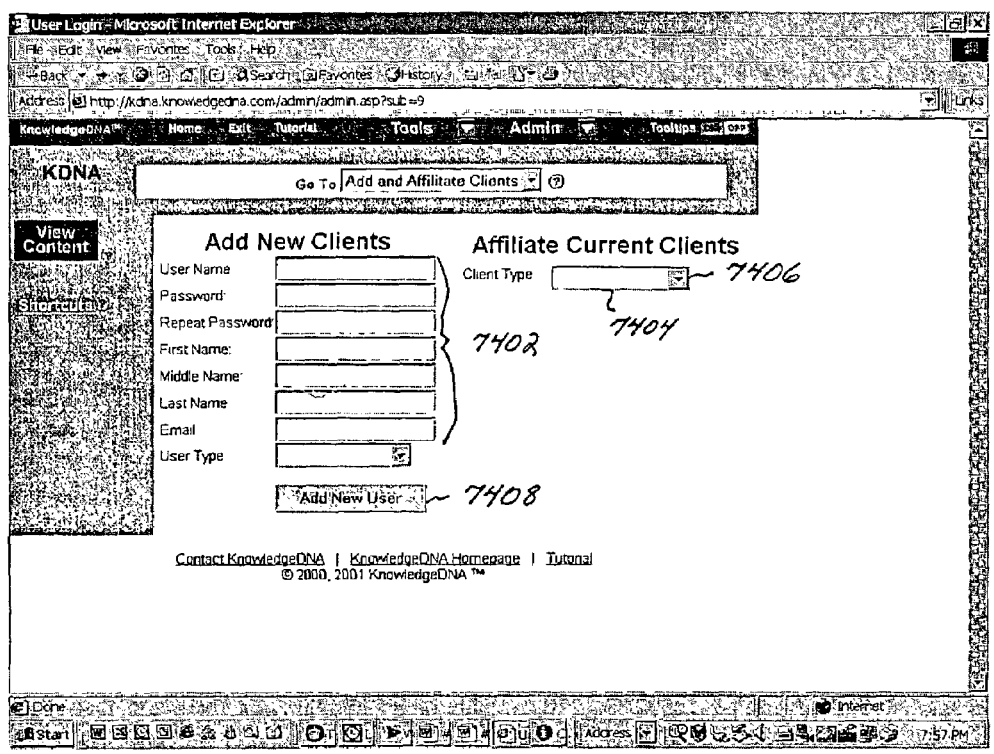

Clicking on Go To Down Arrow 6414 of Go To Bar 6412 reveals a drop down list (now shown). Clicking on Add and Affiliate Clients from the drop down list returns Add and Affiliate Clients Page 7400 as shown in FIG. 74. The Web Master enters in the client information in Client Information Boxes 7402. Clicking on Client Type Down Arrow 7406 of Client Type Bar 7404 reveals a drop down list (now shown). The Web Master selects one of three choices from the pull down list (Topic Client, Category Client, or Heading Client) and then clicks on Add New User Button 7408 to add the new client.

Having described the present invention, it will be understood by those skilled in the art that many changes in construction and widely differing embodiments and applications of the invention will suggest themselves without departing from the scope of the present invention.

What is claimed is:

1. A method for enhancing communication within a community, the method comprising:
   (a) establishing a hierarchical structure for organizing communications between a plurality of users within the community;
   (b) distributing control through selection of inherited parameters of said hierarchical structure to at least one of said plurality of users, wherein said inherited parameters comprise access parameters defining access by said plurality of users to said communications organized within said hierarchical structure and wherein said access parameters are selected from the group consisting of an inclusive access in which access to each of said stored communications in said hierarchical structure is allowed except where excluded by said inherited parameters and an exclusive access in which access to each of said stored communications in said hierarchical structure is allowed only where explicitly assigned;
   (c) storing in said hierarchical structure at least a portion of said communications received from said plurality of users from at least one of a plurality of input devices in relation to at least one of a plurality of topics that is user selected;
   (d) providing a link to a resource associated with said at least a portion of said communications that is stored, wherein said link is available for access by authorized users of said plurality of users;
   (e) prioritizing said at least a portion of said communications within said hierarchical structure, wherein an initial thread of said plurality of communications is assigned a higher priority than a response to a thread of said plurality of communications;
   (f) presenting to at least a one of said plurality of users through said at least one of a plurality of input devices a selected portion of said communications stored in said hierarchical structure, wherein said selected portion of said communications are related under said at least one of a plurality of topics that is user selected;
   (g) enabling dynamic interaction through further contributions of communications by said at least a one of said plurality of users through said at least one of a plurality of input devices in response to presentation of said selected portion of said communications within said hierarchical structure, wherein said further contributions of communications are stored and accessed within said hierarchical structure in relation to said topic, wherein said further contributions are associated with at least one discussion thread comprising a recorded communication under said at least one of a plurality of topics that is conducted between participating users of said plurality of users; and
   (h) presenting to at least a one of said plurality of users at least a portion of said plurality of communications based on said prioritization.

2. A method for enhancing communication within a community according to claim 1 wherein said establishing a hierarchical structure further comprises:
creating a top-level hierarchy having at least one top-level subject;
creating at least one mid-level hierarchy, each of said at least one mid-level hierarchy having at least one mid-level subject related to at least one of said at least one top-level subject; and
creating a low-level hierarchy having at least one low-level subject related to at least one of said at least one mid-level subject, wherein each of said stored communications becomes an item indexed to at least one of said at least one low-level subject.

3. A method for enhancing communication within a community according to claim 2 wherein said distributing control through inherited parameters of said hierarchical structure further comprises:
assigning at least one top-level leader for each of said at least one top-level subject;
assigning at least one mid-level leader for each of said at least one mid-level subject; and
assigning at least one low-level leader for each of said at least one low-level subject.

4. A method for enhancing communication within a community according to claim 3 wherein said distributing control through inherited parameters of said hierarchical structure further comprises:
assigning at least one of said inherited parameters to each of said at least one top-level subject, wherein said at least one of said inherited parameters controls input or access to a database function by said at least one top-level leader associated with said at least one top-level subject;
assigning at least one of said inherited parameters to each of said at least one mid-level subject, wherein said at least one of said inherited parameters controls input or access to a database function by said at least one mid-level leader associated with said at least one mid-level subject; and
assigning at least one of said inherited parameters to each of said at least one low-level subject, wherein said at least one of said inherited parameters controls input or access to a database function by said at least one low-level leader associated with said at least one low-level subject.

5. A method for enhancing communication within a community according to claim 4:
wherein said at least one of said inherited parameters assigned to each of said at least one low-level subject is inherited from said at least one mid-level subject related to said at least one low-level subject, and
further wherein said at least one of said inherited parameters assigned to each of said at least one mid-level subject is inherited from said at least one top-level subject related to said at least one mid-level subject, and
further wherein said at least one of said inherited parameters assigned to each of said at least one top-level subject is inherited from a web master.

6. A method for enhancing communication within a community according to claim 5:
wherein said at least one parameter inherited by each of said at least one low-level subject is the same as, or narrower in scope, than said at least one parameter assigned to each of said at least one mid-level subject related to said at least one low-level subject, and
further wherein said at least one parameter inherited by each of said at least one mid-level subject is the same as, or narrower in scope, than said at least one parameter assigned to each of said at least one top-level subject related to said at least one mid-level subject.

7. A method for enhancing communication within a community according to claim 6:
wherein said at least one of said inherited parameters assigned to each of said at least one top-level subject is inherited from a web master, and
further wherein said at least one parameter inherited by each of said at least one top-level subject is the same as, or narrower in scope, than said at least one parameter assigned to each of said at least one top-level subject by said web master.

8. A method for enhancing communication within a community according to claim 7:
wherein each of said inherited parameters comprises a one of a privacy parameter, screening parameter, input parameter, user ID parameter, and an approval parameter.

9. A method for enhancing communication within a community according to claim 8:
wherein each of said inherited parameters has at least one access level, wherein a higher one of each of said at least one access level provides more management control than a lower one of each of said at least one access level.

10. A method for enhancing communication within a community according to claim 7 wherein said distributing control through inherited parameters of said hierarchical structure further comprises:
allowing said at least one top-level leader associated with said at least one top-level subject, said at least one mid-level leader associated with said at least one mid-level subject, and said at least one low-level leader associated with said at least one mid-level subject, to change respectively said at least one access level of said inherited parameters at any time.

11. A method for enhancing communication within a community according to claim 1 wherein said establishing a hierarchical structure for organizing communications further comprises:
utilizing a database for establishing said hierarchical structure,
wherein said at least a portion of said communications are stored in said hierarchical structure in said database.

12. A method for enhancing communication within a community according to claim 11 further comprising:
recording and storing a communication from a user in said database when said user is not accessing said database at the time said communication is initiated.

13. A method for enhancing communication within a community according to claim 1 wherein said enabling dynamic interaction further comprises:
stratifying said selected portion of said communications into at least one item type.

14. A method for enhancing communication within a community according to claim 13 wherein said at least one item type is a one of an idea, question, event, review, survey, newsletter, and action item.

15. A method for enhancing communication within a community according to claim 1 wherein said presenting a selected portion of said communications further comprises:
filtering said at least a portion of said communications yielding a filtered portion of communications;
consolidating said filtered portion of communications yielding a consolidated portion of communications;
sorting said consolidated portion of communications yielding a sorted portion of communications; and presenting said sorted portion of communications according to a predetermined level of content review.

16. A method for enhancing communication within a community according to claim 1 wherein said storing in said hierarchical structure further comprises:
attaching a resource to at least one of said at least a portion of said communications,
wherein said resource is a one of an internal database link, a document/file attachment, and an external Internet link.

17. A method for enhancing communication within a community according to claim 1 wherein said enabling dynamic interaction further comprises:
alerting said at least one of said plurality of users to an activity within the community,
wherein said activity is a one of a topic within said hierarchical structure, an item type within said hierarchical structure, a response from an individual user within the community, a response from any one of a member of a group of users within the community, a new posting from an individual user within the community, and a new posting from any one of a member of a group of users within the community.

18. A method for enhancing communication within a community according to claim 1 wherein said enabling dynamic interaction further comprises:
alerting said at least one of said plurality of users to a message within the community,
wherein said message is sent to at least a one of a home page of said at least one of said plurality of users, to an e-mail account of said at least one of said plurality of users, to a voice mail box of said at least one of said plurality of users, and to some other type of communications device of said at least one of said plurality of users.

19. A method for enhancing communication within a community according to claim 1 wherein said enabling dynamic interaction further comprises:
alerting a select group of others within the community to an activity or a message of said at least one of said plurality of users,
wherein said activity is a one of a topic within said hierarchical structure, an item type within said hierarchical structure, a response from said at least one of said plurality of users, a new posting from said at least one of said plurality of users, and
further wherein said message is sent to at least a one of a home page of said select group of others within the community, to an e-mail account of said select group of others within the community, to a voice mail box of said select group of others within the community, and to some other type of communications device of said select group of others within the community.

20. A computer system for enhancing communication within a community, the computer system comprising:
a storage medium containing code instructions that when executed on a processor in the computer system provide:
an application platform running an application that organizes a plurality of communications, said application further comprising:
a database for storing said plurality of communications;
an inherited parameters responsibility module for establishing a hierarchical structure for said plurality of communications and for distributing control of said hierarchical structure to a plurality of users within the community, through selection of inherited parameters comprising access parameters defining access by said plurality of users to said plurality of communications organized within said hierarchical structure and wherein said access parameters are selected from the group consisting of an inclusive access in which access to each of said stored communications in said hierarchical structure is allowed except where excluded by said inherited parameters and an exclusive access in which access to each of said stored communications in said hierarchical structure is allowed only where explicitly assigned;
an input module for capturing said plurality of communications within said hierarchical structure sent by said plurality of users from a plurality of communication devices and storing at least a portion of said plurality of communications in relation to at least one of a plurality of topics that is user selected, wherein said plurality of communications comprises at least one link to a resource associated with said at least a portion of said plurality of communications that is stored, wherein said link is available for access by authorized users;
a thread synchronization module for synchronizing said plurality of communications within said hierarchical structure;
an initial priority-based content placement module for determining a priority assignment for an initial communication of said plurality of communications;
an authorization module for authorizing each of said plurality of users to access a portion of said plurality of communications stored in said database to which each of said plurality of users have access rights based upon an access status and in conjunction with said inherited parameters responsibility module and wherein said access status is selected from the group consisting of an inclusive access in which access to each of said stored communications in said hierarchical structure is allowed and an exclusive access in which access to each of said stored communications in said hierarchical structure is allowed only where explicitly assigned;
a response priority-based content placement module for determining a priority assignment for a response communication of said plurality of communications, wherein said priority assignment for a response communication is lower than said priority assignment for an initial communication;
a reviewing module for presenting said synchronized plurality of communications in said hierarchical structure to said plurality of users for dynamic interaction enabled through further contributions of communications by said plurality of users, wherein said further contributions of communications are stored and accessed within said hierarchical structure in relation to said at least one of a plurality of topics that is user selected, wherein said further contributions are associated with at least one discussion thread comprising recorded communication under said at least one of a plurality of topics that is conducted between participating users of said plurality of users; and
an output module for outputting a plurality of responses to said plurality of communications from said plurality of users to said plurality of communication devices.

21. A computer system for enhancing communication within a community according to claim 20 wherein said application platform is a one of a centralized application platform architecture and a distributed application platform architecture, wherein said distributed application platform architecture has a plurality of databases for storing distributively said plurality of communications.

22. A computer system for enhancing communication within a community according to claim 21 further comprising:

for said distributed application platform architecture, an inherited parameters synchronization module for determining a one of a plurality of application platforms of said distributed application platform that contains a portion of said plurality of communications sought by a one of said plurality of users, and for routing said one of said plurality of users to said one of a plurality of application platforms; and a content synchronization module for exchanging and synchronizing content between said plurality of databases.

23. A computer system for enhancing communication within a community according to claim 20 wherein said application further comprises:

a content access interface for determining a current hierarchical structure of said database accessible by said plurality of users;

an interaction control module for determining a dynamic interaction capability for said plurality of users with said plurality of communications stored in said database to which said plurality of users have access rights in conjunction with said inherited parameters responsibility module; and a content prioritizing interface for sorting and prioritizing the order said plurality of communications are presented to each of said plurality of users for review.

24. A computer system for enhancing communication within a community according to claim 20 further comprising:

a recording module accessible by said plurality of communication devices, wherein said recording module, after a user input is received in a one of said plurality of communication devices on a record option, queries said database causing said database to deliver to said one of said plurality of communication devices said hierarchical structure of said plurality of communications, and further wherein said recording module receives a user selection input of a topic within said hierarchical structure with which to associate a communication from said one of said plurality of communication devices, and further wherein said recording module records and stores in said database said communication sent from said one of said plurality of communication devices.

25. A computer system for enhancing communication within a community according to claim 24 wherein said recording module resides on said one of said plurality of communication devices.

26. A computer system for enhancing communication within a community according to claim 24 wherein said recording module resides on said application and is accessed over a communication channel by a user input on said record option selected from a tool bar displayed on said one of said plurality of communication devices.

27. A computer system for enhancing communication within a community according to claim 20 wherein said inherited parameters responsibility module further comprises:

a hierarchy initiation module for creating a plurality of headings in a top-level hierarchy and for assigning at least one heading leader for each of said plurality of headings, and for creating a plurality of categories in a mid-level hierarchy and for assigning at least one category leader for each of said plurality of categories, and for creating a plurality of topics in a low-level hierarchy and for assigning at least one topic leader for each of said plurality of topics, wherein each of said stored plurality of communications becomes an item indexed to at least one of said plurality of topics.

28. A computer system for enhancing communication within a community according to claim 20 wherein said input module further comprises:

a resource attachment module for attaching a resource to at least a one of said plurality of communications, wherein said resource is a one of an internal database link, a document/file attachment, and an external Internet link.

29. A computer system for enhancing communication within a community according to claim 20 wherein said thread synchronization module further comprises:

wherein said initial priority-based content placement module is configured so that when reviewed by a one of said plurality of users accessing said application, said initial communication is reviewed in proper relationship to a portion of said plurality of communications related to said initial communication; and wherein said response priority-based content placement module is configured so that when reviewed by a one of said plurality of users accessing said application, said response communication is reviewed in proper relationship to a portion of said plurality of communications related to said response communication.

30. A computer system for enhancing communication within a community according to claim 20 wherein said reviewing module further comprises:

a filter module for setting at least one filter parameter, wherein said at least one filter parameter is at least a one of a filter out parameter that filters out a first portion of said synchronized plurality of communications and a filter in parameter that filters in a second portion of said synchronized plurality of communications for review by a user; and a consolidation reviewing interface for setting a level of content review, wherein said set level of content review is a one of a full review, a summary only review, a title only review, and an all responses review.

31. A computer system for enhancing communication within a community according to claim 20 wherein said reviewing module further comprises:

a customized interactive reviewing module for creating a digital binder, wherein said customized interactive reviewing module allows each of said plurality of users to aggregate in said digital binder a specific portion of said plurality of communications most useful to each of said plurality of users.

32. A computer system for enhancing communication within a community according to claim 31 wherein said input module and said thread synchronization module update said digital binder in real time with new content received in said application related to said specific portion of said plurality of communications aggregated in said digital binder.

33. A computer system for enhancing communication within a community according to claim 20 wherein said application further comprises:
   an alerts module for setting automatic alerts,
   wherein a select group of said plurality of users can be automatically alerted to at least one activity or at least one message, wherein said at least one activity is a one of a topic within said hierarchical structure, an item type within said hierarchical structure, a response from an individual user within the community, a response from any one of a member of a group of users within the community, a new posting from an individual user within the community, and a new posting from any one of a member of a group of users within the community,
   and further wherein said at least one message is sent to at least a one of a home page of said select group of said plurality of users, to an e-mail account of said select group of said plurality of users, to a voice mail box of said select group of said plurality of users, and to some other type of communications device of said select group of said plurality of users.

34. A method for enhancing communication within a community, the method comprising the steps of:
   (a) receiving in an application in an application platform a communication sent by a user from a first communication device, wherein said communication is associated with a user selected topic of a plurality of topics such that said user selected topic is selected by said user, and receiving a link to a resource associated with said communication;
   (b) determining an access right said user has to information stored in a database of said application in said application platform based upon an access status and wherein said access status is selected from the group consisting of an inclusive access in which access to each of said stored communications in said hierarchical structure is allowed except where excluded by an inherited parameter and an exclusive access in which access to each of said stored communications in said hierarchical structure is allowed only where explicitly assigned;
   (c) accessing a current database hierarchy, authorization parameters, and interaction control parameters for said application;
   (d) granting access to said user, according to said access right of said user, to a portion of said information stored in said database, wherein said portion of said information is stored in association with said user selected topic;
   (e) determining a dynamic interaction capability for said user with said portion of said information based on said database hierarchy, said authorization parameters, and said interaction control parameters;
   (f) prioritizing an order of said portion of said information, wherein an initial thread of said information is assigned a higher priority than a response to a thread of said information;
   (g) presenting said portion of said information that is ordered to said user for review, wherein said presentation is based on said prioritization;
   (h) accepting an initial input from said user according to said dynamic interaction capability from said first communication device for storage in said database, wherein said initial input comprises said communication and said link; and
   (i) outputting said initial input from said user to at least a second communication device.

35. A method according to claim 34 wherein said current database hierarchy comprises:
   a top-level hierarchy having at least one top-level subject;
   at least one mid-level hierarchy, each of said at least one mid-level hierarchy having at least one mid-level subject related to at least one of said at least one top-level subject; and
   a low-level hierarchy having at least one low-level subject related to at least one of said at least one mid-level subject,
   wherein said initial input becomes an item indexed to at least one of said at least one low-level subject.

36. A method according to claim 35 wherein said current database hierarchy further comprises:
   at least one top-level leader assigned to each of said at least one top-level subject;
   at least one mid-level leader assigned to each of said at least one mid-level subject; and
   at least one low-level leader assigned to each of said at least one low-level subject.

37. A method according to claim 35 wherein said current database hierarchy further comprises:
   at least one top-level authorization parameter and at least one top-level interaction control parameter associated with each of said at least one top-level subject;
   at least one mid-level authorization parameter and at least one mid-level interaction control parameter associated with each of said at least one mid-level subject; and
   at least one low-level authorization parameter and at least one low-level interaction control parameter associated with each of said at least one low-level subject.

38. A method according to claim 37 wherein said at least one low-level authorization parameter and said at least one low-level interaction control parameter associated with each of said at least one low-level subject is inherited from said at least one mid-level subject related to said at least one low-level subject, and
   further wherein said at least one mid-level authorization parameter and said at least one mid-level interaction control parameter associated with each of said at least one mid-level subject is inherited from said at least one top-level subject related to said at least one mid-level subject, and
   further wherein said at least one top-level authorization parameter and said at least one top-level interaction control parameter associated with each of said at least one top-level subject is inherited from a web master.

39. A method according to claim 34 wherein said determining dynamic interaction capability further comprises:
   stratifying said portion of said information into at least one item type.

40. A method according to claim 39 wherein said at least one item type comprises a one of an idea, question, event, review, survey, newsletter, and action item.

41. A method according to claim 34 wherein each of said authorization parameters has at least one access level, wherein a higher one of each of said at least one access level provides more management control than a lower one of each of said at least one access level.

42. A method according to claim 34 wherein each of said interaction control parameters has at least one control level, wherein a higher one of each of said at least one control level provides more management control than a lower one of each of said at least one control level.

43. A method according to claim 34 wherein said presenting step further comprises:
   presenting alerts to said user to an activity within the community, wherein said activity is a one of a topic within said hierarchical structure, an item type within said hierarchical structure, a response from an individual user within the community, a response from any one of a member of a group of users within the community, a new posting from an individual user within the community, and a new posting from any one of a member of a group of users within the community.

44. A method according to claim 34 wherein said presenting step further comprises:
presenting alerts to said user to a message within the community,
wherein said message is sent to at least a one of a home page of said user, to an e-mail account of said user, to a voice mail box of said user, and to some other type of communications device of said user.

45. A method according to claim 34 wherein said outputting step further comprises:
outputting said initial input as an alert to a select group of users,
wherein said initial input is output to at least a one of a home page of said select group of users, an e-mail account of said select group of users, a voice mail box of said select group of users, and to some other type of communications device of said select group of users.

46. A method for enhancing communication within a community, the method comprising the steps of:
(a) receiving in an application in an application platform a communication sent by a user from a first communication device, wherein said communication is associated with a user selected topic of a plurality of topics such that said user selected topic is selected by said user, and receiving a link to a resource associated with said communication;
(b) determining an access right said user has to information stored in a database of said application in said application platform based upon an access status and wherein said access status is selected from the group consisting of an inclusive access in which access to each of said stored communications in said hierarchical structure is allowed except where excluded by an inherited parameter and an exclusive access in which access to each of said stored communications in said hierarchical structure is allowed only where explicitly assigned;
(c) accessing a current database hierarchy, authorization parameters, and interaction control parameters for said application;
(d) granting access to said user, according to said access right of said user, to a portion of said information stored in said database, wherein said portion of said information is stored in association with said user selected topic;
(e) determining a dynamic interaction capability for said user with said portion of said information based on said database hierarchy, said authorization parameters, and said interaction control parameters;
(f) prioritizing an order of said portion of said information, wherein an initial thread of said information is assigned a higher priority than a response to a thread of said information;
(g) presenting said portion of said information that is ordered to said user for review, wherein said presentation is based on said prioritization;
(h) receiving a selection input by said user an item type to respond to;
(i) accepting a response input from said user according to said dynamic interaction capability from said first communication device for storage in said database, wherein said response input comprises said communication and said link; and (j) outputting said response input from said user to at least a second communication device.

47. A method according to claim 46 wherein said current database hierarchy comprises:
a top-level hierarchy having at least one top-level subject;
at least one mid-level hierarchy, each of said at least one mid-level hierarchy having at least one mid-level subject related to at least one of said at least one top-level subject; and
a low-level hierarchy having at least one low-level subject related to at least one of said at least one mid-level subject,
wherein said response input becomes an item indexed to at least one of said at least one low-level subject.

48. A method according to claim 47 wherein said current database hierarchy further comprises:
at least one top-level leader assigned to each of said at least one top-level subject;
at least one mid-level leader assigned to each of said at least one mid-level subject; and
at least one low-level leader assigned to each of said at least one low-level subject.

49. A method according to claim 47 wherein said current database hierarchy further comprises:
at least one top-level authorization parameter and at least one top-level interaction control parameter associated with each of said at least one top-level subject;
at least one mid-level authorization parameter and at least one mid-level interaction control parameter associated with each of said at least one mid-level subject; and
at least one low-level authorization parameter and at least one low-level interaction control parameter associated with each of said at least one low-level subject.

50. A method according to claim 49 wherein said at least one low-level authorization parameter and said at least one low-level interaction control parameter associated with each of said at least one low-level subject is inherited from said at least one mid-level subject related to said at least one low-level subject, and
further wherein said at least one mid-level authorization parameter and said at least one mid-level interaction control parameter associated with each of said at least one mid-level subject is inherited from said at least one top-level subject related to said at least one mid-level subject, and
further wherein said at least one top-level authorization parameter and said at least one top-level interaction control parameter associated with each of said at least one top-level subject is inherited from a web master.

51. A method according to claim 46 wherein said determining dynamic interaction capability further comprises:
stratifying said portion of said information into at least one item type.

52. A method according to claim 51 wherein said at least one item type comprises a one of an idea, question, event, review, survey, newsletter, and action item.

53. A method according to claim 46 wherein each of said authorization parameters has at least one access level, wherein a higher one of each of said at least one access level provides more management control than a lower one of each of said at least one access level.

54. A method according to claim 46 wherein each of said interaction control parameters has at least one control level, wherein a higher one of each of said at least one control level provides more management control than a lower one of each of said at least one control level.

* * * * *

UNITED STATES PATENT AND TRADEMARK OFFICE
CERTIFICATE OF CORRECTION

PATENT NO.       : 7,634,546 B1
APPLICATION NO.  : 10/004384
DATED            : December 15, 2009
INVENTOR(S)      : Strickholm et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1247 days.

Signed and Sealed this

Ninth Day of November, 2010

David J. Kappos
*Director of the United States Patent and Trademark Office*